US012729808B2

(12) United States Patent
Komuravelly et al.

(10) Patent No.: US 12,729,808 B2
(45) Date of Patent: Sep. 8, 2026

(54) RAIL CLAMP FOR SOLAR PANEL MODULE

(71) Applicant: Unirac Inc., Albuquerque, NM (US)

(72) Inventors: Srikanth Komuravelly, Hyderabad (IN); Sanjeev Mishra, Hyderabad (IN)

(73) Assignee: Unirac, Inc., Albuquerque, NM (US)

( * ) Notice: Subject to any disclaimer, the term of this patent is extended or adjusted under 35 U.S.C. 154(b) by 16 days.

(21) Appl. No.: 18/666,171

(22) Filed: May 16, 2024

(65) Prior Publication Data

US 2025/0297704 A1 Sep. 25, 2025

Related U.S. Application Data

(60) Provisional application No. 63/568,897, filed on Mar. 22, 2024.

(51) Int. Cl.
*F16M 13/02* (2006.01)
*H02S 30/00* (2014.01)

(52) U.S. Cl.
CPC ........... *F16M 13/022* (2013.01); *H02S 30/00* (2013.01)

(58) Field of Classification Search
CPC .............................. F16M 13/022; H02S 30/00
See application file for complete search history.

(56) References Cited

U.S. PATENT DOCUMENTS 3,124,330 A * 3/1964 Robinson .................. E04G 7/26 248/228.2
4,183,120 A * 1/1980 Thorne ................... F16L 3/233 24/456
4,386,752 A * 6/1983 Pavlak .................... F16L 3/127 24/543
5,203,135 A 4/1993 Bastian
6,032,939 A * 3/2000 Chen ....................... B25B 1/103 269/251
6,536,729 B1 3/2003 Haddock
(Continued)

FOREIGN PATENT DOCUMENTS

CN 204376810 U 6/2015
CN 108306585 A 7/2018
(Continued)

OTHER PUBLICATIONS

PCT International Preliminary Report on Patentability mailed Sep. 2, 2023, PCT/US2022/020821, filed Mar. 17, 2022, 8 pages.
(Continued)

*Primary Examiner* — Monica E Millner
(74) *Attorney, Agent, or Firm* — Lee & Hayes, P.C.

(57) ABSTRACT

A clamp couples to a rail on solar panel modules are supported and transitions between an unclamped state and a clamped state. The clamp includes a first body having a shelf on which a first arm of the rail rests, a flange, and a channel. The first arm is at least partially disposed in the channel in the clamped state. The clamp includes a second body having a shelf on which a second arm of the rail rests, a flange, a channel. The second arm is at least partially disposed in the channel in the clamped state. The second body has a slot through which a fastener is disposed for coupling the clamp to a mount. A receptacle is formed at least in part by the first body and the second body, and the rail is at least partially disposed in the receptacle.

20 Claims, 32 Drawing Sheets

(56) References Cited

U.S. PATENT DOCUMENTS

| | | | | |
|---|---|---|---|---|
| 7,513,080 | B1 * | 4/2009 | Showalter | E04D 13/10 52/24 |
| 8,387,319 | B1 | 3/2013 | Gilles-Gagnon et al. | |
| 8,695,290 | B1 | 4/2014 | Kim et al. | |
| 9,422,957 | B2 | 8/2016 | Dinh | |
| 9,893,677 | B1 * | 2/2018 | Liu | H02S 20/23 |
| 9,912,284 | B2 | 3/2018 | Svec | |
| 9,923,509 | B2 | 3/2018 | Almy | |
| 10,218,305 | B1 | 2/2019 | Schrock | |
| 10,340,838 | B2 | 7/2019 | Schuit et al. | |
| 10,808,741 | B2 * | 10/2020 | Ahnert | B25B 5/08 |
| 10,951,157 | B1 | 3/2021 | Young et al. | |
| 11,251,743 | B2 * | 2/2022 | Schuit | H02S 20/23 |
| 11,296,648 | B1 | 4/2022 | Jasmin | |
| 11,313,591 | B1 * | 4/2022 | Atia | F24S 25/636 |
| 11,377,840 | B2 | 7/2022 | Stephan et al. | |
| 11,384,780 | B2 | 7/2022 | Katz | |
| 11,463,040 | B2 | 10/2022 | Affentranger, Jr. | |
| 11,575,345 | B2 | 2/2023 | Affentranger, Jr. | |
| 11,621,665 | B2 | 4/2023 | Jasmin | |
| 11,824,483 | B1 | 11/2023 | Affentranger, Jr. | |
| 12,074,558 | B2 | 8/2024 | Neal et al. | |
| 12,149,200 | B1 * | 11/2024 | Jasmin | H02S 20/23 |
| 12,179,710 | B2 * | 12/2024 | Morano | B60R 9/058 |
| 12,281,750 | B2 * | 4/2025 | Stephan | F24S 25/636 |
| 2004/0055233 | A1 | 3/2004 | Showalter | |
| 2008/0095591 | A1 | 4/2008 | Wu | |
| 2010/0276558 | A1 | 11/2010 | Faust et al. | |
| 2011/0247295 | A1 | 10/2011 | Stearns et al. | |
| 2011/0260027 | A1 * | 10/2011 | Farnham, Jr. | F24S 25/35 248/309.1 |
| 2013/0011187 | A1 | 1/2013 | Schuit et al. | |
| 2013/0133270 | A1 | 5/2013 | West et al. | |
| 2014/0042286 | A1 | 2/2014 | Jaffari | |
| 2014/0110543 | A1 | 4/2014 | Aliabadi et al. | |
| 2016/0043689 | A1 | 2/2016 | McPheeters et al. | |
| 2016/0060869 | A1 * | 3/2016 | Smeja | F24S 25/615 52/701 |
| 2016/0134230 | A1 | 5/2016 | Meine | |
| 2016/0204732 | A1 | 7/2016 | Thomas | |
| 2016/0226435 | A1 | 8/2016 | Almy et al. | |
| 2016/0248367 | A1 | 8/2016 | Almy et al. | |
| 2016/0248368 | A1 | 8/2016 | Seery et al. | |
| 2016/0248369 | A1 | 8/2016 | Almy | |
| 2016/0308487 | A1 | 10/2016 | Molina et al. | |
| 2016/0344338 | A1 | 11/2016 | Schutz et al. | |
| 2017/0102167 | A1 | 4/2017 | Stephan et al. | |
| 2017/0279403 | A1 | 9/2017 | Seery et al. | |
| 2018/0062571 | A1 | 3/2018 | Ash et al. | |
| 2018/0167023 | A1 | 6/2018 | Meine | |
| 2018/0266729 | A1 | 9/2018 | Dai | |
| 2018/0274238 | A1 | 9/2018 | Aliabadi et al. | |
| 2019/0068110 | A1 | 2/2019 | McPheeters | |
| 2019/0093340 | A1 | 3/2019 | Meine | |
| 2019/0131917 | A1 | 5/2019 | Tomolillo | |
| 2020/0116191 | A1 | 4/2020 | Uppu et al. | |
| 2020/0259448 | A1 | 8/2020 | Schuit et al. | |
| 2020/0309184 | A1 | 10/2020 | Schuit et al. | |
| 2020/0313604 | A1 * | 10/2020 | Harris | F16B 2/065 |
| 2021/0156413 | A1 | 5/2021 | Stephan et al. | |
| 2021/0285596 | A1 | 9/2021 | Affentranger, Jr et al. | |
| 2021/0285689 | A1 | 9/2021 | Affentranger, Jr. | |
| 2022/0099136 | A1 | 3/2022 | Meine et al. | |
| 2022/0173692 | A1 | 6/2022 | Schuit et al. | |
| 2023/0015441 | A1 * | 1/2023 | McPheeters | F16B 2/10 |
| 2023/0228372 | A1 | 7/2023 | Stephan | |
| 2024/0154570 | A1 * | 5/2024 | Stephan | H02S 30/10 |
| 2024/0227688 | A1 * | 7/2024 | Morano | F24S 25/636 |
| 2024/0360723 | A1 * | 10/2024 | La Valle | E06C 7/188 |

FOREIGN PATENT DOCUMENTS

| | | | |
|---|---|---|---|
| CN | 208797873 | | 4/2019 |
| CN | 112019135 | | 12/2020 |
| CN | 113794431 | A | 12/2021 |
| DE | 202011001761 | U1 | 4/2011 |
| DE | 202014102470 | U1 | 8/2014 |
| DE | 102020206810 | B3 | 8/2021 |
| EP | 3364124 | B1 | 8/2018 |
| JP | 2014163080 | A | 9/2014 |
| TW | 108306609 | | 7/2018 |
| WO | WO2023192199 | A2 | 10/2023 |

OTHER PUBLICATIONS

The Invitation to Pay Additional Fees for PCT Application No. PCT/US22/020821, filed Mar. 17, 2022, 2 pages.

Final Office Action for U.S. Appl. No. 17/697,668, mailed Feb. 7, 2024, 17 pages.

Office Action for U.S. Appl. No. 17/697,668, mailed on Aug. 8, 2023, 28 pages.

The PCT Search Report and Written Opinion mailed Jul. 27, 2022 for PCT Application No. PCT/US2022/020821, filed Mar. 17, 2022, 11 pages.

Search Report and Written Opinion for International Application No. PCT/US2025/019188, Dated May 6, 2025, 11 pages.

Search Report for European Application No. 22772235.2, Dated Nov. 4, 2024, 8 pages.

Office Action for U.S. Appl. No. 18/815,500, Dated Mar. 10, 2026, 15 pages.

* cited by examiner

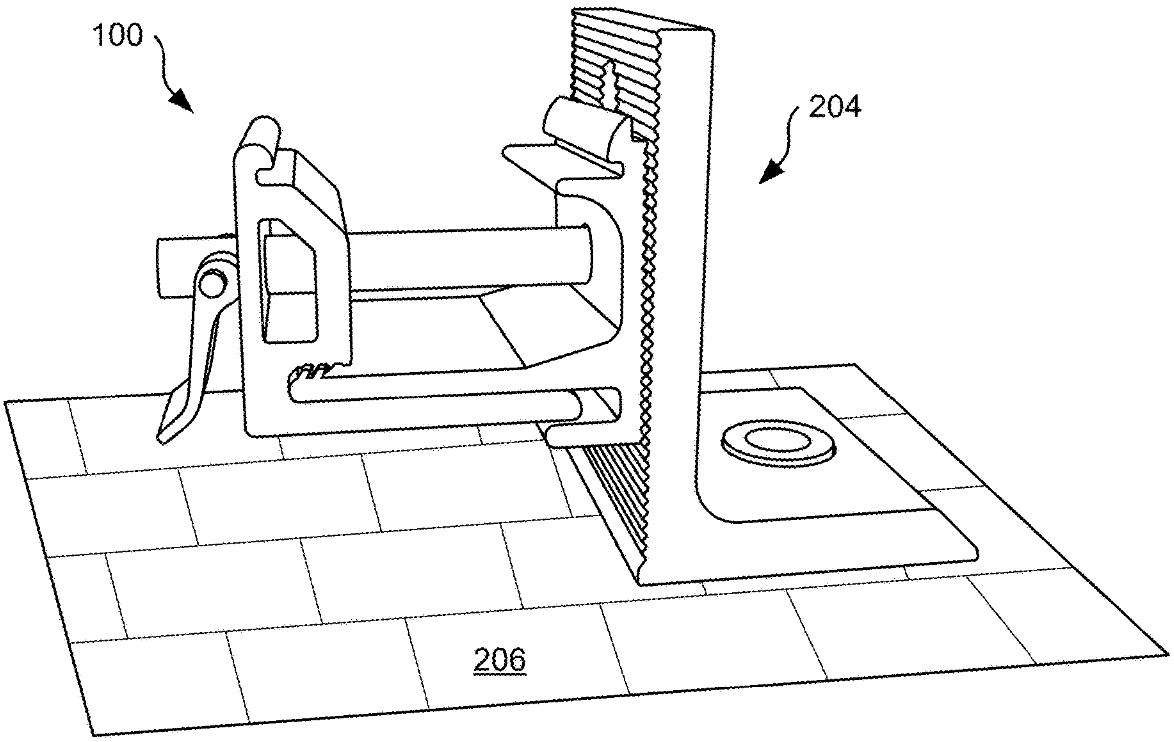
FIG. 2C
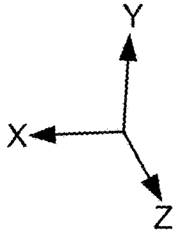

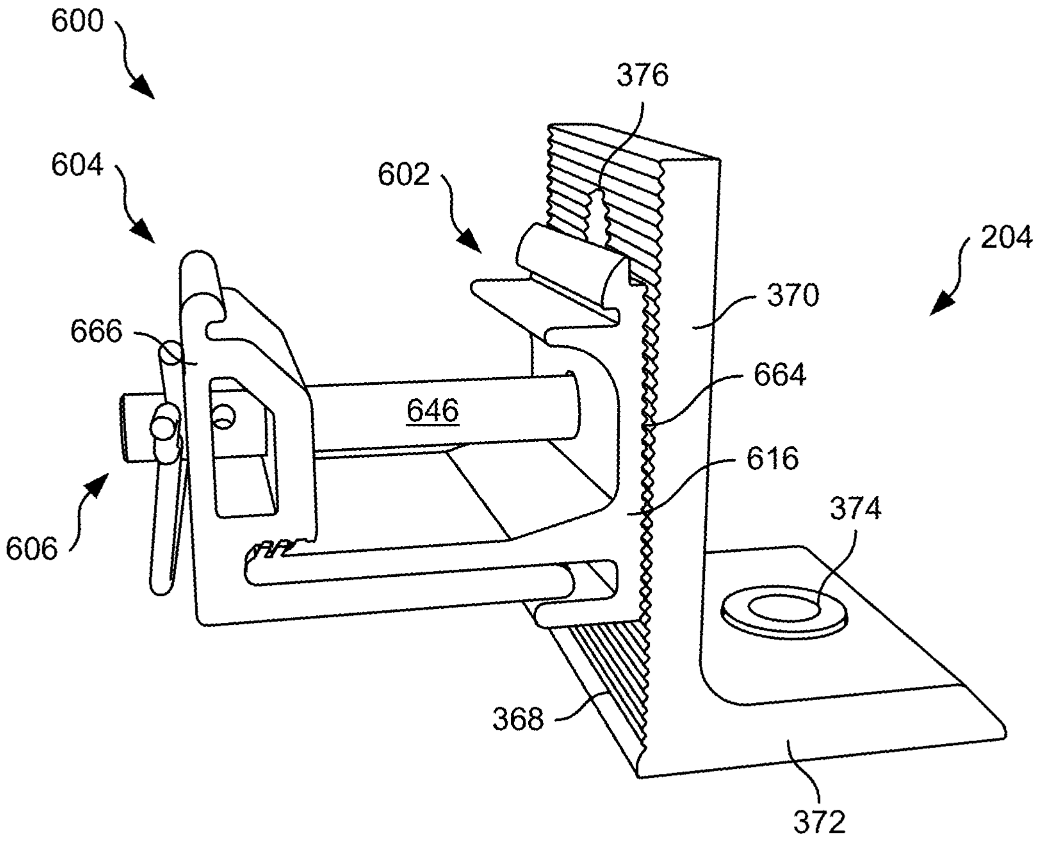
FIG. 6F
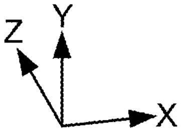

704
736
728
730
740
726
908
718
904
906
902
746
724
744
900

Y
Z
X 704
736
728
724
746
722
904
744

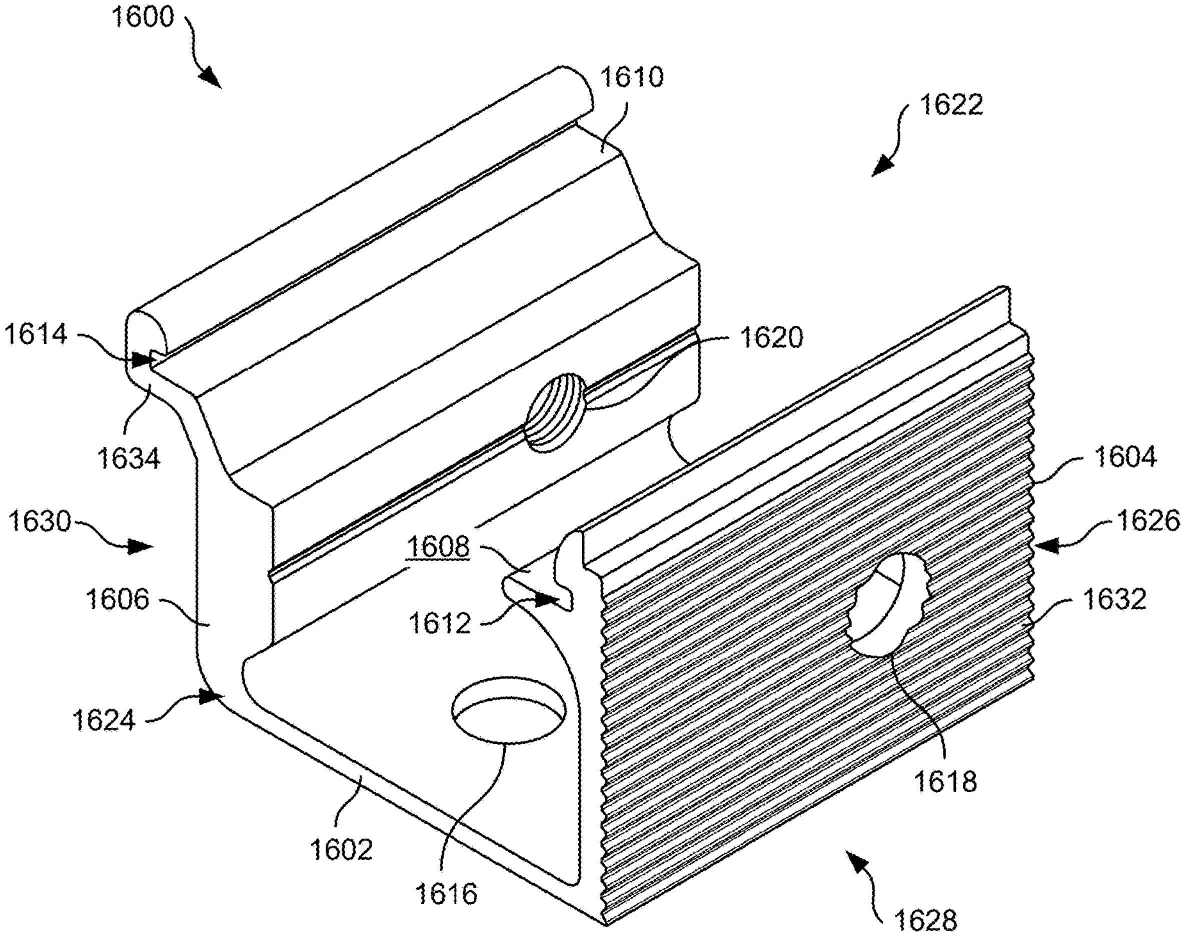
FIG. 16
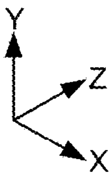

RAIL CLAMP FOR SOLAR PANEL MODULE

CROSS-REFERENCE TO RELATED APPLICATIONS

This application claims priority to U.S. Provisional Patent Application No. 63/568,897, filed Mar. 22, 2024, entitled "Multi-Body Clamp for Solar Panel Module Rail," the entirety of which is herein incorporated by reference.

BACKGROUND

The solar industry is growing world-wide and, as a result, more-efficient structures are desirable for mounting photovoltaic modules or solar panel modules to a structure, such as a roof of a home or other building. While different structures are known, there is a desire to reduce their complexity. Therefore, there is a need for improved equipment to mount solar panel modules.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

FIG. 2C illustrates a side view of an alternative mounting system coupled a surface, according to embodiments of the present disclosure.

FIG. 6F illustrates an alternate example of the clamp of FIG. 6A, according to embodiments of the present disclosure.

FIG. 16 illustrates another example clamp usable with the rail and the mount of FIG. 1, according to embodiments of the present disclosure.

DETAILED DESCRIPTION

Figure 1:
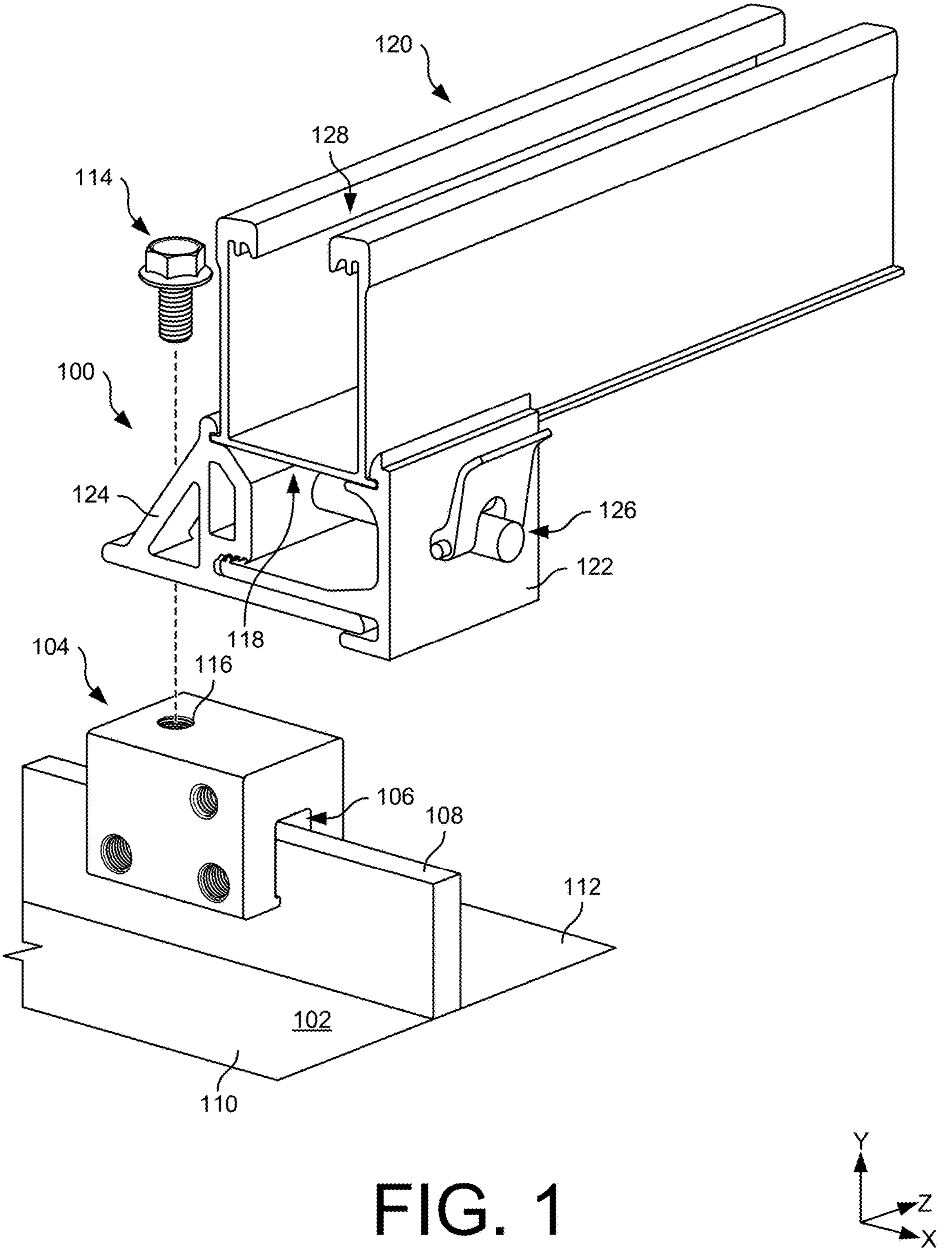
FIG. 1 illustrates an isometric partially exploded view of an example mounting system, including an example clamp to couple an example rail to an example mount for disposing the rail on a surface, according to embodiments of the present disclosure.

This application is directed, at least in part, to a mounting system for mounting solar panel modules to a roof or other surface, according to embodiments of the present disclosure. In an embodiment, the mounting system may include a clamp, a mount, and a rail. The clamp may couple to the mount and the rail. For example, the clamp may include a receptacle configured to receive the rail. One or more fastening mechanism(s) may be used to couple the rail to the clamp. Additionally, the clamp may couple to the mount and the mount may in turn be coupled to a surface, such as a roof, or components of the roof. For example, the mount may couple to, or along, a seam of a metal roof (e.g., standing seam) formed at an intersection between a first roofing panel and a second roofing panel. The solar panel modules may couple to the rail, whether directly or via one or more brackets, for securing the solar panel modules to the surface.

In an embodiment, the clamp includes a first body and a second body that couple together. The first body and the second body may represent separate parts, portions, frames, brackets, etc. of the clamp that couple together in order to secure the rail therebetween. In an embodiment, the first body and the second body may couple together via the one or more fastening mechanism(s). The fasting mechanism(s) may include fasteners (e.g., bolts, screws, etc.), a pin (e.g., clevis pin and cotter pin, etc.), levers (e.g., cam lever, etc.), and so forth. The use of levers, for example, may be used to eliminate the use of tools for coupling the rail to the clamp.

As introduced above, the clamp defines the receptacle that receives the rail. In an embodiment, the first body and the second body may define the receptacle. The fastening mechanism(s) are configured to clamp, or otherwise secure, the rail within the receptacle. In other words, the fastening mechanism(s) may bring the first body and the second body together, or hold the first body and the second body together, for securing the rail therebetween. For example, the rail may be placed into the receptacle in an unfastened, unclamped, or unsecured state of the clamp. Thereafter, the fastening mechanism(s) may be inserted, disposed through the first body and/or the second body, actuated (e.g., moved, tightened, etc.), etc. to secure the rail within the receptacle. In an embodiment, the fastening mechanism(s) are actuated to clamp, pinch, etc. the rail within the receptacle.

In an embodiment, the clamp defines flanges, shelves, lips, arms, projections, etc. that engage with corresponding flanges, shelves, lips, arms, etc. of the rail. For example, the first body may define a shelf and the second body may define a shelf on which the rail rests. Opposing sides of the rail may rest on the shelf of the first body and the second body, respectively. Additionally, the first body may define a flange and the second body may define a flange that engage with a first arm of the rail and a second arm of the rail, respectively. When the fastening mechanism(s) are tightened, for example, the flanges of the first body and the second body may engage with the first arm and the second arm, respectively, to secure the rail within the receptacle. Such engagement, for example, may prevent reorientation, repositioning, etc. of the rail within the receptacle.

The clamp may include a slot (e.g., through hole, opening, channel, etc.) for receiving a fastener that is used to couple the clamp to the mount. In an embodiment the slot may be defined by the first body or the second body. The fastener may be disposed through the slot and into a receptacle (e.g., threaded passage, etc.) of the mount. Through tightening of the fastener the clamp may be secured to the mount. Moreover, prior to tightening, the clamp may swivel about the fastener to change an orientation of the clamp relative to the mount.

The mount may define a passage that receives a least a portion of roofing material disposed on the surface. For example, as described above, the roof may include roofing panels, such as metal roofing panels, that couple together. At a seam between the roofing panels, such as the first roofing panel and the second roofing panel, the standing seam (e.g., a spline) may be formed. The standing seam may be disposed within the passage, and one or more fasteners, for example, may be used to couple the mount to the roof. For example, fasteners may be used to engage with the standing seam for coupling the mount to the roof. In an embodiment, the mount may be variably disposed along a length of the standing seam, for example, by sliding the mount along the standing seam. Once in a desired location, the fasteners may be tightened to secure the mount to the surface. Any number of fasteners may be used to secure the mount to the surface (or the roofing panels).

Although a certain type of roofing material is described, the surface may include other types of roofing material. For example, the surface may include any type of roofing, such as a metal roof with a standing seam, metal roofs without standing seams, composite shingle roofs, slate roofs, tiled roofs, and so forth. Moreover, the clamps may be used on surfaces other than roofs. In such instances, the mount and/or the clamp may be used to couple the solar panel modules to such surfaces. Moreover, in an embodiment, the mount and/or the clamp may be modified to couple the clamp to these different surfaces.

In an embodiment, the solar panel modules may couple to the rail via one or more brackets. In an embodiment, the rail may define a channel in which the one or more brackets are at least partially disposed. For example, the one or more brackets may be variably disposed along the channel and secured to the rail at a location within the channel. In an embodiment, fasteners, for example, may be used to secure the one or more brackets to the rail.

Although the clamp is described herein as including the receptacle for receiving the rail, in an embodiment, the solar panel modules may be coupled to the clamp in other manners (e.g., using fasteners, etc.). Moreover, in an embodiment, the solar panel modules may couple to the clamp directly, without the use of the rail. Alternatively, one or more mounts, brackets, etc., other than those described herein may be used to couple the solar panel modules to the clamp and/or the rail.

Additionally, in an embodiment, the clamp may couple directly to the surface, or other mounts, brackets, etc. For example, in an embodiment, the clamp may couple to an "L-foot" bracket, which in turn may be coupled directly to the surface or the mount. In an embodiment, the clamp (or a body thereof) may define one or more teeth that engage with one or more teeth of the "L-foot" bracket to enable the clamp to be adjustable in height relative to the surface. The fastening mechanism, or other fasteners, may be used to couple the "L-foot" bracket to the clamp. In an embodiment, the "L-foot" bracket may be used in conjunction with metal roofs having a standing seam. In embodiments where the clamp is used on other surfaces or roofing materials without a standing seam, other mounts may be used to couple the clamp to the surface, or the clamp may be coupled directly to the surface.

As introduced above, the clamp may include one or more separate components, parts, bodies, etc. For example, the clamp may be manufactured from multiple pieces (e.g., the first body and the second body) that couple together. In this sense, the clamp may represent a multi-piece design. However, in an embodiment, the clamp may be a single component and represent a single piece design. For example, the clamp may include a single (e.g., unitary) body. The clamp may be manufactured from suitable materials, such as composites, plastics, metal, etc. The clamp may be manufactured from any suitable techniques, such as extrusion, injection molding, etc.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example clamp 100 used to secure solar panel modules to a surface 102, according to embodiments of the present disclosure. Details of the clamp 100 are discussed herein, however, in an embodiment, the clamp 100 may be coupled to the surface 102 via a mount 104. For example, the mount 104 may define a passage 106 for receiving a portion of a roof. As shown in FIG. 1, a standing seam 108 may be located at an intersection and formed between a first roofing panel 110 and a second roofing panel 112 disposed on the surface 102 (or which form the roof). The surface 102 may be formed via the first roofing panel 110 and the second roofing panel 112. Fasteners, for example, may be used to secure the mount 104 to the first roofing panel 110 and the second roofing panel 112 at a location within the passage 106. Additionally, prior to fastening the fasteners, the mount 104 may be variably disposed along the standing seam 108 (e.g., by sliding the mount 104 along the X-axis, along the standing seam 108). The mount 104 may be variably disposed along the standing seam 108 in order to align with other mounts, brackets, rails, equipment, etc. disposed on the surface 102. Although the clamp 100 is shown being directly coupled to the mount 104, in an embodiment, one or more intermediary members may be used to couple the clamp 100 to the mount 104, vice versa.

In an embodiment, the clamp 100 may be secured to the mount 104 via a fastener 114. For example, the fastener 114 may be threaded into a hole 116 formed in a body of the mount 104. As will be explained herein, the clamp 100 includes a slot through which the fastener 114 is at least partially disposed for coupling the clamp 100 to the mount 104. Prior to fastening the fastener 114, the clamp 100 may swivel (e.g., about the Y-axis) and/or translate (e.g., along the X-axis) for adjusting a position of the clamp 100. Once the fastener 114 is tightened the clamp 100 may be secured to the mount 104 at a desired position.

The clamp 100 defines, or includes, a receptacle 118 for receiving a rail 120. In an embodiment, the receptacle 118 may be formed at least in part by a first body 122 and a second body 124 of the clamp 100. A fastening mechanism 126 (e.g., lever arm) may be used to at least partially secure the first body 122 and the second body 124 together, thereby forming the receptacle 118 for receiving the rail 120. Moreover, the fastening mechanism 126 may be used to secure the rail 120 within the receptacle 118. For example, actuating the fastening mechanism 126 may bring the first body 122 and the second body 124 together in order to clamp, pinch, etc. the rail 120 between the first body 122 and the second body 124. The rail 120 may move (e.g., along the Z-axis) within the receptacle 118 prior to fastening the fastening mechanism 126.

The solar panel modules (not shown) may be coupled to the rail 120 via one or more brackets (not shown). The one or more brackets may be variably disposed along a length of the rail 120 (e.g., in the Z-direction). For example, the rail 120 may define a channel 128 and the one or more brackets may be variably disposed along a length of the channel 128 at a location within the channel 128. However, although described in use with a rail, other brackets, mounts, clamps, etc. may be coupled to the clamp 100. Moreover, the rail 120 may be any length, may span between adjacent mounts 104, clamps, etc. used to couple the solar panel modules to the surface 102, etc.

Additionally, although the clamp 100 is shown and described as being used to couple the rail 120 to the surface 102, for example, via the mount 104, as will be discussed herein, alternative clamps may be coupled to the mount 104 for securing the rail 120 to the surface 102.

Figure 2A:
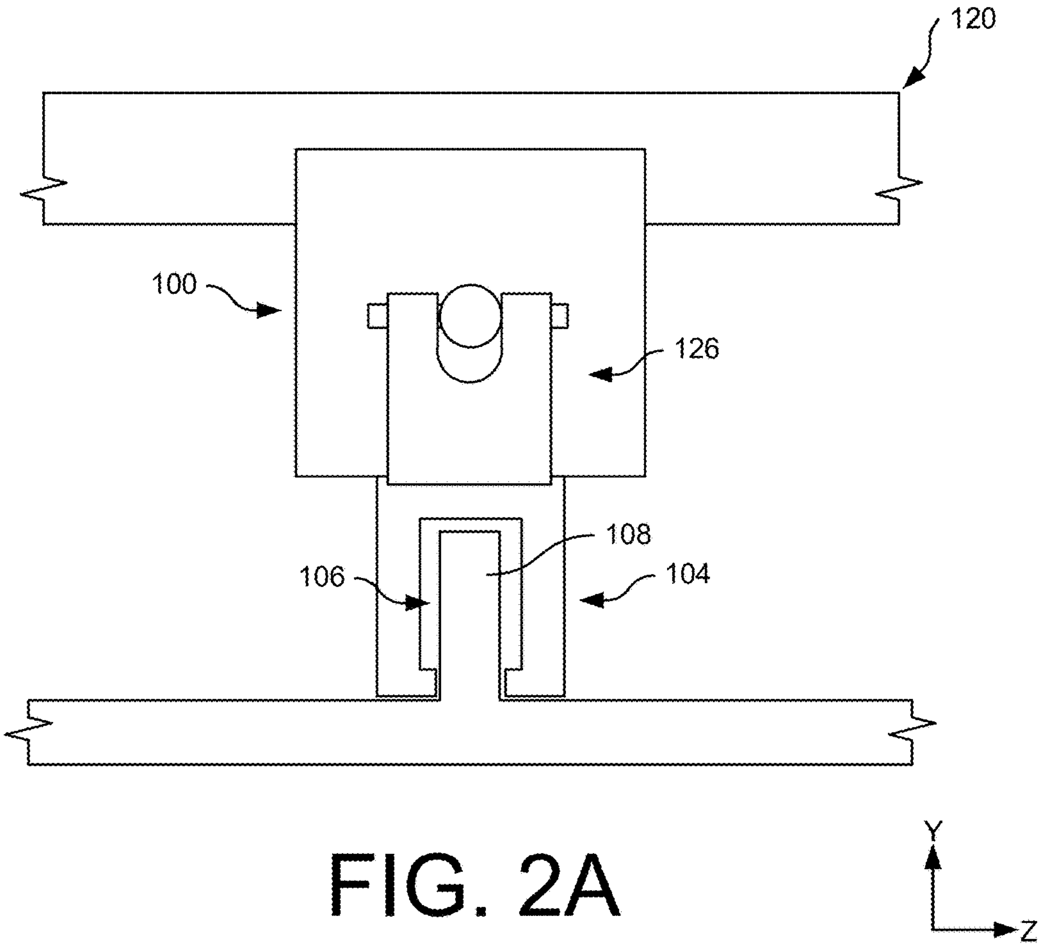
FIG. 2A illustrates a first side view of the mounting system of FIG. 1, according to embodiments of the present disclosure.
Figure 2B:
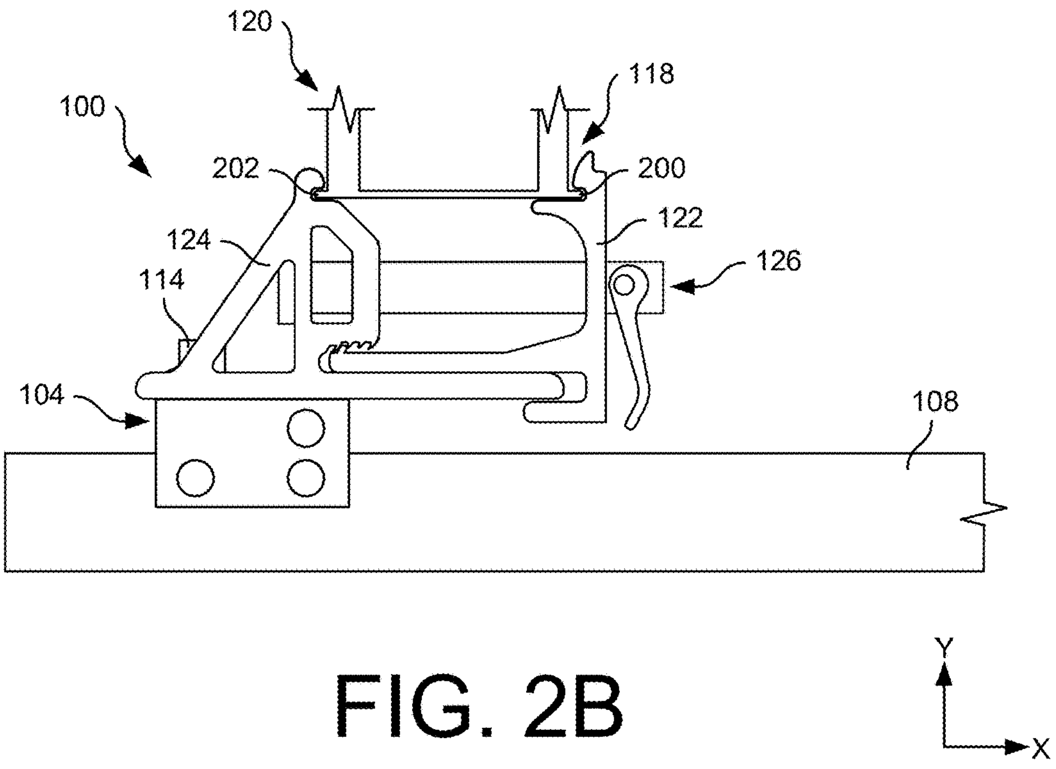
FIG. 2B illustrates a second side view of the mounting system of FIG. 1, according to embodiments of the present disclosure.

FIGS. 2A and 2B illustrate details of a coupling between the clamp 100, the mount 104, the standing seam 108, and the rail 120, according to examples of the present disclosure. As introduced above, the clamp 100 may define the receptacle 118 for at least partially receiving the rail 120. In an embodiment, the rail 120 may include a first arm 200 and a second arm 202 that engage with features, such as flanges, shelves, lips, etc. of the clamp 100 for securing the rail 120 within the receptacle 118. Such engagement may prevent repositioning, reorientation, etc. of the rail 120 (and therefore the solar panel modules) once secured within the receptacle 118.

In an embodiment, the rail 120 may be inserted into the receptacle 118 in an unclamped, unsecured, unlocked, unfastened, etc. state of the clamp 100. However, the clamp 100 includes the fastening mechanism 126 (e.g., fastener, lever, pin, etc.) that secures the rail 120 within the receptacle 118. The clamp 100 may therefore have a clamped, secured, locked, or fastened state to secure the rail 120 within the clamp 100. In an embodiment, the view of the clamp 100 in FIGS. 2A and 2B may represent the clamped state. During transitioning of the clamp 100 from the unclamped state to the clamped state, halves, portions, bodies, etc. may be brought together to secure the rail 120 within the receptacle 118.

For example, when the fastening mechanism 126 is actuated (e.g., pushed, pulled, tightened, etc.), the rail 120 may be clamped, squeezed, etc. within the clamp 100. Prior to fastening the rail 120 to the clamp 100, the rail 120 may also be positioned within the receptacle 118 (e.g., in the Z-direction). In an embodiment, the rail 120 may be snapped into the receptacle 118 prior to the fastening mechanism 126 being used to secure the rail 120 within the receptacle 118. The fastening mechanism 126 may transition between the unclamped and clamped state to permit reorientation, reposition, etc. of the rail 120.

The mount 104 includes the passage 106 in which the standing seam 108 formed by the first roofing panel 110 and the second roofing panel 112 are disposed. The mount 104 may be variably disposed along the standing seam 108 (e.g., in the X-direction) to dispose the clamp 100 and the rail 120, for example, at different locations. Once a desired position is achieved, fasteners may be tightened to secure the mount 104 to the standing seam 108. In an embodiment, the mount 104 includes features (e.g., flanges, arms, etc.) that engage with features (e.g., flanges, arms, etc.) of the standing seam 108 to prevent inadvertent removal of the mount 104 from the standing seam 108, to further secure the mount 104 to the standing seam 108, and so forth.

Although described herein as being used in conjunction with the first roofing panel 110 and the second roofing panel 112 that form the standing seam 108, the clamp 100 may be secured to other mounts, brackets, etc. Moreover, the mount 104 may include alternative features for engaging with the standing seam 108, or alternative features for engaging with different types of roofs (e.g., ceramic). Additionally, although a particular rail is shown coupling to the clamp 100 (or other clamps as described herein), alternative rails may be used. In such instances, the first body 122 and the second body 124 may include features to engage with the rail in order to secure the rail within the receptacle 118, for example.

Figure 3A:
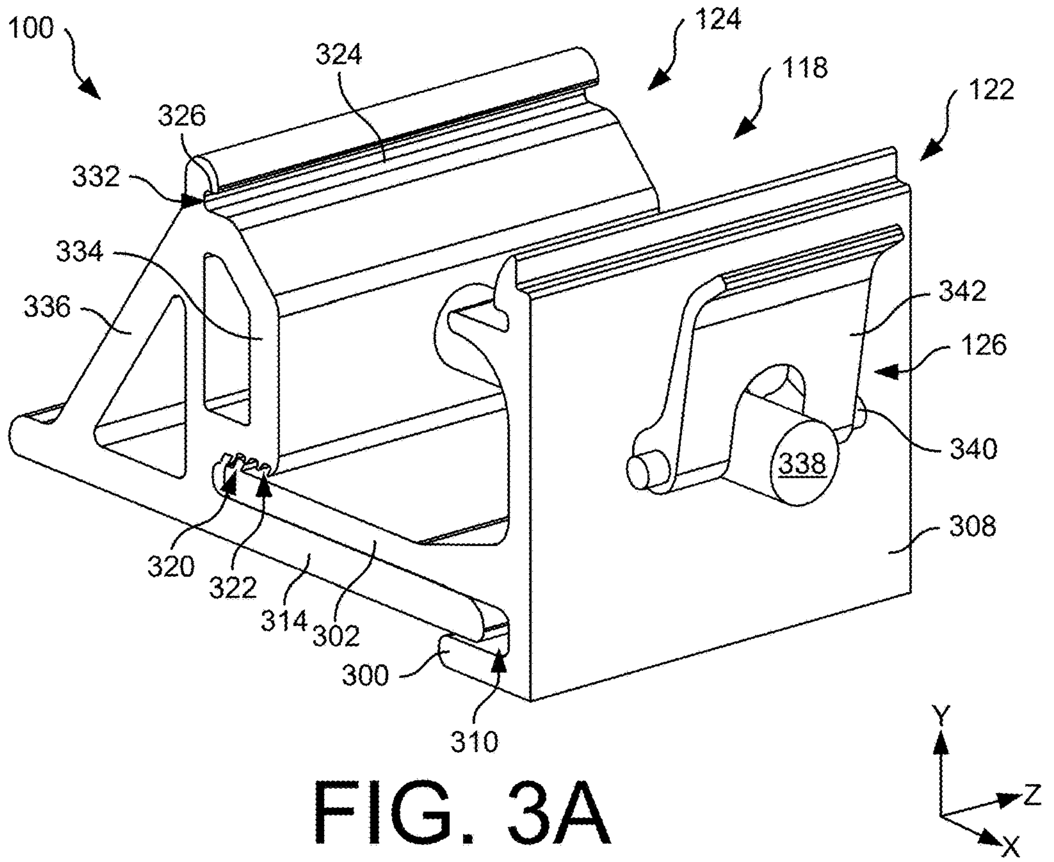
FIG. 3A illustrates a first isometric view of the clamp of FIG. 1, according to embodiments of the present disclosure.
Figure 3B:
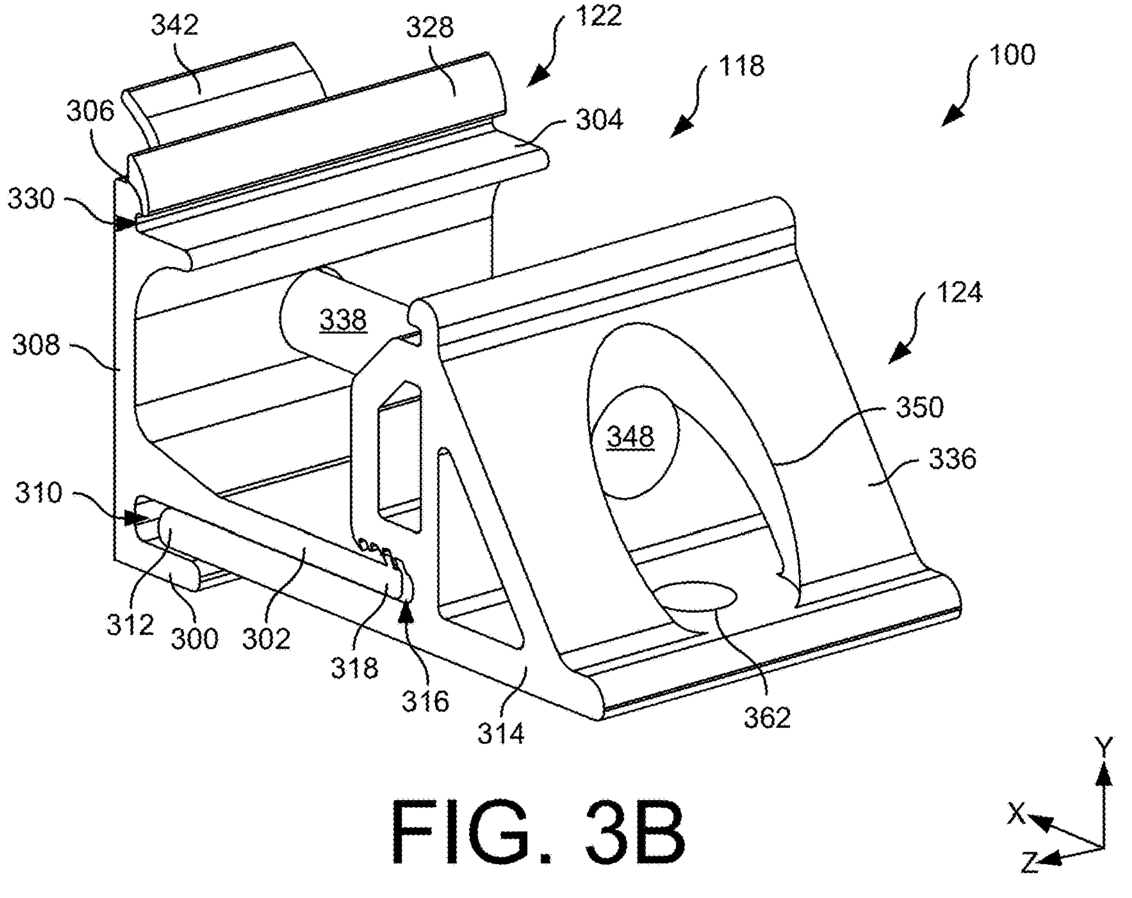
FIG. 3B illustrates a second isometric view of the clamp of FIG. 1, according to embodiments of the present disclosure.
Figure 3C:
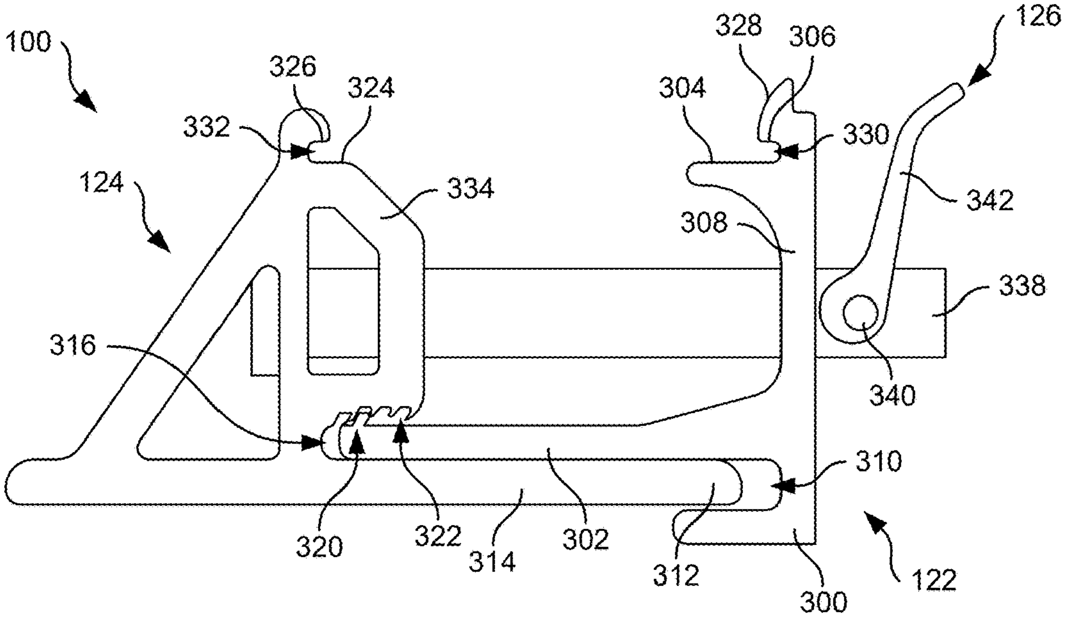
FIG. 3C illustrates a side view of the clamp of FIG. 1, according to embodiments of the present disclosure.
Figure 3D:
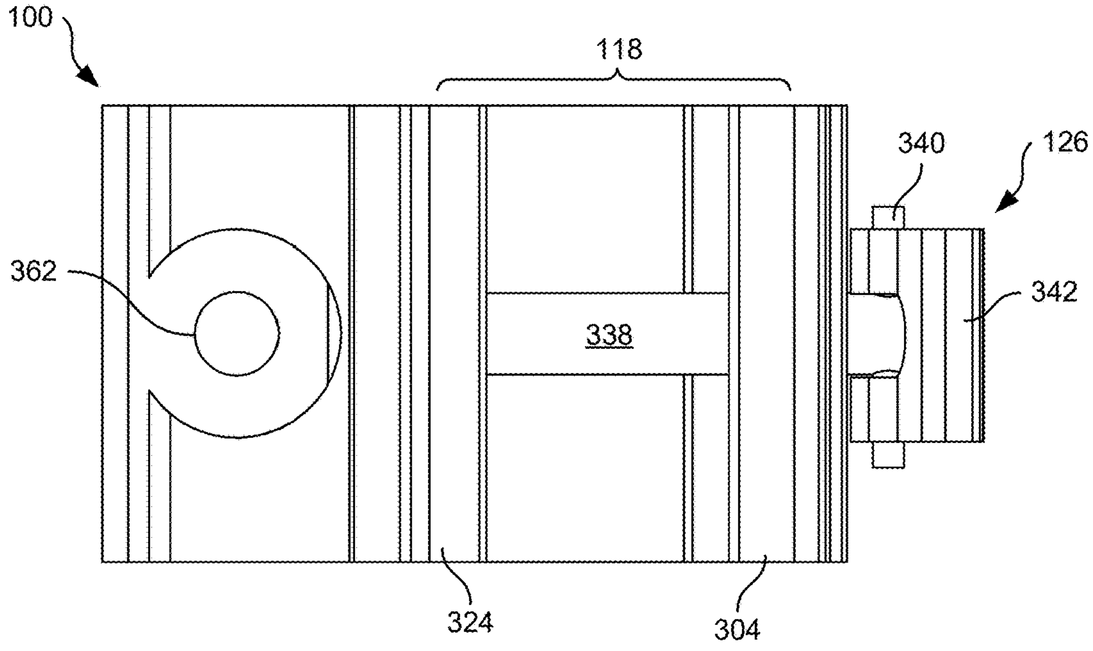
FIG. 3D illustrates a top view of the clamp of FIG. 1, according to embodiments of the present disclosure.
Figure 3E:
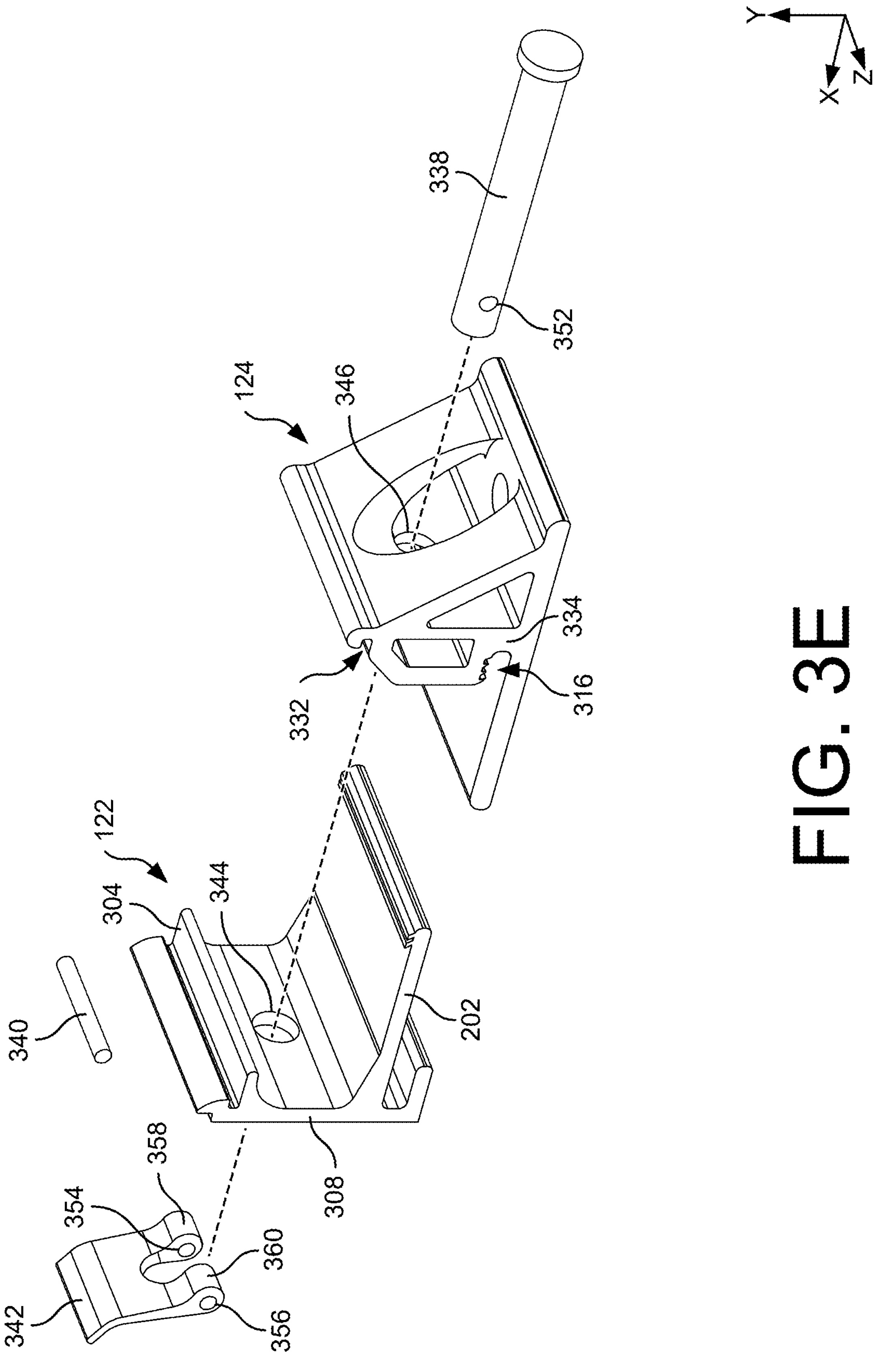
FIG. 3E illustrates an exploded view of the clamp of FIG. 1, according to embodiments of the present disclosure.
Figure 3F:
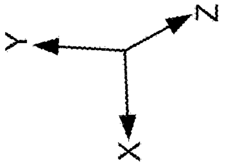
FIG. 3F illustrates an alternate example of the clamp of FIG. 1, according to embodiments of the present disclosure.
Figure 3F:
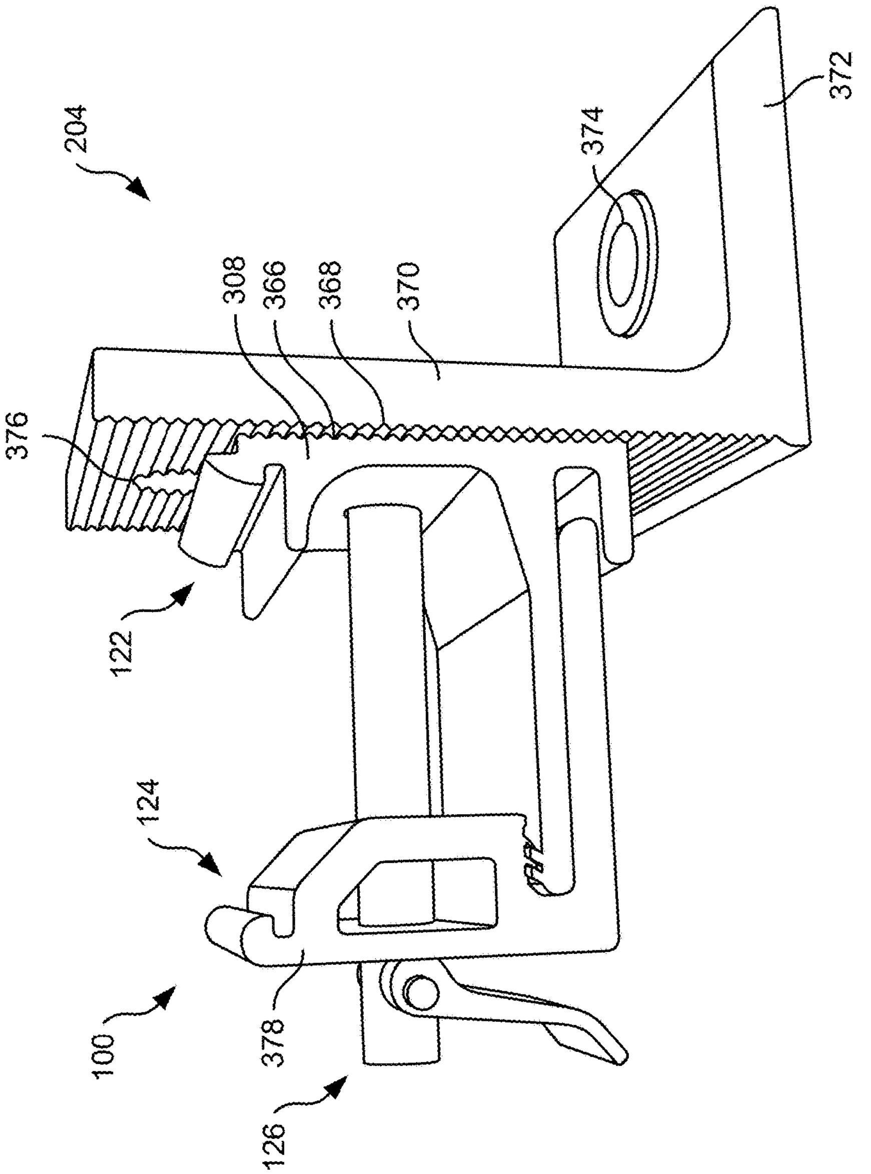

FIG. 2C illustrates an alternative embodiment of the clamp 100, for example, where the clamp 100 may couple to an "L-foot" or other bracket 204, according to examples of the present disclosure. Details of the bracket 204 are discussed herein, for example, with regard to FIG. 3F. Additionally, details of the clamp 100, for coupling to the bracket 204, are discussed herein with regard to FIG. 3F. However, as shown, the clamp 100 may couple to the bracket 204. In an embodiment, the bracket 204 may be coupled directly to a surface 206, or may be coupled to the surface 206 via the mount 104, mounts other than the mount 104, etc. The surface 206 may be different than the surface 102. For example, the surface 206 may include a composite shingle roof, as compared to a metal roof having the standing seam 108 (as shown in FIGS. 1A-2B). Although the surface 206 is shown as a composite shingle surface, the bracket 204 may be used to couple the clamp 100, whether directly or indirectly, to other types of surfaces or roofing material (e.g., tile roofs, metal roofs without standing seams, etc.). Accordingly, the clamp 100, as well as the other clamps described herein, may not be limited to metal roofs with standing seams.

FIGS. 3A-3F illustrate details of the clamp 100, according to examples of the present disclosure. In an embodiment, the clamp 100 may include the first body 122, the second body 124, and the fastening mechanism 126 that couples the first body 122 and the second body 124 together.

The first body 122 may include a first arm 300, a second arm 302, a shelf 304, and a flange 306. In an embodiment, the first arm 300, the second arm 302, the shelf 304, and/or the flange 306 extend from a sidewall 308 of the first body 122. In an embodiment, the first arm 300 and the second arm 302 may extend transverse from the sidewall 308. In an embodiment, the second arm 302 may extend from the sidewall 308 of the first body 122 by a greater distance as compared to the first arm 300. The first arm 300 and the second arm 302 define a first channel 310 in which an end 312 of an arm 314 of the second body 124 is at least partially received. For example, the end 312 of the arm 314 may be slid into the first channel 310 (e.g., in the X-direction), so as to be disposed in between the first arm 300 and the second arm 302 (e.g., in the Y-direction). In an embodiment, the engagement between the arm 314 and the first channel 310, or the positioning of the arm 314 within the first channel 310, may orient, seat, position, etc. the first body 122 and the second body 124 relative to one another. Moreover, the second arm 302 may at least partially engage (e.g., rest on) the arm 314 of the second body 124. As will be explained herein, during actuation of the fastening mechanism 126, the arm 314 may be further disposed in the first channel 310 (e.g., urged into the first channel).

The second arm 302 may be at least partially disposed in a first channel 316. For example, an end 318 of the second arm 302 may be disposed in the first channel 316. In an embodiment, the second arm 302 may include features that engage with features within the first channel 316 formed in the second body 124. For example, the second arm 302 may include one or more teeth 320 (e.g., rib, projections, keys, etc.) that engage with notches 322 (e.g., grooves, indents, keyways, etc.) disposed within the first channel 316. The engagement between the teeth 320 and the notches 322 may further secure the first body 122 and the second body 124 together, thereby preventing disengagement between the first body 122 and the second body 124 and securing the rail 120 within the receptacle 118. The teeth 320 may be disposed on the end 318 of the second arm 302.

When placed in the receptacle 118, the rail 120 may rest on the shelf 304. Moreover, the second body 124 additionally includes a shelf 324 on which the rail 120 rests. Additionally, the flange 306 may engage with the first arm 200 and a flange 326 of the second body 124 may engage with the second arm 202 to secure the rail 120 within the receptacle 118. In an embodiment, the first body 122 includes a taper 328 formed in a surface of the first body 122 (e.g., curved profile) that allows the first arm 200 to snap into engagement with the rail 120 (e.g., as the rail 120 is pushed in the Y-direction into the receptacle 118).

The first body 122 may further define a second channel 330 disposed between the shelf 304 and the flange 306. The first arm 200 of the rail 120 may be at least partially disposed within the second channel 330. The second body 124 may define a second channel 332 disposed between the shelf 324 and the flange 326. The second arm 202 of the rail 120 may be at least partially disposed within the second channel 332.

The positioning of the first arm 200 and the second arm 202 in the second channel 330 and the second channel 332, respectively, may prevent the rail 120 being removed from the receptacle 118 (e.g., in the Y-direction).

The second body 124 includes a sidewall 334 and a strut 336. The sidewall 334 may extend from the arm 314 (e.g., transversely), and the strut 336 may be disposed between the sidewall 334 and the arm 314. In an embodiment, the shelf 324 and the flange 326 are disposed on the sidewall 334, and the sidewall 334 may at least partially define the first channel 316, the notches 322 for mating with the teeth 320, and the second channel 332.

The fastening mechanism 126 couples the first body 122 and the second body 124 together to secure the rail 120 within the receptacle 118. As shown, the first body 122 and the second body 124 may include passages, channels, etc. through which portions of the fastening mechanism 126 is disposed. In an embodiment, the fastening mechanism 126 may include a pin 338, a shaft 340 (e.g., pin, rod, etc.), and a lever 342. The pin 338 may be disposed through the first body 122 and the second body 124 via an opening 344 and an opening 346, respectively. The opening 344 may be disposed through the sidewall 308, at a location between the second arm 202 and the shelf 304. The opening 346 may be disposed through the sidewall 334, at a location between the first channel 316 and the second channel 332. As shown, the pin 338 may include a head 348 that is disposed adjacent to the opening 346, which prevents the pin 338 being pulled through the opening 346. The second body 124, or the strut 336, may define a cutout 350 for permitting insertion of the pin 338 through the opening 346.

The pin 338 defines a passageway 352 through which the shaft 340 is disposed for coupling the lever 342 to the pin 338. For example, the passageway 352 of the pin 338 may be aligned with a first passageway 354 and a second passageway 356 disposed through the lever 342, and thereafter, the shaft 340 may be disposed through the first passageway 354, the passageway 352, and the second passageway 356 for coupling the lever 342 to the pin 338. For example, the lever 342 may hingedly couple to the pin 338 via the shaft 340. In an embodiment, the pin 338 may define more than one of the passageway 352 to accommodate different sizes of rails. For example, adjusting a position of the lever 342 along a length of the pin 338 (e.g., in the X-direction) may accommodate smaller or larger rails.

The lever 342 includes a first end and a second end spaced apart from the first end. The first end may have a flange, lip, handle, etc. for being grasped otherwise engaged by a user. The second end may define the first passageway 354 and the second passageway 356. In an embodiment, the lever 342 may represent a cam lever. When the lever 342 is rotated, the cam may shift position and exerts a force against an adjoining surface. For example, the second end of the lever 342 may include a first cam 358 (or a cam surface) and a second cam 360 (or a cam surface) that abuts against a surface of the first body 122 (e.g., the sidewall 308). Through this force, the first body 122 and the second body 124 may be urged together to secure the rail 120 within the receptacle 118.

In FIGS. 3A-3E, the lever 342 is shown in an upright position, which may correspond to an unclamped state of the clamp 100. After the rail 120 is inserted into the receptacle 118, the lever 342 may be moved in a first direction (e.g., about the Z-axis) from the unclamped state to a clamped state in order to secure the rail 120 within the receptacle 118. As the lever 342 moves to the clamped state, the first cam 358 and the second cam 360 act on a surface of the sidewall 308 and bring the first body 122 and the second body 124 into engagement, or into further engagement (e.g., in the X-direction). For example, during actuation of the lever 342, a distance disposed between the first body 122 and the second body 124 may decrease, thereby locking the rail 120 into engagement with the clamp 100. Moreover, during engagement, the teeth 320 may engage (e.g., interlock) with the notches 322. In an embodiment, the lever 342 may be directed downward towards the clamped state (e.g., the first end of the lever 342 may be disposed more proximate to the surface 102 than the second end of the lever 342) to permit an inadvertent unclamping of the rail 120 (e.g., branch, animals, etc. weighing the lever 342 downward). For example, in FIG. 3F, the clamp 100 is shown in the clamped state. Conversely, the lever 342 may be moved in a second direction (e.g., about the Z-axis), opposite the first direction, from the clamped state to the unclamped state.

The second body 124 further defines a slot 362 (e.g., opening, passage, hole, etc.) through which the fastener 114 is disposed for coupling the clamp 100 to the mount 104. The slot 362 may be disposed through the arm 314.

Although described herein as including certain components, the first body 122 and/or the second body 124 may include additional struts, supports, etc. for providing strength, alignment with one another, alignment with the mount 104, and so forth. The first body 122, the second body 124, and the fastening mechanism 126 may be manufactured from suitable materials (e.g., metal, plastic, etc.) and may be manufactured using any suitable manufacturing techniques (e.g., extrusion, injection molding, etc.).

In an embodiment, the clamp 100 may couple to an "L-foot" or other bracket 204 for coupling to the mount 104, the surface 102, the surface 206 (as shown and described in FIG. 2C), or other surfaces. For example, in FIG. 3F, a variation of the clamp 100 is shown whereby the sidewall 308 of the first body 122 may define one or more teeth 366 (e.g., ridges, grooves, ribs, etc.). The one or more teeth 366 may engage (e.g., interlock) with one or more teeth 368 of the bracket 204. The one or more teeth 366 and the one or more teeth 368 may be variably engaged to adjust a height of the clamp 100 (e.g., in the Y-direction) or a portion of the clamp 100 on the bracket 364. The bracket 204 may include a sidewall 370 that defines the one or more teeth 368, and a base 372 having an aperture 374. A fastener (not shown) may be disposed through the aperture 374 and into the hole 116 of the mount 104. Alternatively, the fastener may be disposed through the aperture 374 and directly into the surface 102, the surface 206, or other surfaces. Moreover, the sidewall 370 includes a slot 376 through which the fastening mechanism 126 is disposed for coupling the clamp 100, or the first body 122 and the second body 124, to the bracket 204. The second body 124 may also include a sidewall 378 (e.g., in lieu of the sidewall 334 and the strut 336) engaged by the fastening mechanism 126.

FIGS. 4A-4F illustrate a clamp 400, according to examples of the present disclosure. In an embodiment, the clamp 400 may include a first body 402, a second body 404, and a fastening mechanism 406 that couples the first body 402 and the second body 404 together.

The clamp 400, in an embodiment, may be similar to the clamp 100 as discussed above. For example, the first body 402 may include a first arm 408, a second arm 410, a shelf 412, and a flange 414. In an embodiment, the first arm 408, the second arm 410, the shelf 412, and/or the flange 414 extend from a sidewall 416 of the first body 402. In an embodiment, the first arm 408 and the second arm 410 may extend transverse from the sidewall 416.

The first arm 408 and the second arm 410 define a first channel 418 in which an end 420 of an arm 422 of the second body 404 is at least partially disposed. For example, the end 420 of the arm 422 may be slid into the first channel 418 (e.g., in the X-direction), so as to be disposed in between the first arm 408 and the second arm 410 (e.g., in the Y-direction). The second arm 410 may be disposed a greater distance away from the sidewall 416 of the first body 402 as compared to the first arm 408.

Moreover, the second arm 410 may at least partially engage (e.g., rest on) the arm 422 of the second body 404. The second body 404 may also define a first channel 424 in which an end 426 of the second arm 410 is disposed. In an embodiment, the engagement between the arm 422 and the first channel 418, as well as the engagement between the second arm 410 and the first channel 424, may orient, seat, position, etc. the first body 402 and the second body 404 relative to one another. As will be explained herein, during actuation of the fastening mechanism 406, the arm 422 may be further disposed in the first channel 418 and the second arm 410 may be further disposed in the first channel 424.

The clamp 400 includes a receptacle 428 formed at least in part by the first body 402 and the second body 404 for receiving the rail 120. When placed in the receptacle 428, the rail 120 may rest on the shelf 412, as well as a shelf 430 defined by the second body 404. Additionally, the flange 414 may engage with the first arm 200 and a flange 432 of the second body 404 may engage with the second arm 202. In an embodiment, the first body 402 includes a taper 434 formed in a surface of the first body 402 that allows the first arm 200 to snap into engagement with the rail 120 (e.g., as the rail 120 is pushed in the Y-direction into the receptacle 428). The first body 402 may further define a second channel 436 disposed or formed by the shelf 412 and the flange 414, for receiving the first arm 200 of the rail 120. Similarly, the second body 404 may define a second channel 438 disposed or formed by the shelf 430 and the flange 432 for receiving the second arm 202 of the rail 120.

The second body 404 includes a sidewall 440 and a strut 442. The sidewall 440 may extend from the arm 422 (e.g., transversely), and the strut 442 may be disposed between the sidewall 440 and the arm 422. In an embodiment, the shelf 430 and the flange 432 are disposed on the sidewall 440, and the sidewall 440 may at least partially form the first channel 424 and the second channel 438.

The fastening mechanism 406 couples the first body 402 and the second body 404 together to secure the rail 120 within the receptacle 428. As shown, the first body 402 and the second body 404 may include passages, channels, etc. through which portions of the fastening mechanism 406 is disposed. In an embodiment, the fastening mechanism 406 may represent a fastener (e.g., bolt, screw, etc.). The fastener 114 may be disposed through the first body 402, via an opening 444, and may be threaded into an opening 446 (e.g., socket) of the second body 404. Alternatively, in an embodiment, a nut may be secured to the fastening mechanism 406 to couple the first body 402 and the second body 404 together. The opening 444 may be disposed through the sidewall 416 at a location between the second arm 410 and the shelf 412. The opening 446 may be located on the sidewall 440 at a location between the first channel 424 and the shelf 430.

Figure 4A:
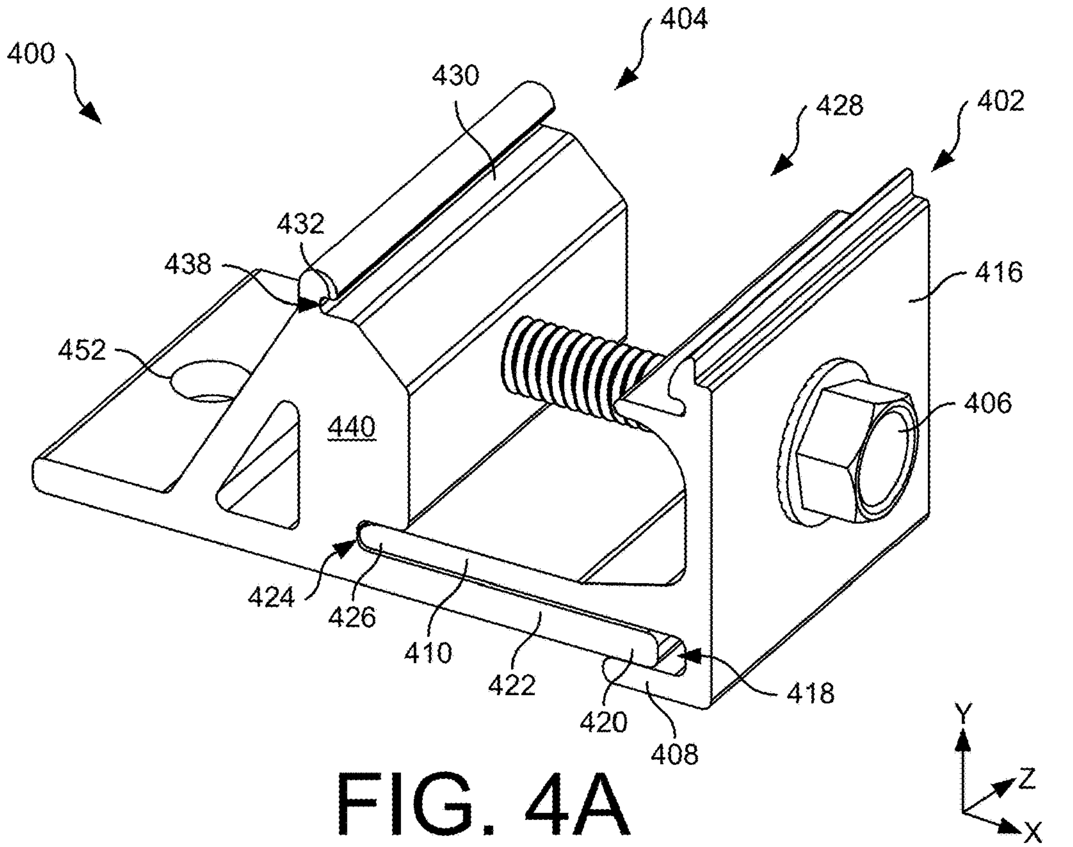
FIG. 4A illustrates a first isometric view of another example clamp usable with the rail and mount of FIG. 1, according to embodiments of the present disclosure.
Figure 4B:
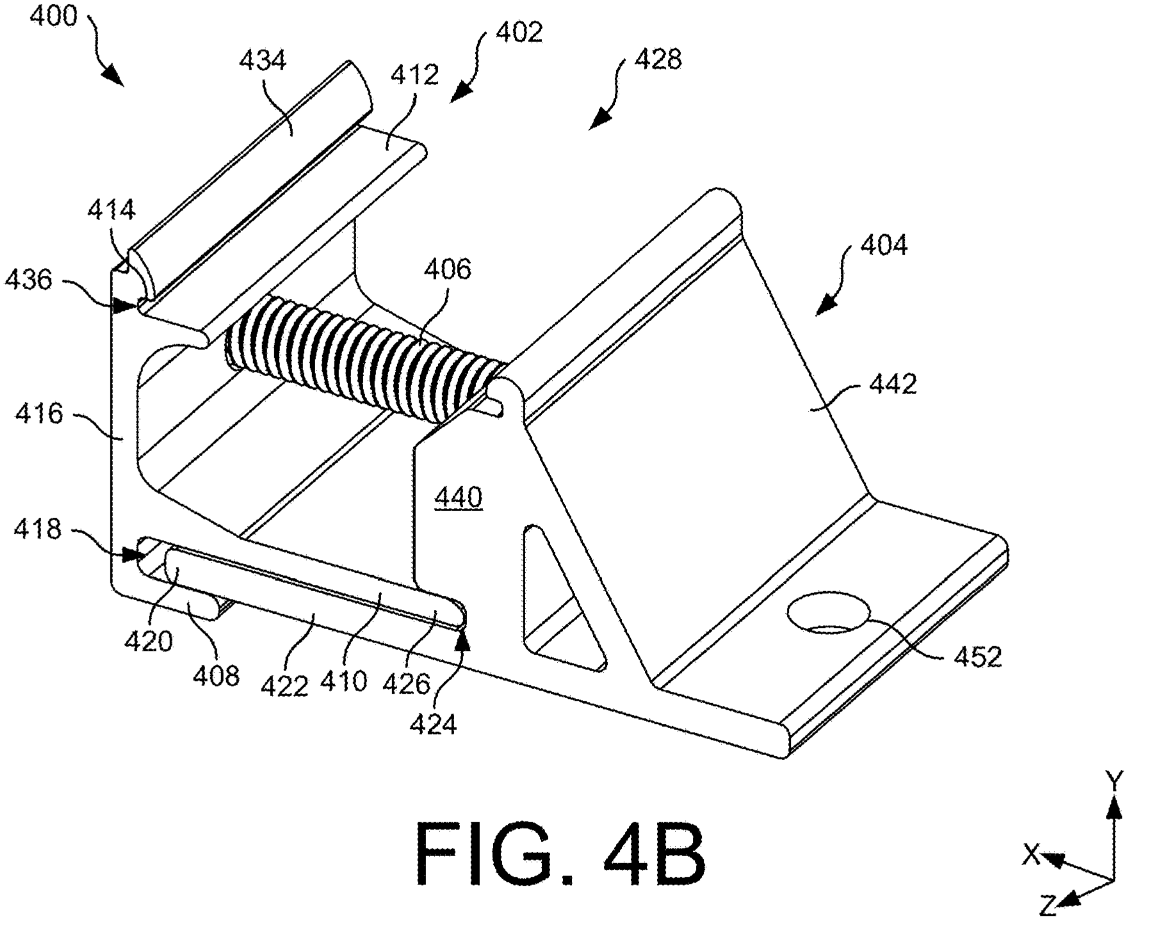
FIG. 4B illustrates a second isometric view of the clamp of FIG. 4A, according to embodiments of the present disclosure.
Figure 4C:
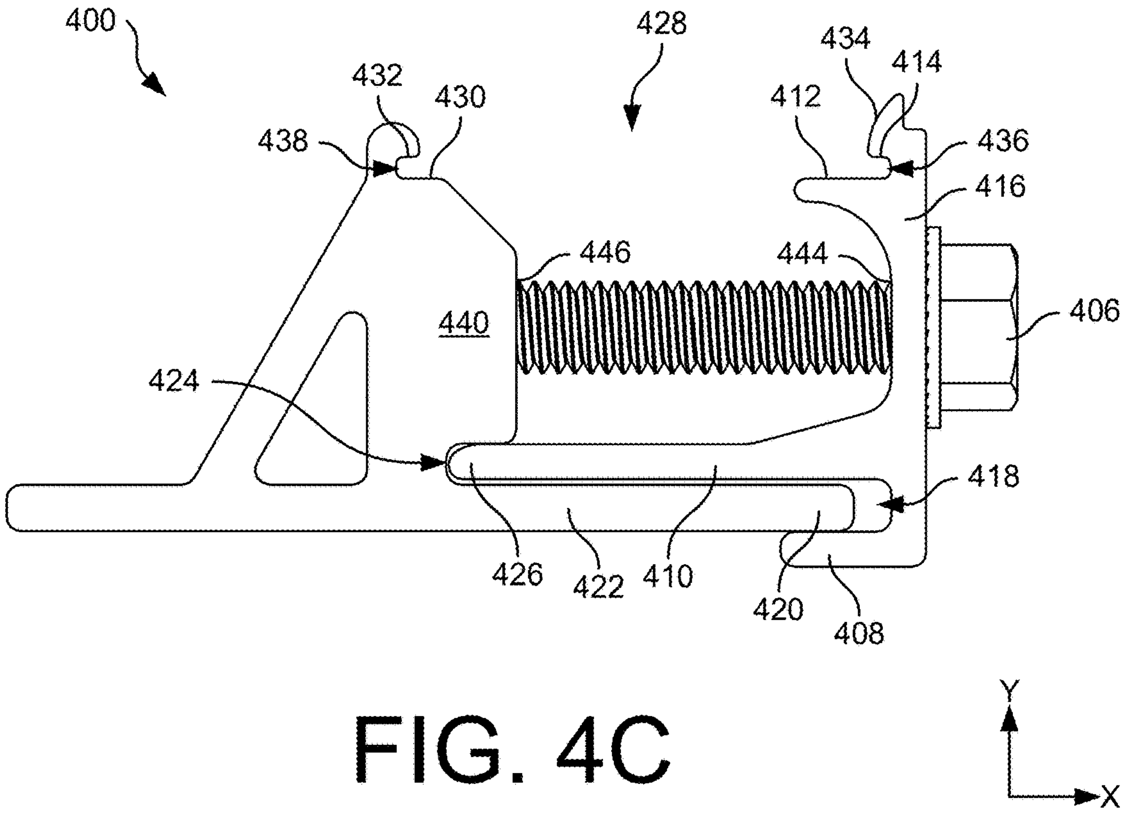
FIG. 4C illustrates a side view of the clamp of FIG. 4A, according to embodiments of the present disclosure.
Figure 4D:
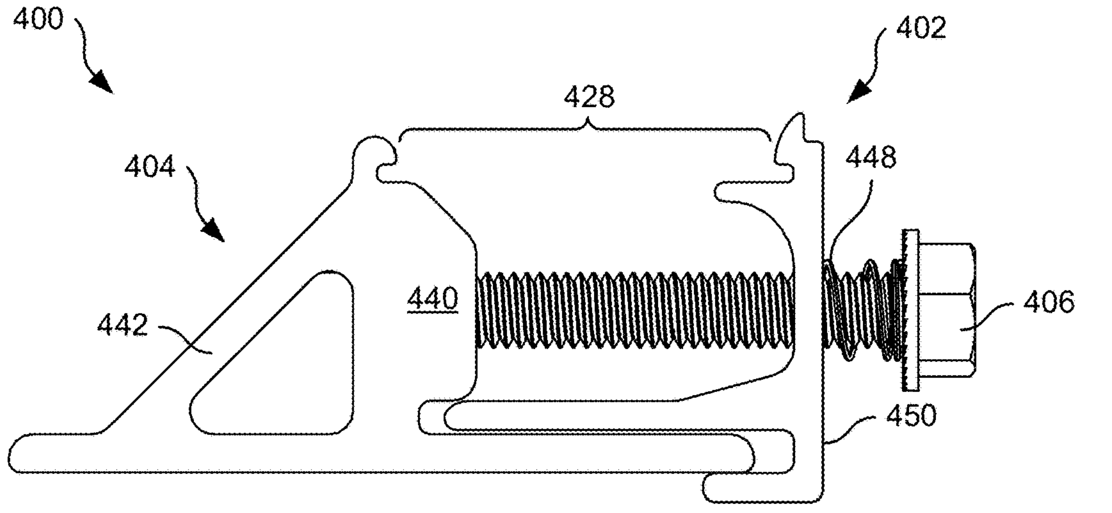
FIG. 4D illustrates a side view of the clamp of FIG. 4A, showing a variation of the clamp, according to embodiments of the present disclosure.
Figure 4E:
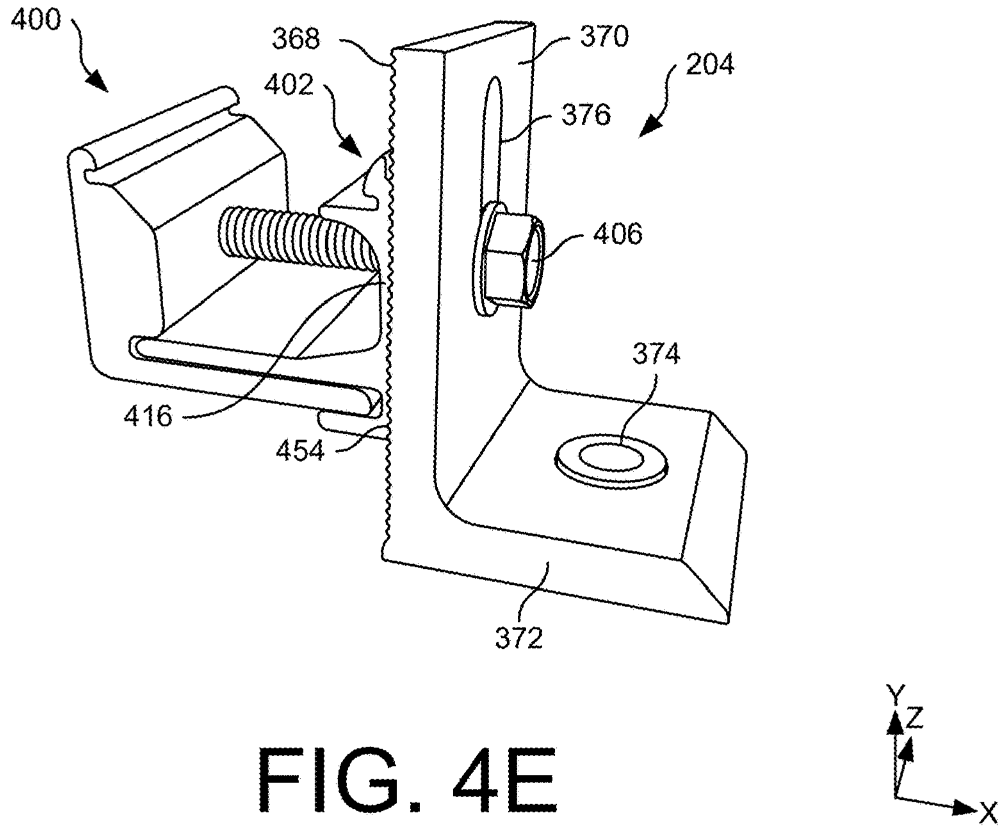
FIG. 4E illustrates an alternate example of the clamp of FIG. 4A, according to embodiments of the present disclosure.
Figure 4F:
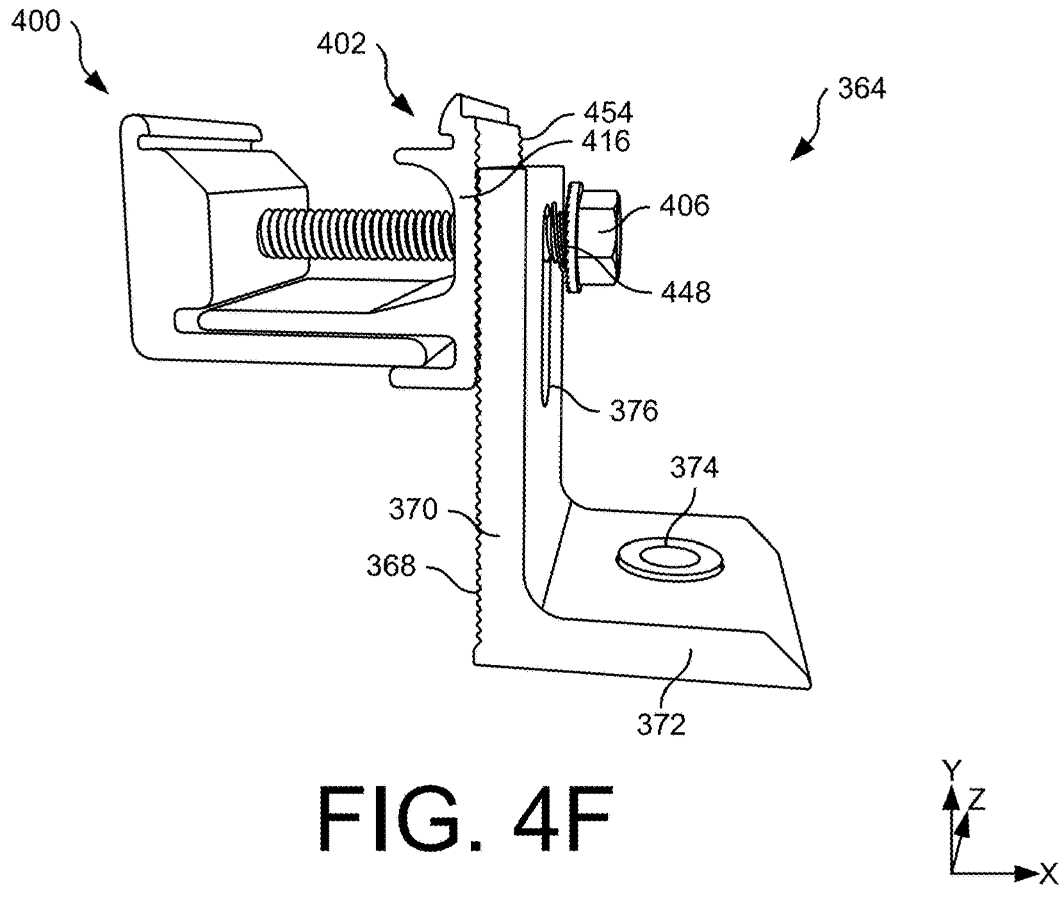
FIG. 4F illustrates an alternate example of the clamp of FIG. 4A, according to embodiments of the present disclosure.
Figure 5A:
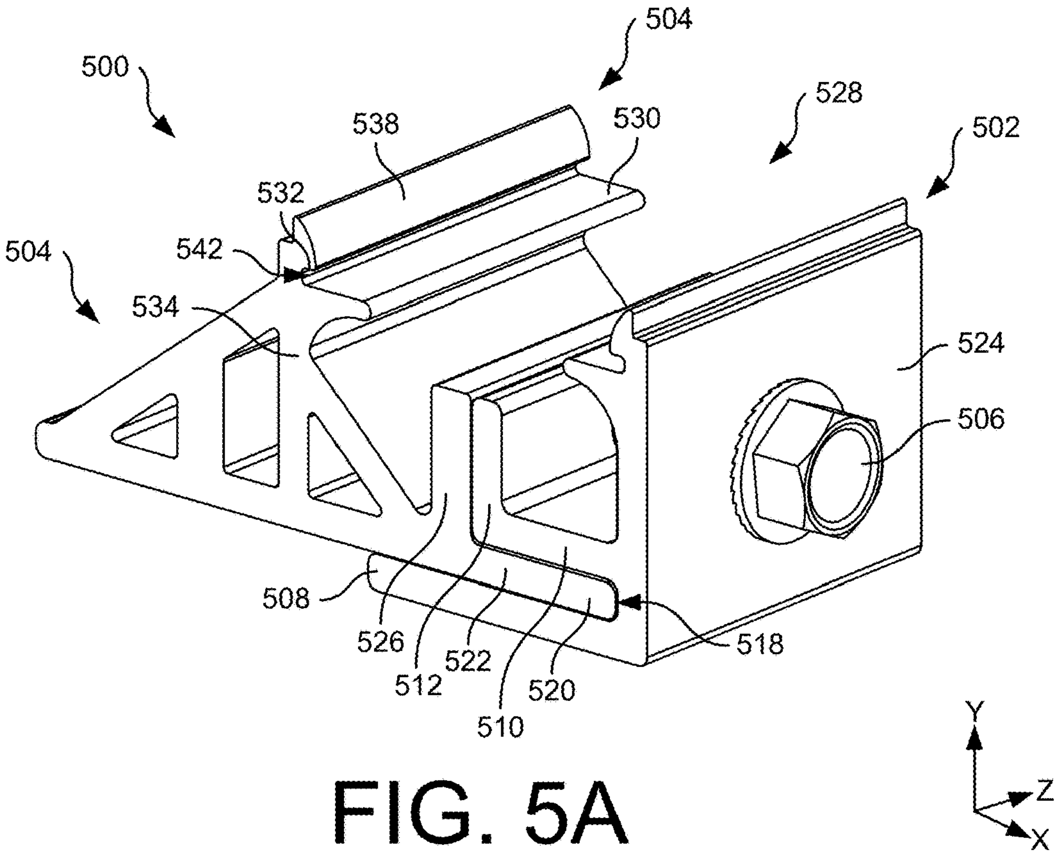
FIG. 5A illustrates a first isometric view of another example clamp usable with the rail and mount of FIG. 1, according to embodiments of the present disclosure.
Figure 5B:
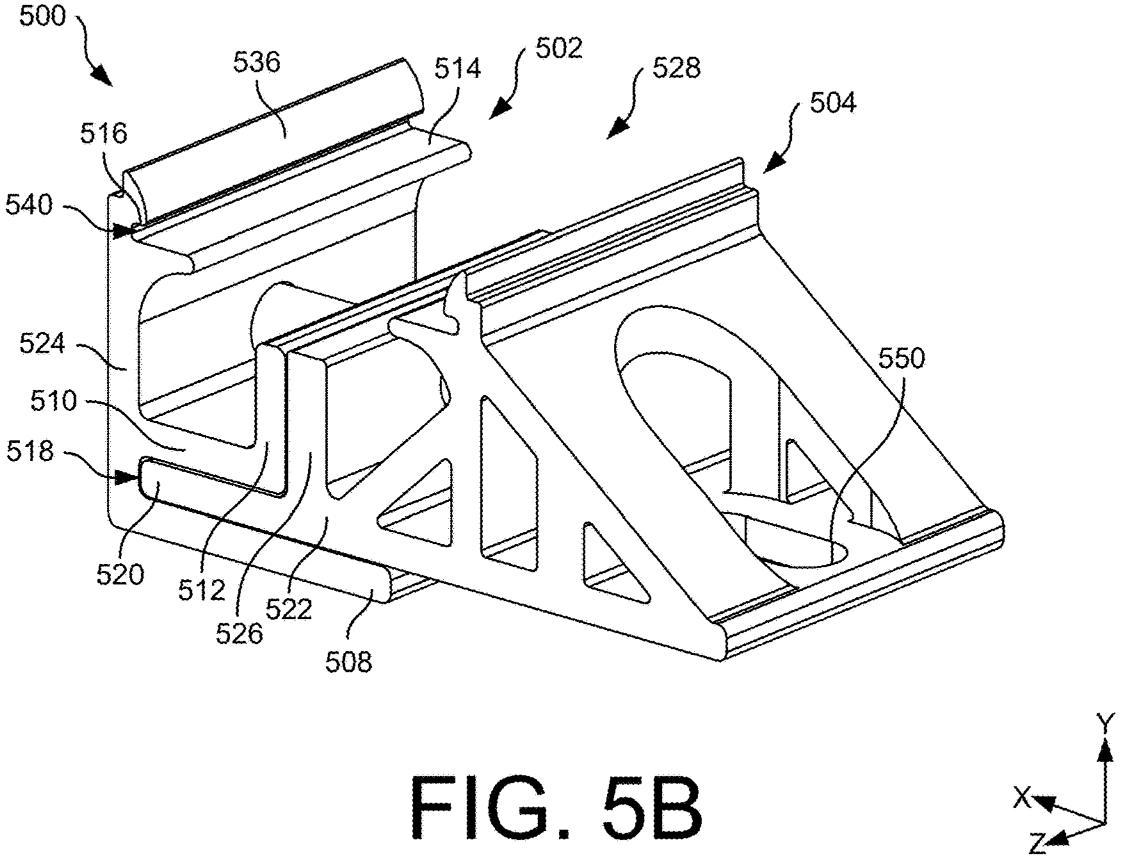
FIG. 5B illustrates a second isometric view of the clamp of FIG. 5A, according to embodiments of the present disclosure.
Figure 5C:
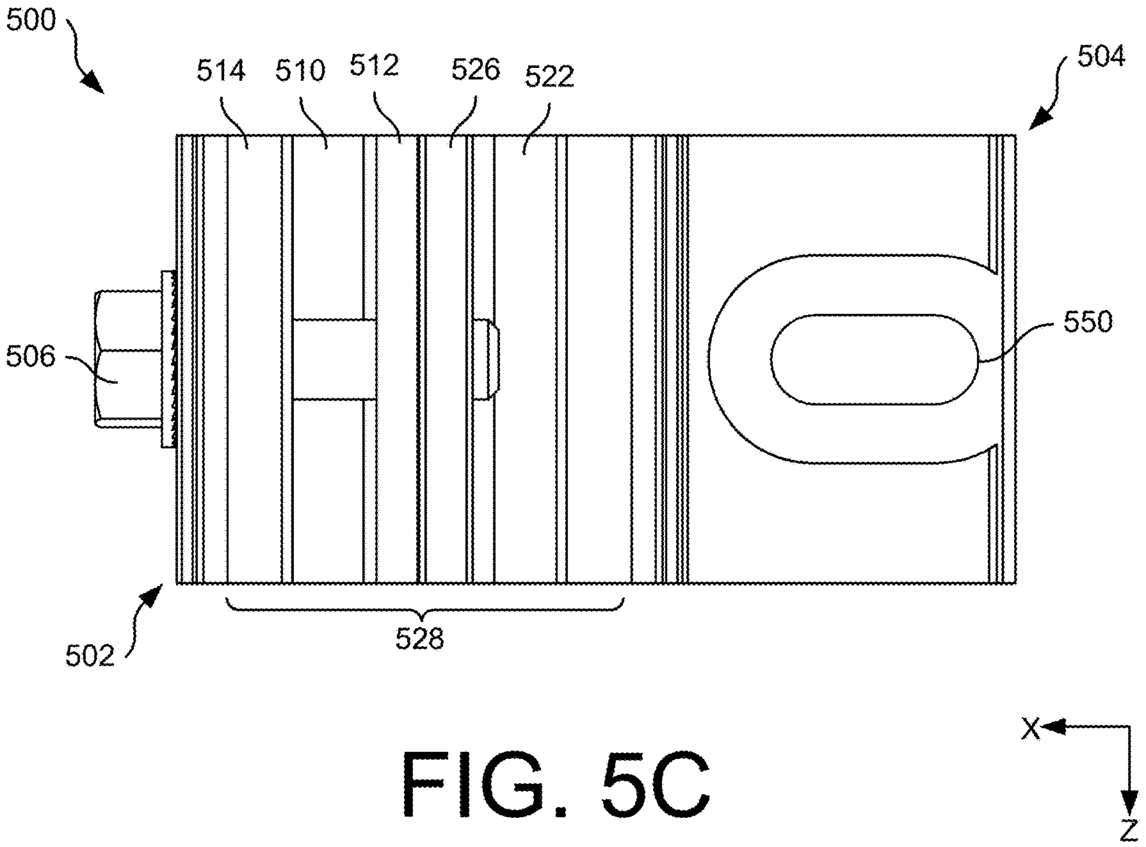
FIG. 5C illustrates a top view of the clamp of FIG. 5A, according to embodiments of the present disclosure.
Figure 5D:
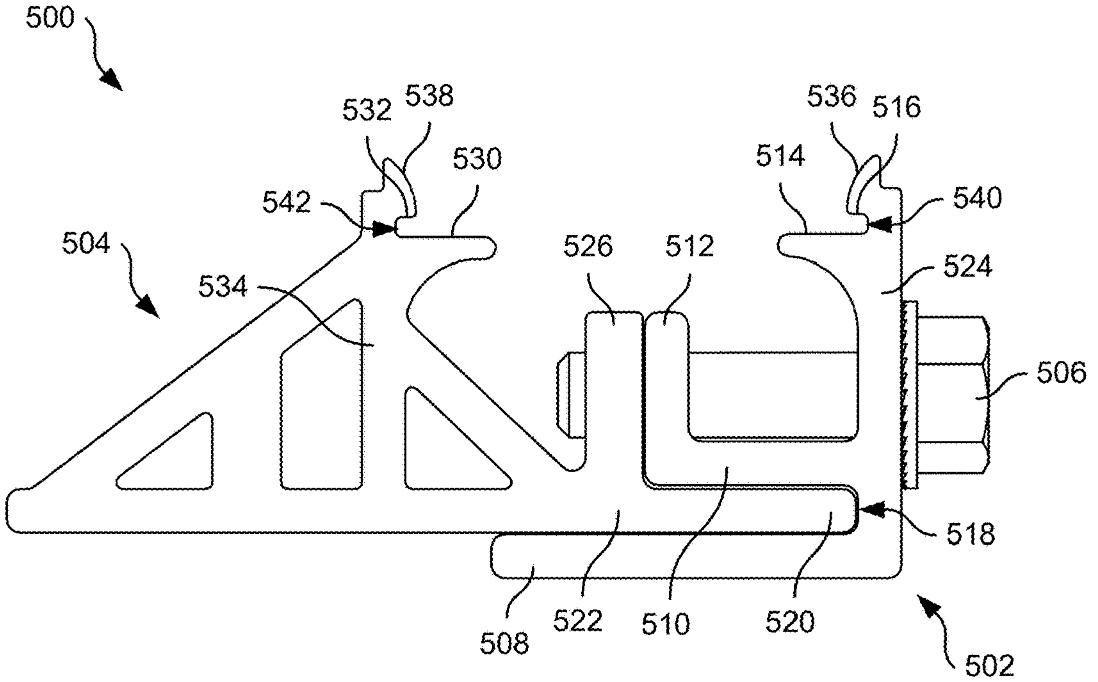
FIG. 5D illustrates a side view of the clamp of FIG. 5A, according to embodiments of the present disclosure.
Figure 5E:
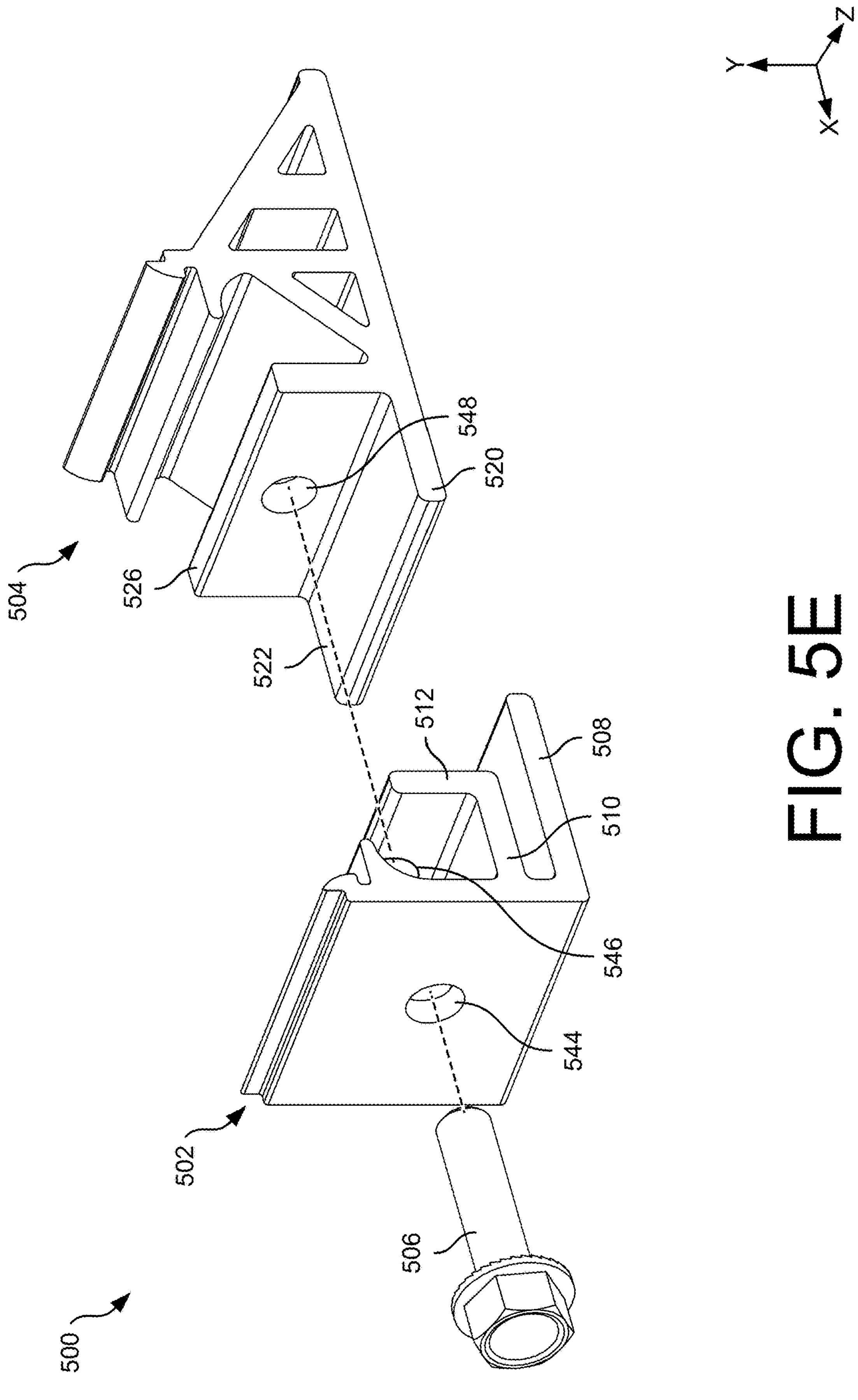
FIG. 5E illustrates an exploded view of the clamp of FIG. 5A, according to embodiments of the present disclosure.
Figure 5F:
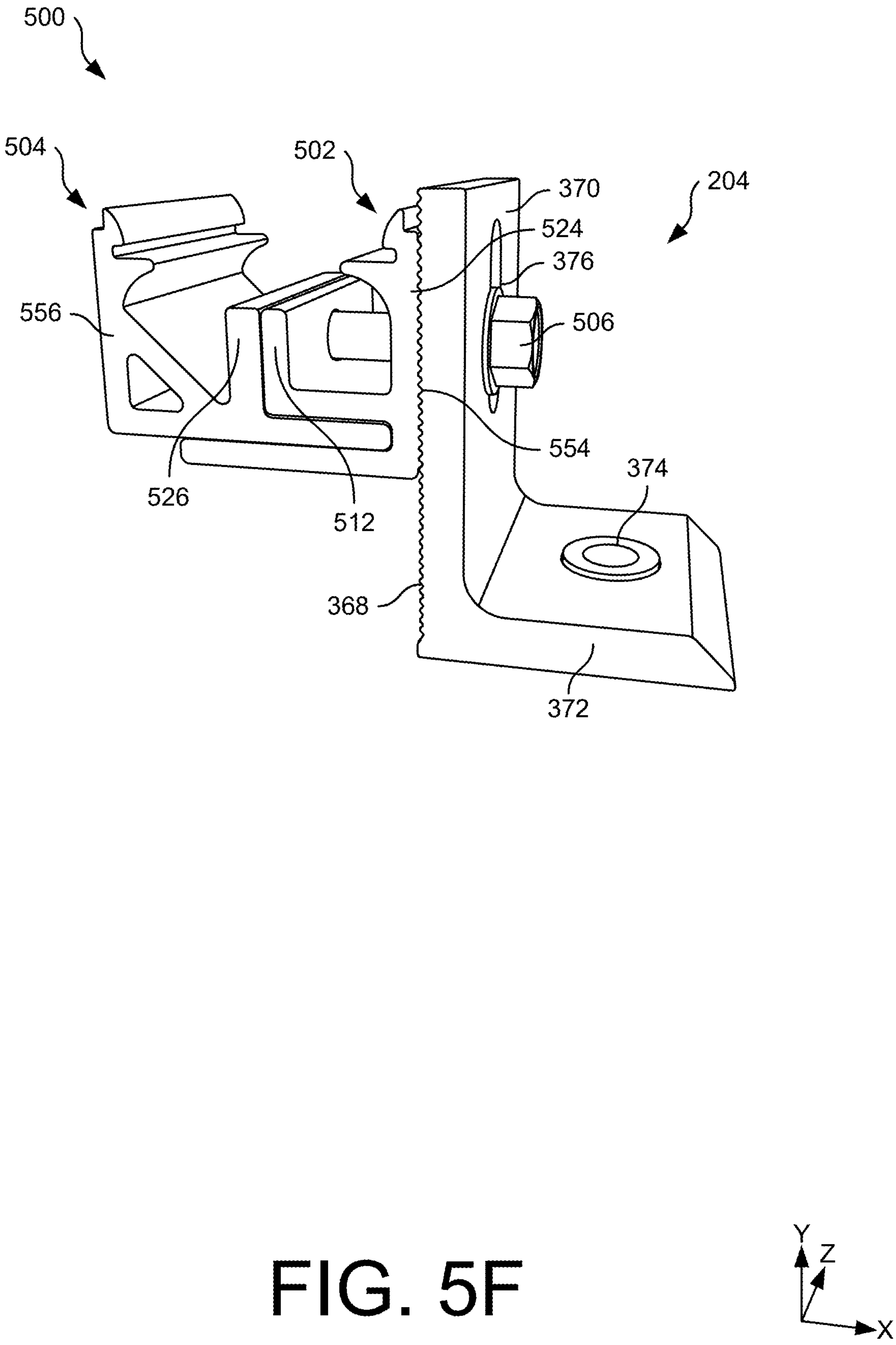
FIG. 5F illustrates an alternate example of the clamp of FIG. 5A, according to embodiments of the present disclosure.
Figure 6A:
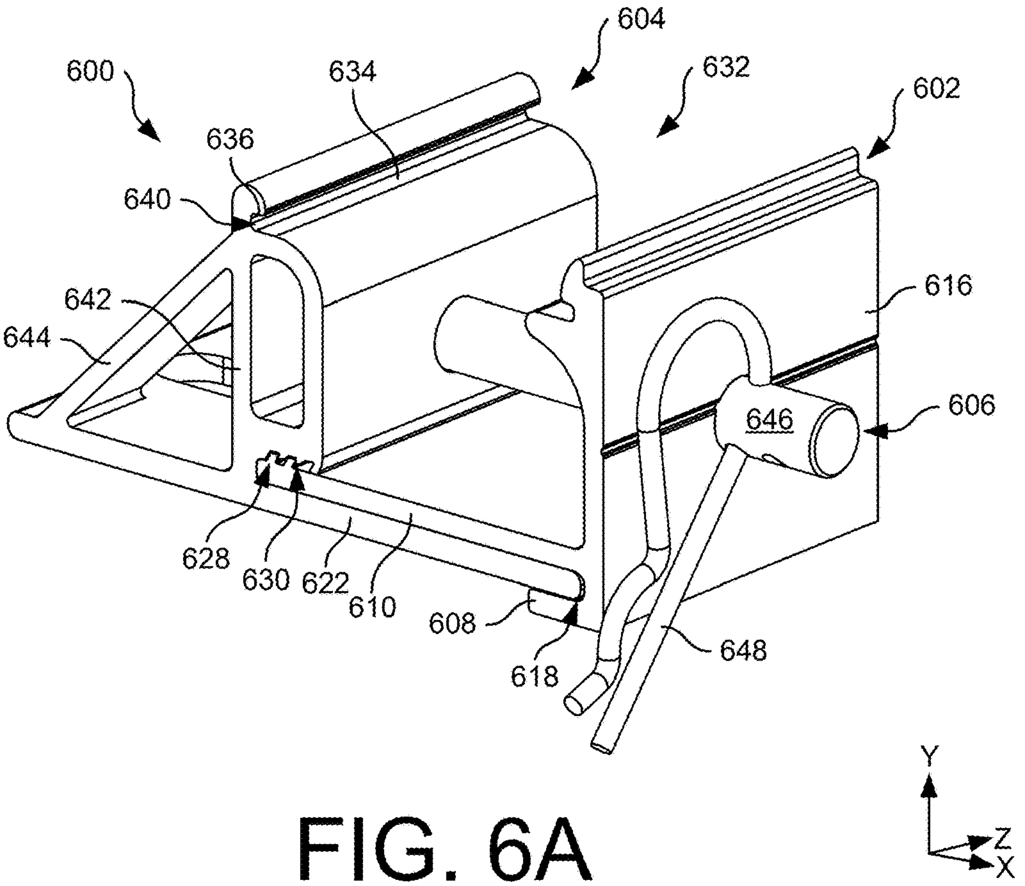
FIG. 6A illustrates a first isometric view of another example clamp usable with the rail and mount of FIG. 1, according to embodiments of the present disclosure.
Figure 6B:
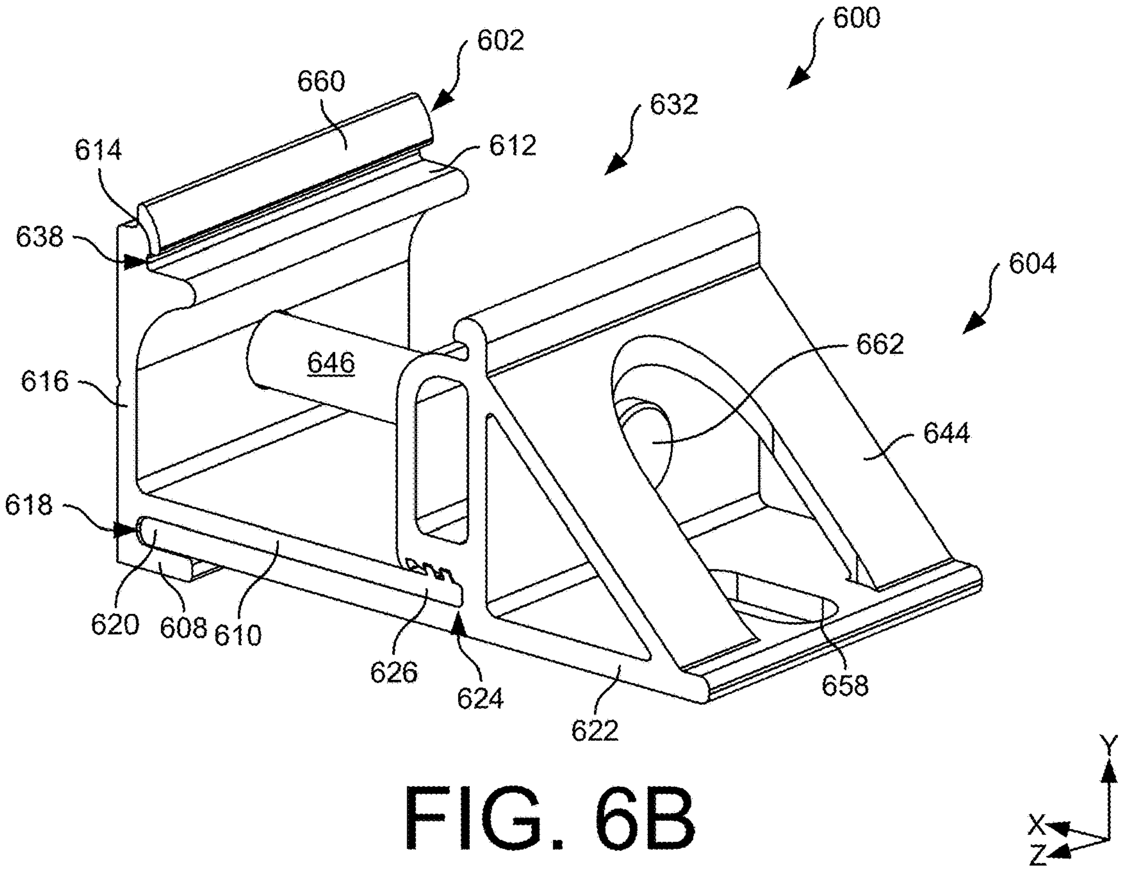
FIG. 6B illustrates a second isometric view of the clamp of FIG. 6A, according to embodiments of the present disclosure.
Figure 6C:
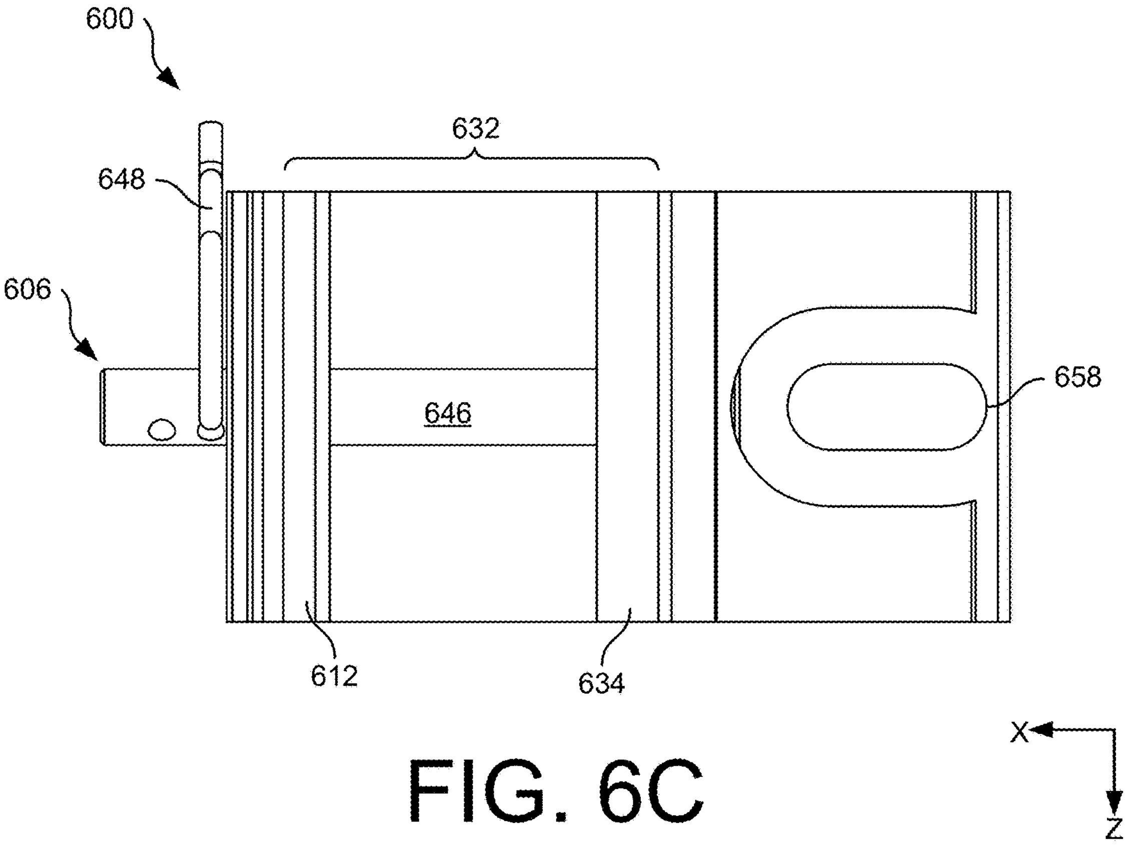
FIG. 6C illustrates a top view of the clamp of FIG. 6A, according to embodiments of the present disclosure.
Figure 6D:
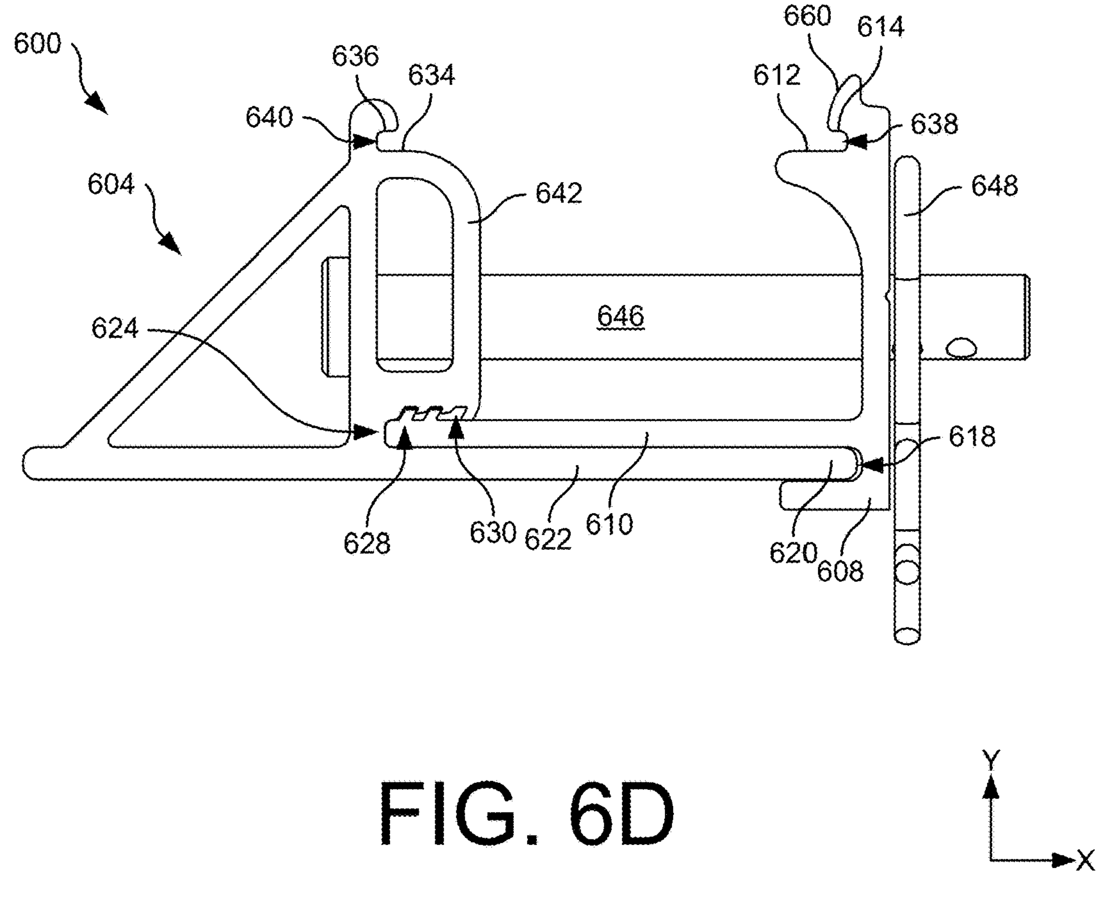
FIG. 6D illustrates a side view of the clamp of FIG. 6A, according to embodiments of the present disclosure.
Figure 6E:
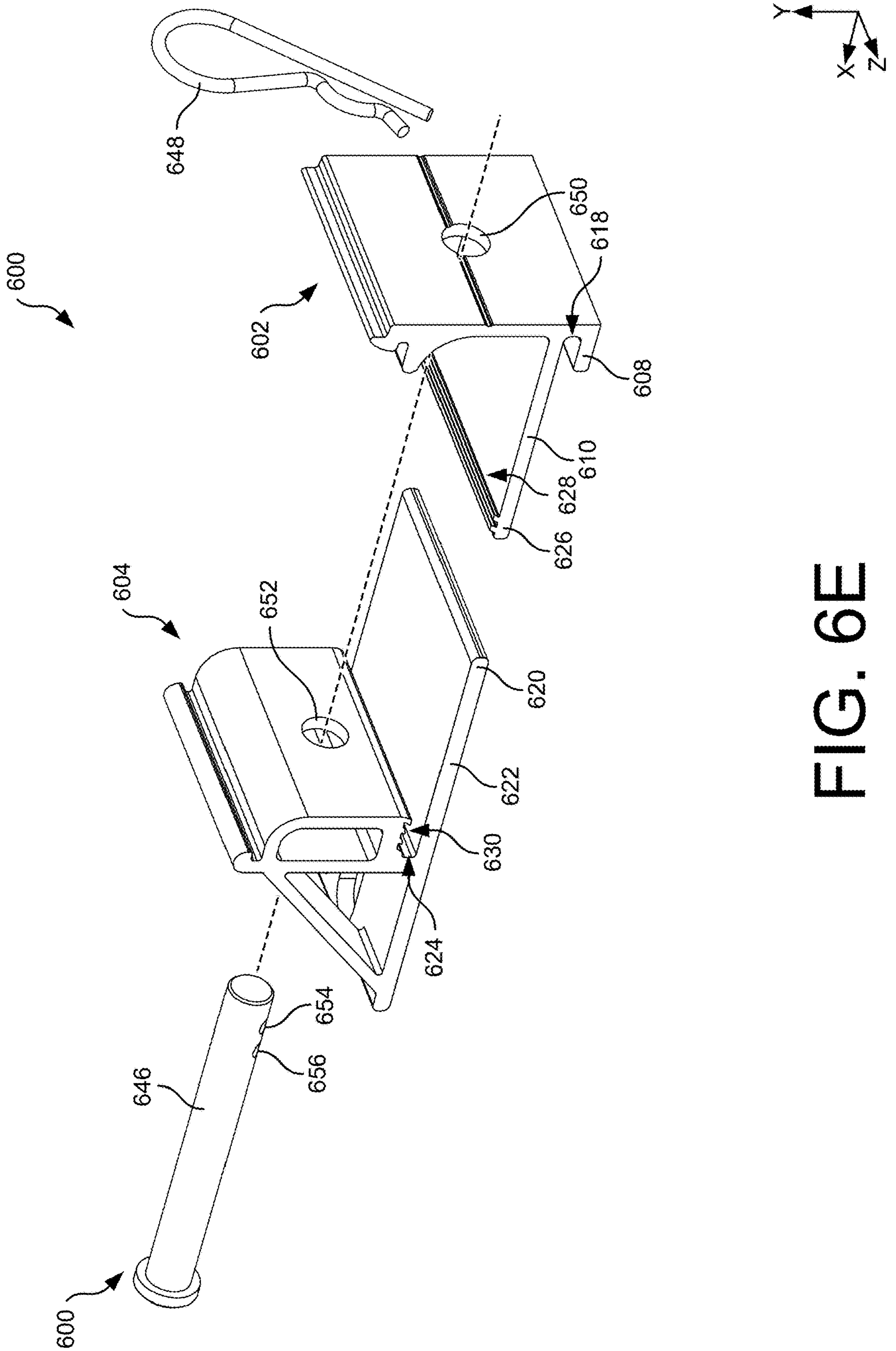
FIG. 6E illustrates an exploded view of the clamp of FIG. 6A, according to embodiments of the present disclosure.
Figure 7A:
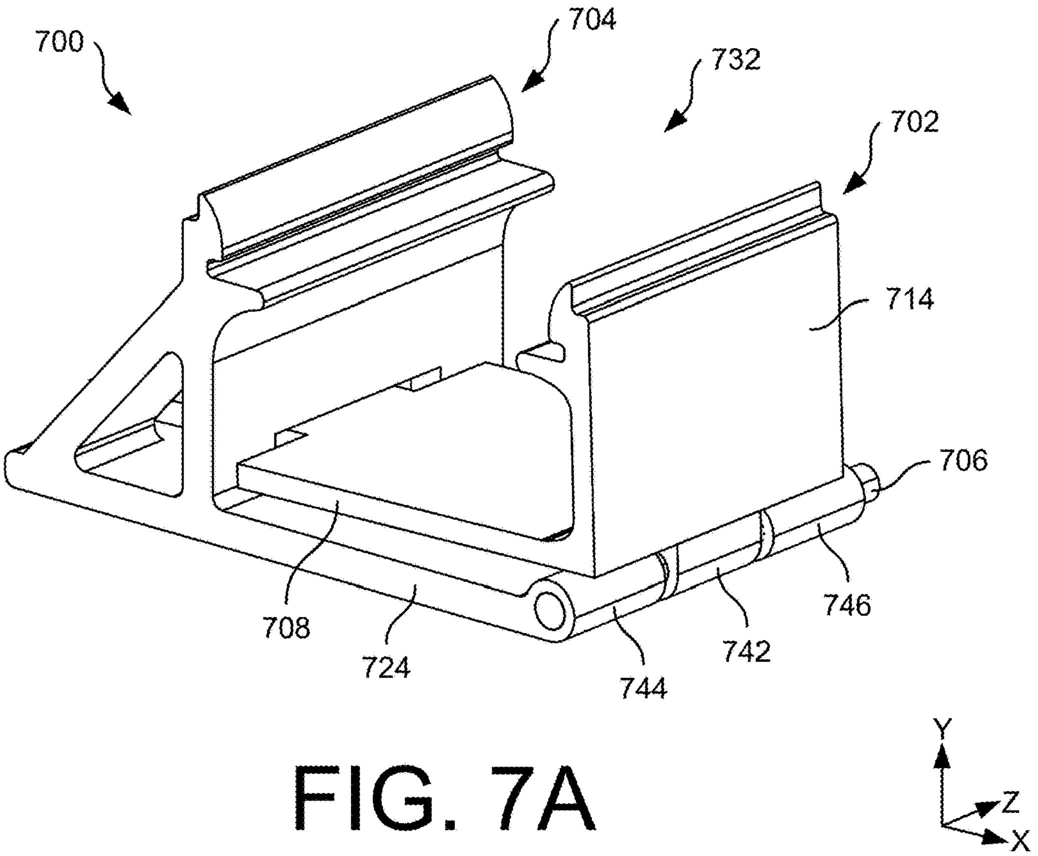
FIG. 7A illustrates a first isometric view of another example clamp usable with the rail and mount of FIG. 1, according to embodiments of the present disclosure.
Figure 7B:
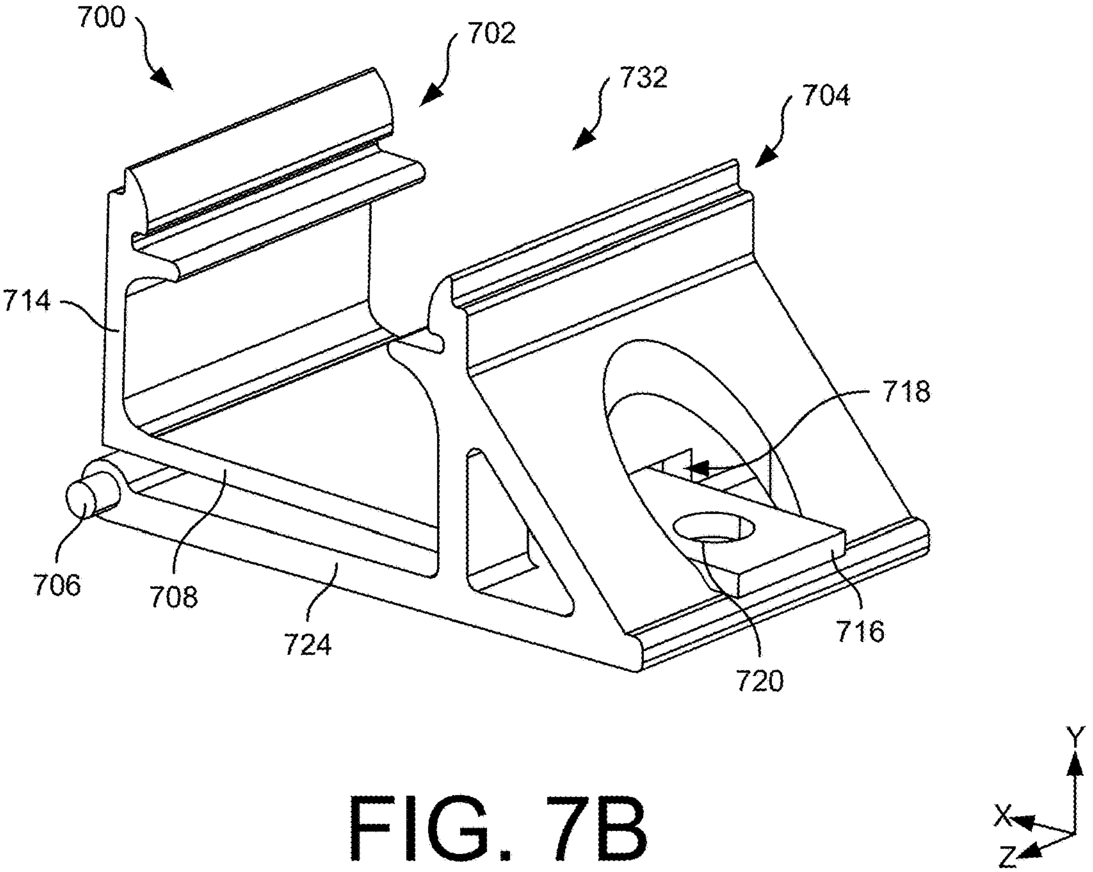
FIG. 7B illustrates a second isometric view of the clamp of FIG. 7A, according to embodiments of the present disclosure.
Figure 7C:
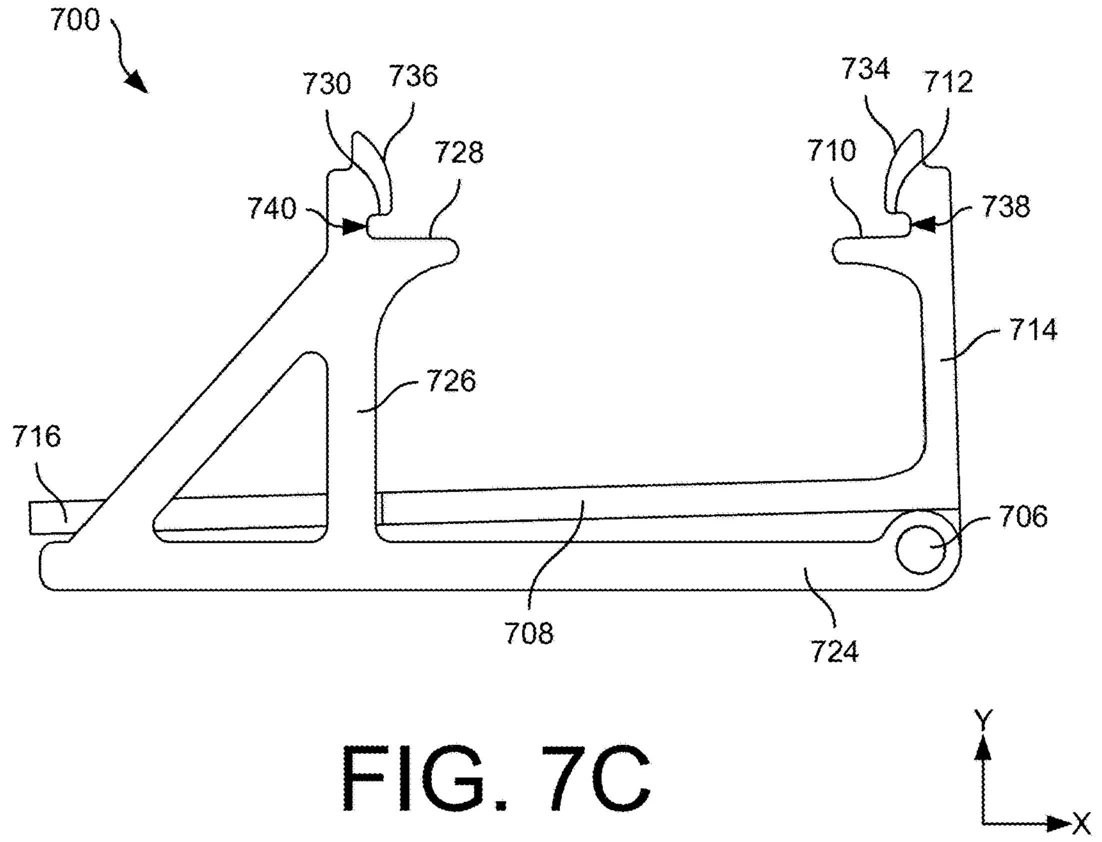
FIG. 7C illustrates a side view of the clamp of FIG. 7A, according to embodiments of the present disclosure.
Figure 7D:
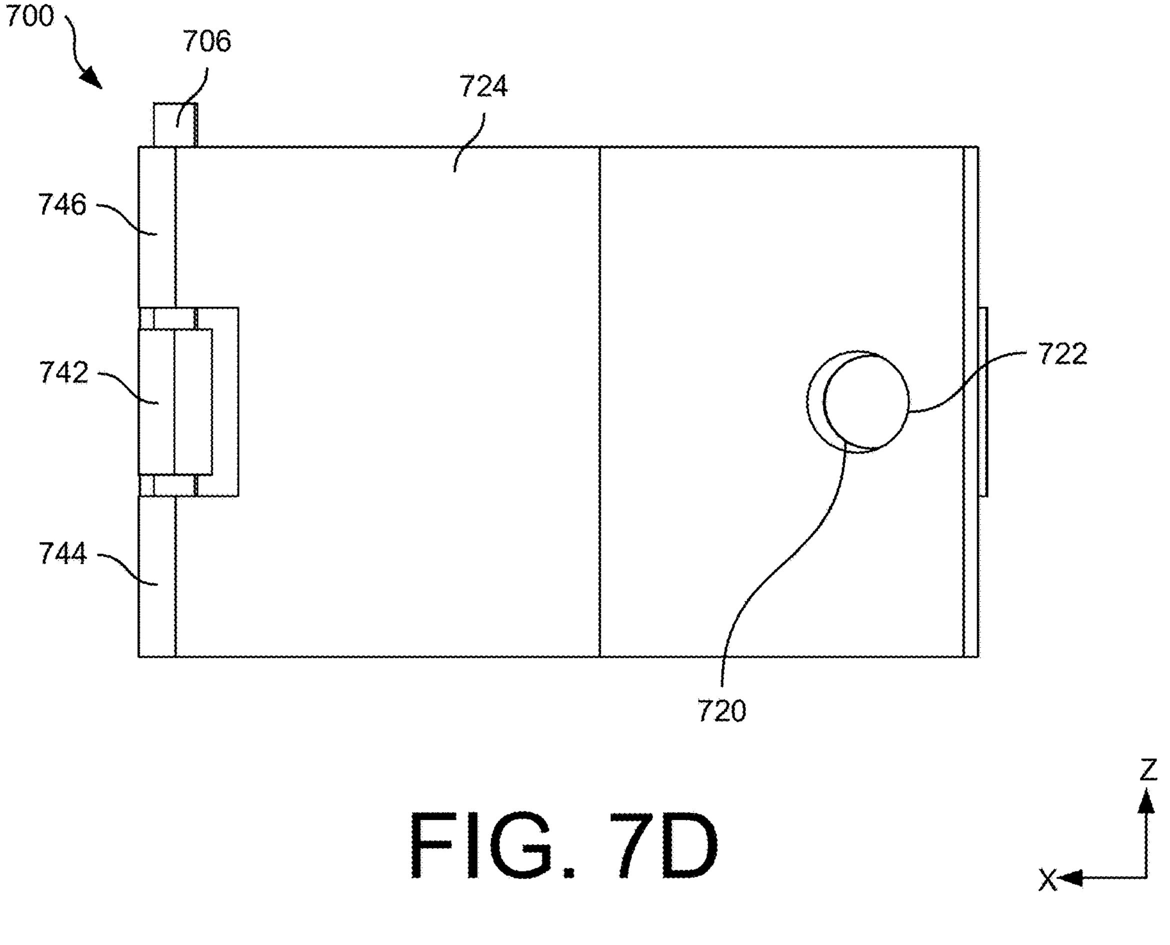
FIG. 7D illustrates a bottom view of the clamp of FIG. 7A, according to embodiments of the present disclosure.
Figure 7E:
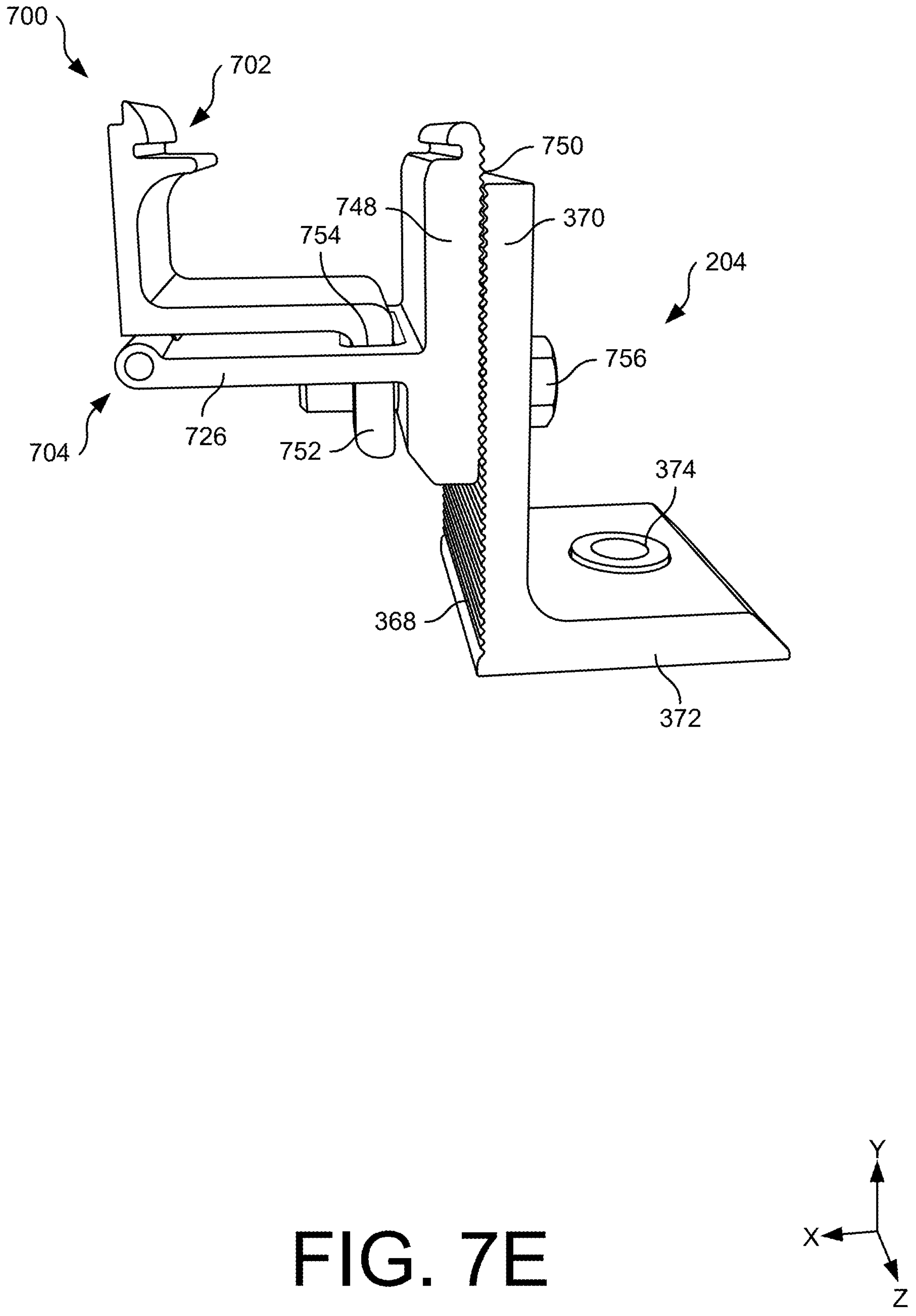
FIG. 7E illustrates an alternate example of the clamp of FIG. 7A, according to embodiments of the present disclosure.

In FIGS. 4A-4C, clamp 400 is shown in a clamped state. In FIG. 4D, the clamp 400 is shown in the unclamped state. After the rail 120 is inserted into the receptacle 428, the fastening mechanism 406 may transition the clamp 400 to a clamped state in order to secure the rail 120 within the receptacle 428. For example, during actuation of the fastening mechanism 406, a distance disposed between the first body 402 and the second body 404 may decrease, thereby locking the rail 120 into engagement with the clamp 400. Moreover, during transitioning of the clamp 400 to the clamped state, the arm 422 of the second body 404 may be disposed further into the first channel 424 and the second arm 410 of the first body 402 may be disposed further in the first channel 424.

In an embodiment, such as shown in FIG. 4D, a biasing element 448 (e.g., spring) may be disposed between the fastening mechanism 406 and the first body 402. For example, the biasing element 448 may be disposed between a surface 450 of the first body 402 and a head of the fastening mechanism 406. The biasing element 448 may cause the first body 402 and the second body 404 to at least partially engage the rail 120 within the receptacle 428 prior to tightening of the fastening mechanism 406. For example, the biasing element 448 may bias the first body 402 into, towards, engagement, with the second body 404, thereby decreasing a distance disposed between the first body 402 and the second body 404. This may assist in partially securing the rail 120 to the clamp 400 and prior to the fastening mechanism 406 being tightened.

The second body 404 further defines a slot 452 (e.g., opening, passage, hole, etc.) through which the fastener 114 is disposed for coupling the clamp 400 to the mount 104. The slot 452 may be disposed through the arm 422. Although described herein as including certain components, the first body 402 and/or the second body 404 may include additional struts, supports, etc. for providing strength, alignment with one another, alignment with the mount 104, and so forth. The first body 402, the second body 404, and the fastening mechanism 406 may be manufactured from suitable materials (e.g., metal, plastic, etc.) and may be manufactured using any suitable manufacturing techniques (e.g., extrusion, injection molding, etc.).

In an embodiment, the clamp 400 may couple to the bracket 204 for coupling to the mount 104, the surface 102, the surface 206, or other surfaces. For example, in FIGS. 4E and 4F, a variation of the clamp 400 is shown whereby the sidewall 416 of the first body 402 may define one or more teeth 454 (e.g., ridges, grooves, ribs, etc.). The one or more teeth 454 may engage (e.g., interlock) with the one or more teeth 368 of the bracket 204. The one or more teeth 454 and the one or more teeth 368 may be variably engaged to adjust a height of the clamp 400 (e.g., in the Y-direction). The bracket 204 may also include the sidewall 370, the base 372, the aperture 374, and the slot 376 formed through the sidewall 370. The biasing element 448, which is absent in FIG. 4E but present in FIG. 4F, may be disposed between a head of the fastening mechanism 406 and the sidewall 370.

FIGS. 5A-5F illustrate a clamp 500, according to examples of the present disclosure. In an embodiment, the clamp 500 may include a first body 502, a second body 504, and a fastening mechanism 506 that couples the first body 502 and the second body 504 together.

The clamp 500, in an embodiment, may be similar to the clamp 100 and/or the clamp 400 as discussed above. The first body 502 may include a first arm 508, a second arm 510, a third arm 512, a shelf 514, and a flange 516. The first arm 508 and the second arm 510 define a first channel 518 in which an end 520 of a first arm 522 of the second body 504 is at least partially received. For example, the end 520 of the first arm 522 may be slid into the first channel 518 (e.g., in the X-direction), so as to be disposed in between the first arm 508 and the second arm 510 (e.g., in the Y-direction). In an embodiment, the first arm 508, the second arm 510, the shelf 514, and/or the flange 516 extend from a sidewall 524 of the first body 502. The first arm 508 may extend from the sidewall 524 by a greater distance as compared to the second arm 510.

The first arm 508 and the second arm 510 may at least partially engage the first arm 522 of the second body 504. For example, the first arm 508 may be disposed adjacent to a first surface (e.g., side, bottom, etc.) of the first arm 522, and the second arm 510 may be disposed adjacent to a second surface (e.g., side, top, etc.) of the first arm 522. Additionally, the second body 504 may include a second arm 526 that abuts, or engages, the third arm 512. As shown, the third arm 512 may extend transverse from the second arm 510, and the second arm 526 may extend transverse from the first arm 522.

In an embodiment, the engagement between the first arm 522 and the first channel 518, or the positioning of the first arm 522 within the first channel 518, may orient, seat, position, etc. the first body 502 and the second body 504 relative to one another. As will be explained herein, during actuation of the fastening mechanism 506, the end 520 of the first arm 522 may be further disposed into the first channel 518 and the third arm 512 and the second arm 526 may be brought into engagement.

The clamp 500 includes a receptacle 528 formed at least in part by the first body 502 and the second body 504 for receiving the rail 120. When placed in the receptacle 528, the rail 120 may rest on the shelf 514, as well as a shelf 530 defined by the second body 504. Additionally, the flange 516 may engage with the first arm 200 and a flange 532 of the second body 504 may engage with the second arm 202. The second body 504 includes a sidewall 534 and one or more struts that adjoin the sidewall 534 to the first arm 522. The sidewall 534 may extend from the first arm 522 (e.g., transversely). In an embodiment, the shelf 530 and the flange 532 are disposed on the sidewall 534.

In an embodiment, the first body 502 includes a taper 536 formed in a surface of the first body 502 and/or the second body 504 includes a taper 538 formed in a surface of the second body 504 that allows the first arm 200 and the second arm 202 to snap into engagement with the receptacle 528 (e.g., as the rail 120 is pushed in the Y-direction into the receptacle 528). The fastening mechanism 506 couples the first body 502 and the second body 504 together and secures the rail 120 within the receptacle 528. As shown, the first body 502 and the second body 504 may include passages, channels, etc. through which portions of the fastening mechanism 506 is disposed.

The first body 502 may further define a second channel 540 disposed between the shelf 514 and the flange 516. The first arm 200 of the rail 120 may be at least partially disposed within the second channel 540. The second body 504 may define a second channel 542 disposed between the shelf 530 and the flange 532. The second arm 202 of the rail 120 may be at least partially disposed within the second channel 542.

In an embodiment, the fastening mechanism 506 may represent a fastener (e.g., bolt, screw, etc.). The fastening mechanism 506 may be disposed through the first body 502, via a first opening 544 and a second opening 546, and may be threaded into an opening 548 in the second body 504. Alternatively, in an embodiment, a nut may be secured to the fastening mechanism 506 to couple the first body 502 and the second body 504 together. The first opening 544 may be disposed through the sidewall 524, at a location between the second arm 510 and the shelf 514, and/or the second opening 546 may be disposed through the third arm 512. The opening 548 may be defined by the second arm 526.

In FIGS. 5A-5D and 5F, clamp 500 is shown in a clamped state. However, prior to being in the clamped state, the rail 120 is inserted into the receptacle 528 and the fastening mechanism 506 may transition the clamp 500 from an unclamped state to a clamped state in order to secure the rail 120 within the receptacle 528. For example, during actuation of the fastening mechanism 506, a distance disposed between the first body 502 and the second body 504 may decrease, thereby locking the rail 120 into engagement with the clamp 500. Moreover, during transitioning of the clamp 500 to the clamped state, the first arm 522 of the second body 504 may disposed further within the first channel 518.

The second body 504 further defines a slot 550 (e.g., opening, passage, hole, etc.) through which the fastener 114 is disposed for coupling the clamp 500 to the mount 104. The slot 550 may be disposed through the first arm 522. Although described herein as including certain components, the first body 502 and/or the second body 504 may include additional struts, supports, etc. for providing strength, alignment with one another, alignment with the mount 104, and so forth. The first body 502, the second body 504, and the fastening mechanism 506 may be manufactured from suitable materials (e.g., metal, plastic, etc.) and may be manufactured using any suitable manufacturing techniques (e.g., extrusion, injection molding, etc.).

In an embodiment, the clamp 500 may couple to the bracket 204 for coupling to the mount 104, the surface 102, the surface 206, or other surfaces. For example, in FIG. 5F, a variation of the clamp 500 is shown whereby the sidewall 524 of the first body 502 may define one or more teeth 554 (e.g., ridges, grooves, ribs, etc.). The one or more teeth 554 may engage (e.g., interlock) with the one or more teeth 368 of the bracket 204. The one or more teeth 554 and the one or more teeth 368 may be variably engaged to adjust a height of the clamp 500 (e.g., in the Y-direction). The bracket 204 may also include the sidewall 370, the base 372, the aperture 374, and the slot 376 formed through the sidewall 370. The fastening mechanism 506 may be disposed through the slot 376, the sidewall 370, the sidewall 524, the third arm 512, and into the second arm 526. The second body 504 may also include a sidewall 556 (e.g., in lieu of the sidewall 534 and the strut extending from the sidewall 534).

FIGS. 6A-6F illustrate a clamp 600, according to examples of the present disclosure. In an embodiment, the clamp 600 may include a first body 602, a second body 604, and a fastening mechanism 606 that couples the first body 602 and the second body 604 together.

The first body 602 may include a first arm 608, a second arm 610, a shelf 612, and a flange 614. In an embodiment, the first arm 608, the second arm 610, the shelf 612, and/or the flange 614 extend from a sidewall 616 of the first body 602. In an embodiment, the first arm 608 and the second arm 610 may extend transverse from the sidewall 616. The first arm 608 and the second arm 610 define a first channel 618 in which an end 620 of an arm 622 of the second body 604 is at least partially received. For example, the end 620 of the arm 622 may be slid into the first channel 618 (e.g., in the X-direction), so as to be disposed in between the first arm 608 and the second arm 610 (e.g., in the Y-direction).

The second arm 610 may at least partially engage (e.g., rest on) the arm 622 of the second body 604. In an embodiment, the engagement between the arm 622 and the first channel 618, or the positioning of the arm 622 within the first channel 618, may orient, seat, position, etc. the first body 602 and the second body 604 relative to one another.

In an embodiment, the second arm 610 may extend from the sidewall 616 of the first body 602 by a greater distance as compared to the first arm 608. As will be explained herein, during actuation of the fastening mechanism 606, the arm 622 may be further disposed in the first channel 618 (e.g., urged into the first channel 618).

The second arm 610 may be at least partially disposed in a first channel 624 of the second body 604. For example, an end 626 of the second arm 610 may be disposed in the first channel 624. In an embodiment, the second arm 610 may include features that engage with features of the first channel 624 formed in the second body 604. For example, the second arm 610 may include one or more teeth 628 (e.g., rib, projections, keys, etc.) that engage with notches 630 (e.g., grooves, indents, keyways, etc.) disposed within the first channel 624. The engagement between the teeth 628 and the notches 630 may further secure the first body 602 and the second body 604 together, thereby preventing disengagement between the first body 602 and the second body 604 and securing the rail 120 within a receptacle 632 of the clamp 600. The teeth 628 may be disposed on the end 626 of the second arm 610.

When placed in the receptacle 632, the rail 120 may rest on the shelf 612. Moreover, the second body 604 includes a shelf 634 on which the rail 120 rests. Additionally, the flange 614 may engage with the first arm 200 and a flange 636 of the second body 604 may engage with the second arm 202 to secure the rail 120 within the receptacle 632. In an embodiment, the first body 602 includes a taper 660 formed in a surface of the first body 602 that allows the first arm 200 to snap into engagement with the rail 120 (e.g., as the rail 120 is pushed in the Y-direction into the receptacle 632). The first body 602 may further define a second channel 638 disposed between the shelf 612 and the flange 614. The first arm 200 of the rail 120 may be at least partially disposed within the second channel 638. The second body 604 may define a second channel 640 disposed between the shelf 634 and the flange 636. The second arm 202 of the rail 120 may be at least partially disposed within the second channel 640.

The second body 604 includes one or more sidewalls 642 and a strut 644. The sidewall 642 may extend from the arm 622 (e.g., transversely), and the strut 644 may be disposed between the one or more sidewalls 642 and the arm 622. In an embodiment, the shelf 634 and the flange 636 are disposed on the one or more sidewalls 642, and the one or more sidewalls 642 may at least partially form the first channel 624, the notches 630, and the second channel 640.

The fastening mechanism 606 couples the first body 602 and the second body 604 together and secures the rail 120 within the receptacle 632. As shown, the first body 602 and the second body 604 may include passages, channels, etc. through which portions of the fastening mechanism 606 is disposed. In an embodiment, the fastening mechanism 606 may include a clevis pin 646 and a cotter pin 648 that engages with the clevis pin 646. The clevis pin 646 may be disposed through the first body 602 and the second body 604 via one or more openings (e.g., channel, passage, etc.). For example, the first body 602 may define an opening 650, while the second body 604 may define an opening 652 through which the clevis pin 646 is disposed. The opening 650 may be disposed through the sidewall 616, at a location between the second arm 202 and the shelf 612. As shown, the clevis pin 646 may include a head 662 that is disposed adjacent to the opening 652, which prevents the clevis pin 646 being pulled through the opening 652. The opening 652 may be defined in the sidewall 642 of the second body 604.

The clevis pin 646 defines one or more passageways through which the cotter pin 648 is disposed. For example, the clevis pin 646 may define a first passageway 654 and a second passageway 656. Once the clevis pin 646 is pushed through the opening 650 of the first body 602, the cotter pin 648 may be disposed through one of the first passageway 654 or the second passageway 656 for securing the first body 602 and the second body 604 together. The first passageway 654 and the second passageway 656 may accommodate differently sized rails.

In FIGS. 6A-6D and 6F, clamp 600 is shown in an clamped state. However, prior to being in the clamped state, the rail 120 is inserted into the receptacle 632 and the fastening mechanism 606 may transition the clamp 600 from an unclamped state to a clamped state in order to secure the rail 120 within the receptacle 632. For example, the first body 602 and the second body 604 may be brought together, thereby decreasing a distance therebetween. Therein, the cotter pin 648 may be disposed through one of the first passageway 654 or the second passageway 656 to secure the first body 602 and the second body 604 together. Moreover, during transitioning of the clamp 600 to the clamped state, the arm 622 of the second body 604 may disposed further within the first channel 618, and the second arm 610 may be disposed further within the first channel 624, so as to engage the teeth 628 with the notches 630.

The second body 604 further defines a slot 658 (e.g., opening, passage, hole, etc.) through which the fastener 114 is disposed for coupling the clamp 600 to the mount 104. The slot 658 may be disposed through the arm 622. Although described herein as including certain components, the first body 602 and/or the second body 604 may include additional struts, supports, etc. for providing strength, alignment with one another, alignment with the mount 104, and so forth. The first body 602, the second body 604, and the fastening mechanism 606 may be manufactured from suitable materials (e.g., metal, plastic, etc.) and may be manufactured using any suitable manufacturing techniques (e.g., extrusion, injection molding, etc.).

In an embodiment, the clamp 600 may couple to the bracket 204 for coupling to the mount 104, the surface 102, the surface 206, or other surfaces. For example, in FIG. 6F, a variation of the clamp 600 is shown whereby the sidewall 616 of the first body 602 may define one or more teeth 664 (e.g., ridges, grooves, ribs, etc.). The one or more teeth 664 may engage (e.g., interlock) with the one or more teeth 368 of the bracket 204. The one or more teeth 664 and the one or more teeth 368 may be variably engaged to adjust a height of the clamp 600 (e.g., in the Y-direction). The bracket 204 may also include the sidewall 370, the base 372, the aperture 374, and the slot 376 formed through the sidewall 370. The second body 604 may also include a sidewall 666 (e.g., in lieu of the sidewall 642 and the strut 644) engaged by the fastening mechanism 606 (or the clevis pin 646).

FIGS. 7A-7E illustrate an example clamp 700, according to examples of the present disclosure. In an embodiment, the clamp 700 may include a first body 702, a second body 704, and a fastening mechanism 706 that couples the first body 702 and the second body 704 together.

The first body 702 may include an arm 708, a shelf 710, and a flange 712. In an embodiment, the arm 708, the shelf 710, and/or the flange 712 extend from a sidewall 714 of the first body 702. The arm 708 may include a neck 716 disposed through a passage 718 in the second body 704. For example, the neck 716 may be routed through the passage 718 in the second body 704. The neck 716 may include a slot 720 that aligns with a slot 722 formed in the second body 704. The fastener 114 may be disposed through the slot 720 and the slot 722 for coupling the clamp 700 to the mount 104.

The second body 704 includes an arm 724 and a sidewall 726 that defines the passage 718. Moreover, the second body 704 includes a shelf 728 on which the rail 120 rests and a flange 730. The shelf 728 may extend from a sidewall 726 of the second body 704. A strut may adjoin the sidewall 726 and the arm 724.

The clamp 700 includes a receptacle 732 formed at least in part by the first body 702 and the second body 704. When placed in the receptacle 732, the rail 120 may rest on the shelf 710 and the shelf 728. The flange 712 may engage with the first arm 200 and the flange 730 may engage with the second arm 202. In an embodiment, the first body 702 includes a taper 734 formed in a surface of the first body 702 that allows the first arm 200 to snap into engagement with the clamp 700 and/or the second body 704 includes a taper 736 formed in a surface of the second body 704 that allows second arm 202 to snap into engagement with the clamp 700 (e.g., as the rail 120 is pushed in the Y-direction into the receptacle 632).

The first body 702 may further define a second channel 738 disposed between the shelf 710 and the flange 712. The first arm 200 of the rail 120 may be at least partially disposed within the second channel 738. The second body 704 may define a second channel 740 between the shelf 728 and the flange 730. The second arm 202 of the rail 120 may be at least partially disposed within the second channel 740.

The first body 702 and the second body 704 may couple together via the fastening mechanism 706, which may represent a pin (e.g., shaft, rod, etc.). As will be discussed herein, the first body 702 and the second body 704 may define knuckles through which the fastening mechanism 706 is disposed. For example, the first body 702 may define a knuckle 742, and the second body 704 may define a first knuckle 744 and a second knuckle 746. As shown, the knuckle 742 may be disposed between the first knuckle 744 and the second knuckle 746. Each of the first knuckle 744, the second knuckle 746, and the knuckle 742 may define a passage in which the fastening mechanism 706 is disposed for coupling the first body 702 and the second body 704.

In an embodiment, the first body 702 may at least partially rotate, deflect, etc. upon tightening of the fastener 114. For example, as the fastener 114 is tightened into the mount 104, the arm 708 may be urged in a direction towards the arm 724. This urging may be caused via the fastener 114 engaging with the arm 724 and forcing the arm 724 in a direction towards the arm 708 (e.g., Y-direction). Moreover, as the arm 708 is urged towards the arm 724, the sidewall 714 may rotate in a direction towards the sidewall 726 (e.g., about the Z-axis). In doing so, the sidewall 714 (or more generally, the first body 702) may create a clamping force to secure the rail 120 within the receptacle 732. Additional details of the operation of the clamp 700 to secure the rail 120 within the receptacle 732 are discussed in FIGS. 10A and 10B.

In an embodiment, the clamp 700 may couple to the bracket 204 for coupling to the mount 104, the surface 102, the surface 206, or other surfaces. For example, in FIG. 7E, a variation of the clamp 700 is shown whereby the sidewall 748 (e.g., in lieu of the sidewall 726 and the strut) of the second body 704 may define one or more teeth 750 (e.g., ridges, grooves, ribs, etc.). The one or more teeth 750 may engage (e.g., interlock) with the one or more teeth 368 of the bracket 204. The one or more teeth 750 and the one or more teeth 368 may be variably engaged to adjust a height of the clamp 700 (e.g., in the Y-direction). The bracket 204 may also include the sidewall 370, the base 372, the aperture 374, and the slot 376 formed through the sidewall 370. The first body 702 may also include a neck 752 that extends through a passage 754 of the arm 724. A fastener 756 may extend through the slot 376, an aperture in the sidewall 748, and an aperture in the neck 752.

Figure 8A:
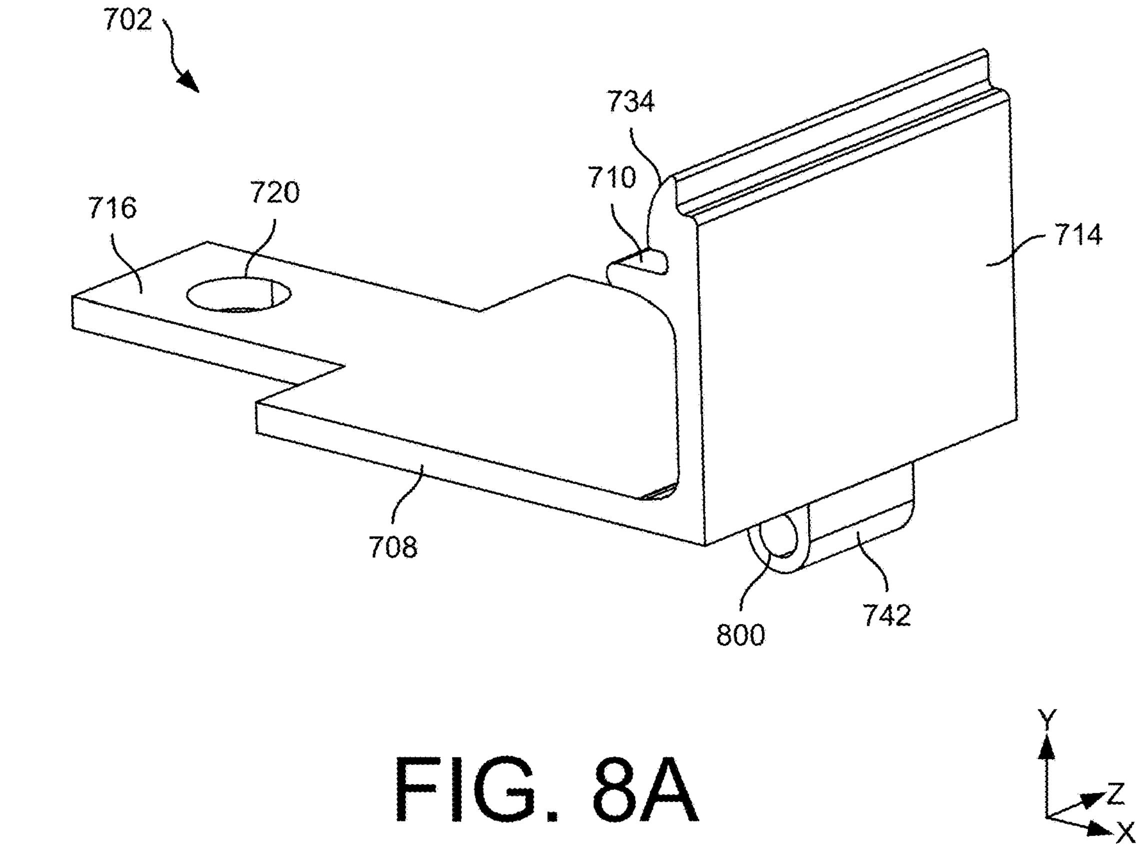
FIG. 8A illustrates an isometric view of an example first body of the clamp of FIG. 7A, according to embodiments of the present disclosure.
Figure 8B:
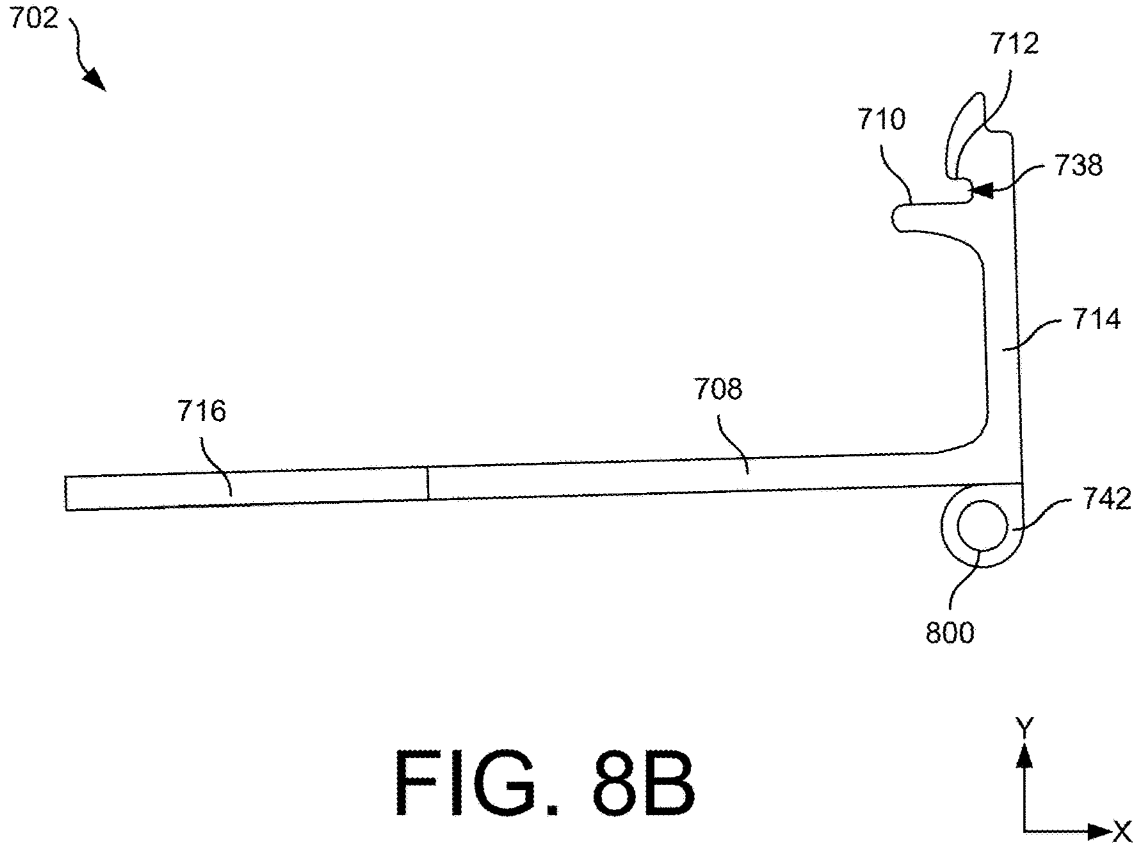
FIG. 8B illustrates a side view of the first body of FIG. 8A, according to embodiments of the present disclosure.

FIGS. 8A and 8B illustrate details of the first body 702 of the clamp 700, according to examples of the present disclosure. As introduced above, the first body 702 may include the arm 708, the neck 716, the shelf 710, and the flange 712, the sidewall 714, and the knuckle 742. The knuckle 742 defines a passageway 800 through which the fastening mechanism 706 is at least partially disposed, for coupling the first body 702 and the second body 704, for example, via the fastening mechanism 706 being inserted through corresponding passageways of the first knuckle 744 and the second knuckle 746. Although the first body 702 is described as including one of the knuckle 742, the first body 702 may include more than one of the knuckles.

The knuckle 742 may be disposed at a first end of the first body 702. The slot 720 is disposed through the neck 716 of the first body 702. As shown, the neck 716 may include a width, for example, that is less than a width of the arm 708. The width of the neck 716 permits the neck 716 to be disposed through the passage 718 of the second body 704. The neck 716 may include a suitable length (e.g., in the X-direction) for being disposed through the passage 718 and permitting alignment of the slot 720 with the slot 722.

The first body 702 may include the second channel 738 formed between the shelf 710 and the flange 712. The first arm 200 of the rail 120 may be disposed within the second channel 738. Moreover, the first body 702 includes the taper 734 formed in a surface of the first body 702 that allows the first arm 200 to snap into engagement with the rail 120 (e.g., as the rail 120 is pushed in the Y-direction into the receptacle 732).

Figure 9A:
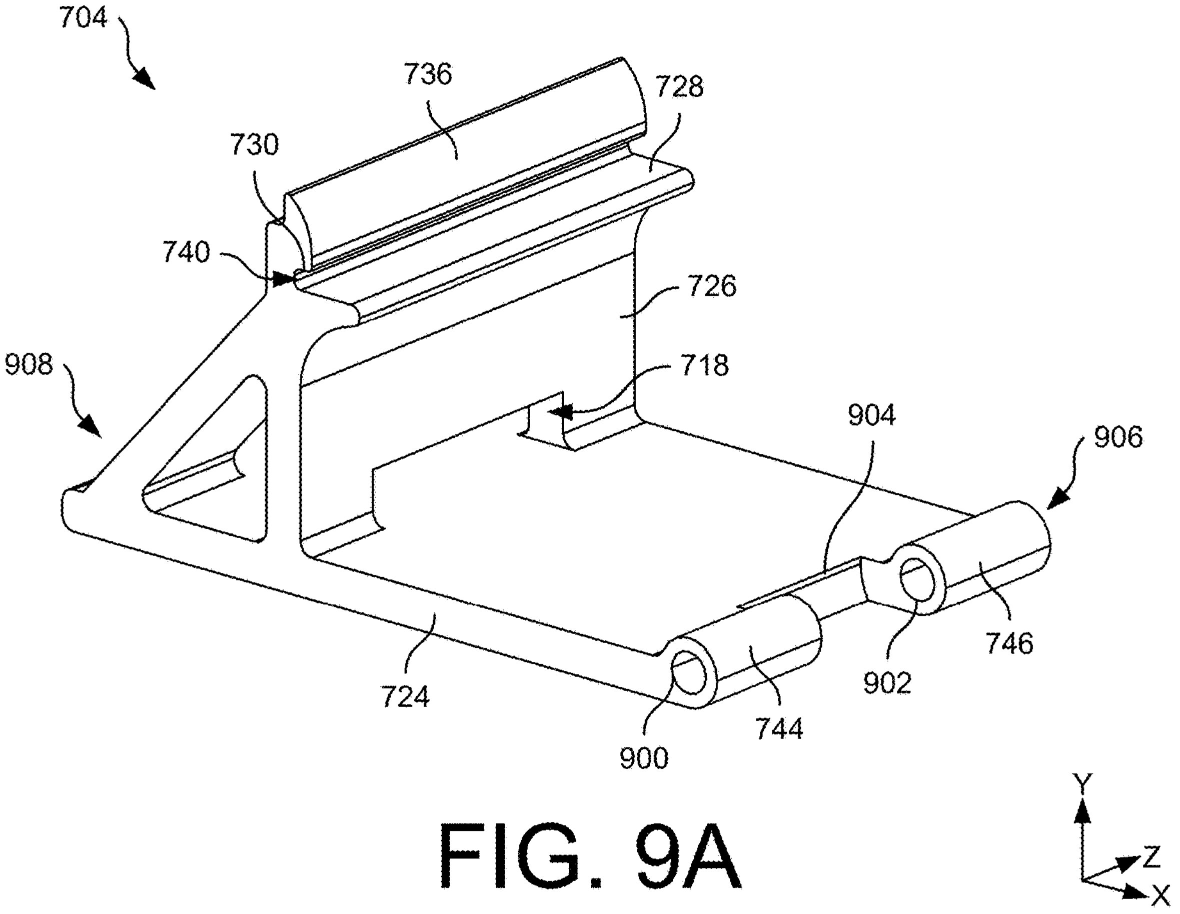
FIG. 9A illustrates an isometric view of an example second body of the clamp of FIG. 7A, according to embodiments of the present disclosure.
Figure 9B:
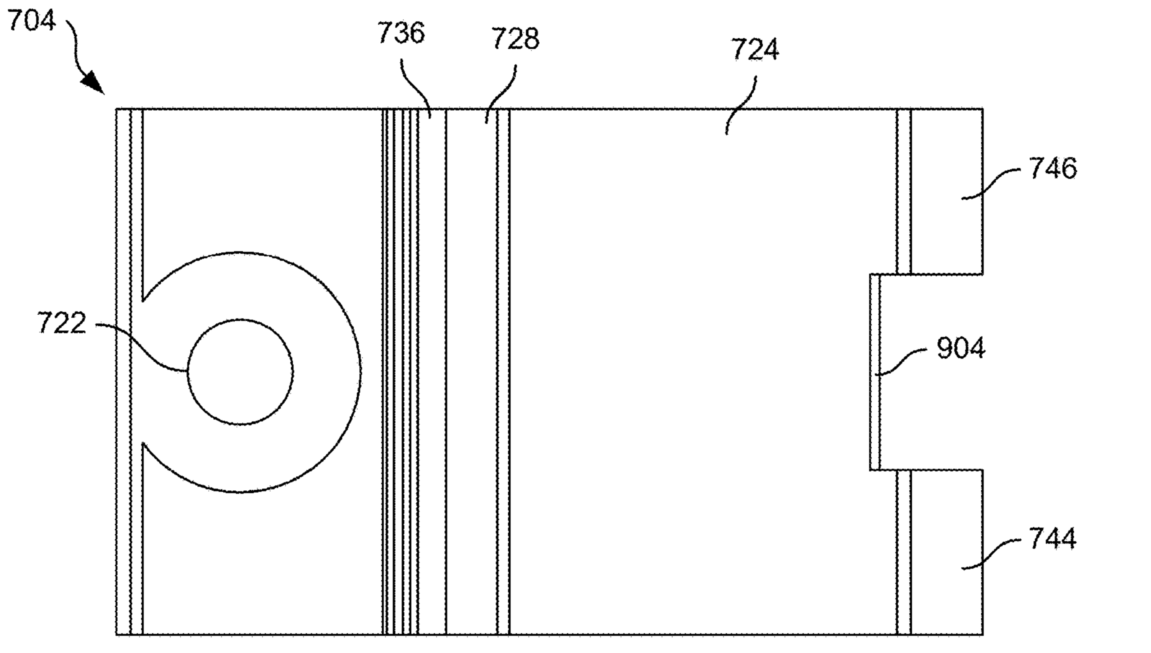
FIG. 9B illustrates a top view of the first body of FIG. 9A, according to embodiments of the present disclosure.

FIGS. 9A and 9B illustrate details of the second body 704 of the clamp 700, according to examples of the present disclosure. As introduced above, the second body 704 includes the arm 724 and the sidewall 726 that defines the passage 718. Moreover, the second body 704 includes the shelf 728 on which the rail 120 rests and the flange 730 that engages with the second arm 202. The shelf 728 may extend from the sidewall 726 of the second body 704.

The first knuckle 744 and the second knuckle 746 may be disposed at a first end 906 of the second body 704. The first knuckle 744 defines a first passageway 900 and the second knuckle 746 defines a second passageway 902 through which the fastening mechanism 706 is disposed. The first passageway 900 and the second passageway 902 may align with the passageway 800 for permitting the fastening mechanism 706 to couple the first body 702 and the second body 704 together. Although the second body 704 is described as including the first knuckle 744 and the second knuckle 746, the second body 704 may include more than or less than two knuckles. Additionally, the arm 724 defines a notch 904 (e.g., cutout, recess, etc.) for accommodating the knuckle 742 of the first body 702.

The slot 722 is disposed through the arm 724, at a location more proximate to a second end 908 than the first end 906 of the second body 704. Additionally, the second body 704 may include the second channel 740 formed between the shelf 728 and the flange 730. The second arm 202 of the rail 120 may be disposed within the second channel 740. Moreover, the second body 704 includes the taper 736 that allows the second arm 202 to snap into engagement with the rail 120 (e.g., as the rail 120 is pushed in the Y-direction into the receptacle 732).

Figure 10A:
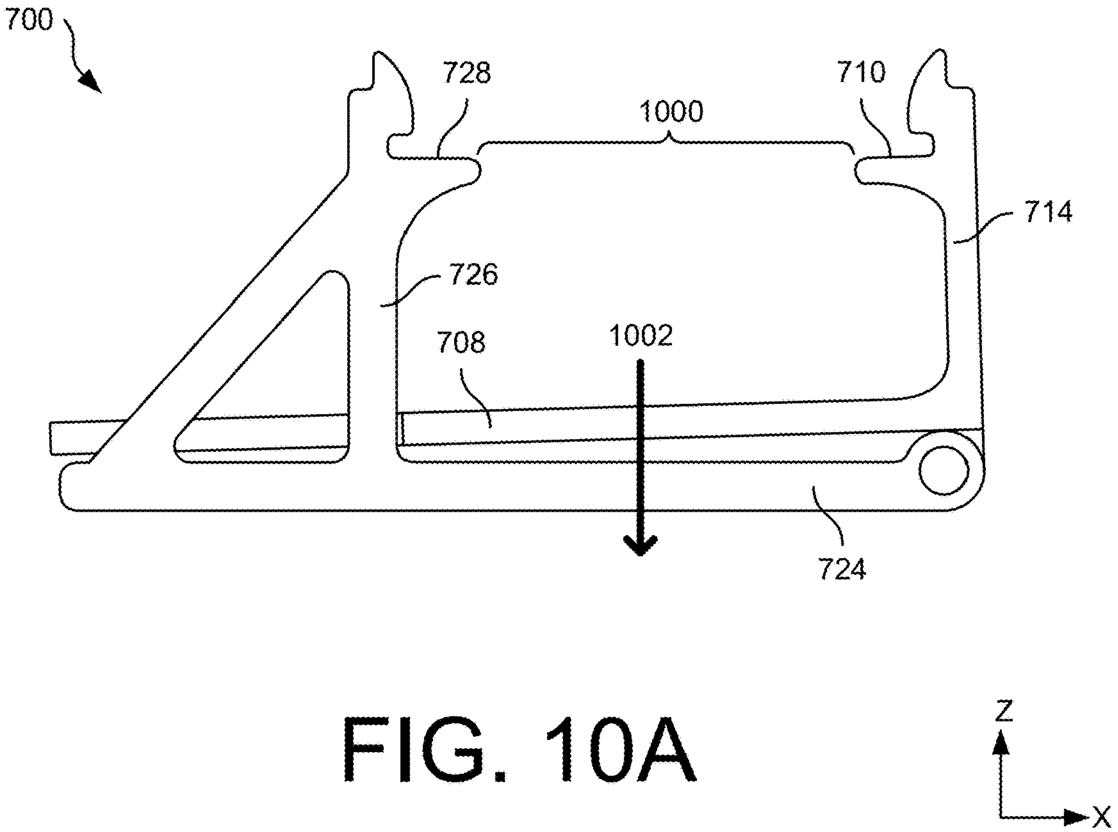
FIGS. 10A and 10B illustrate an example function of the clamp of FIG. 7A, according to embodiments of the present disclosure.
Figure 10B:
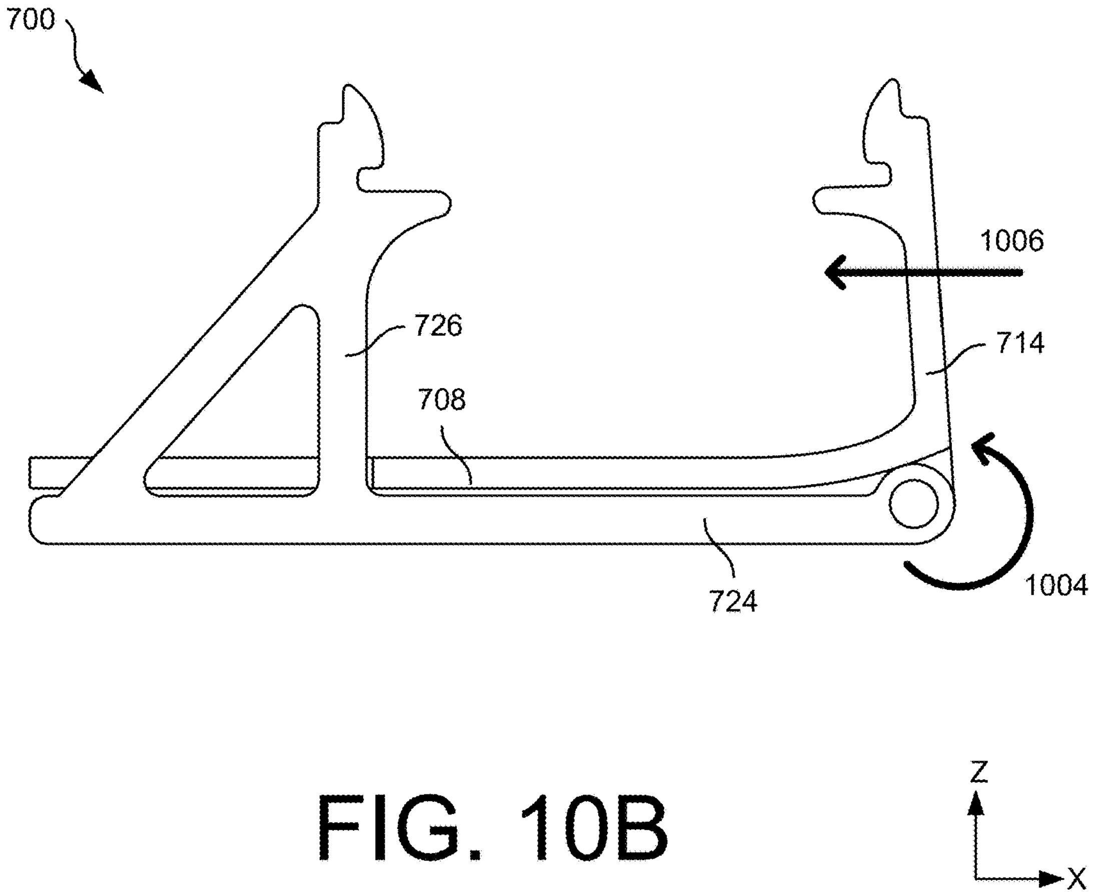
Figure 11A:
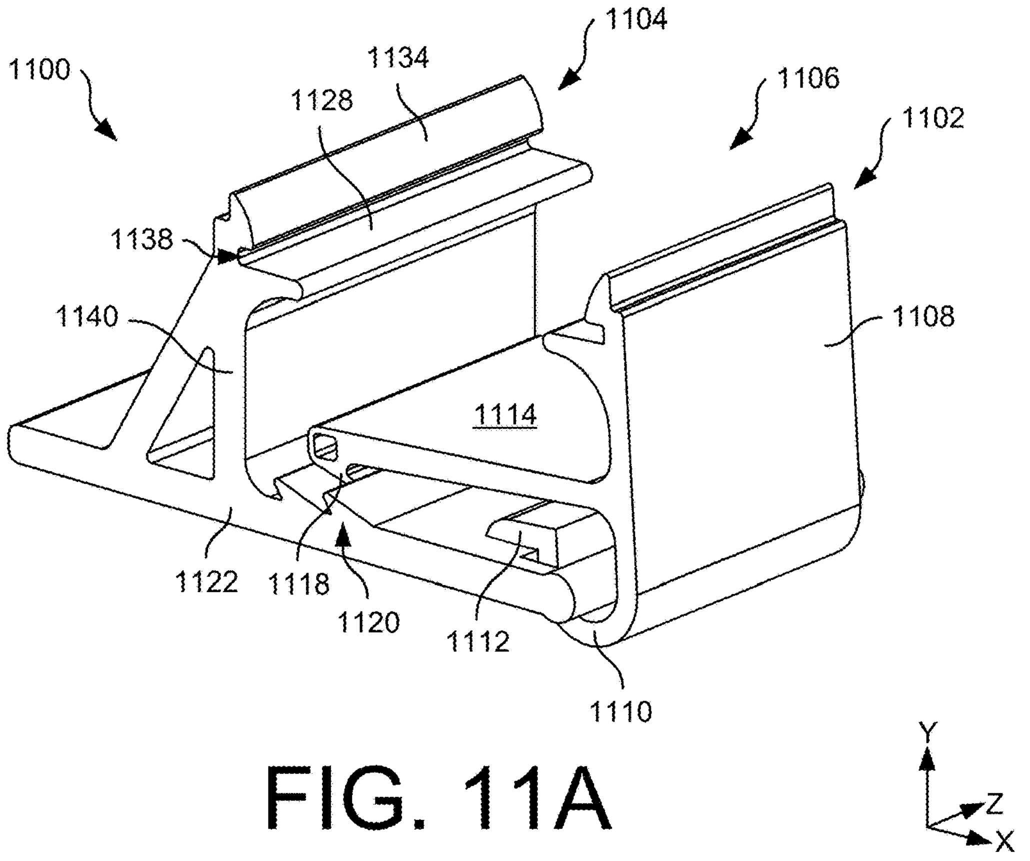
FIG. 11A illustrates a first isometric view of another example clamp usable with the rail and mount of FIG. 1, according to embodiments of the present disclosure.
Figure 11B:
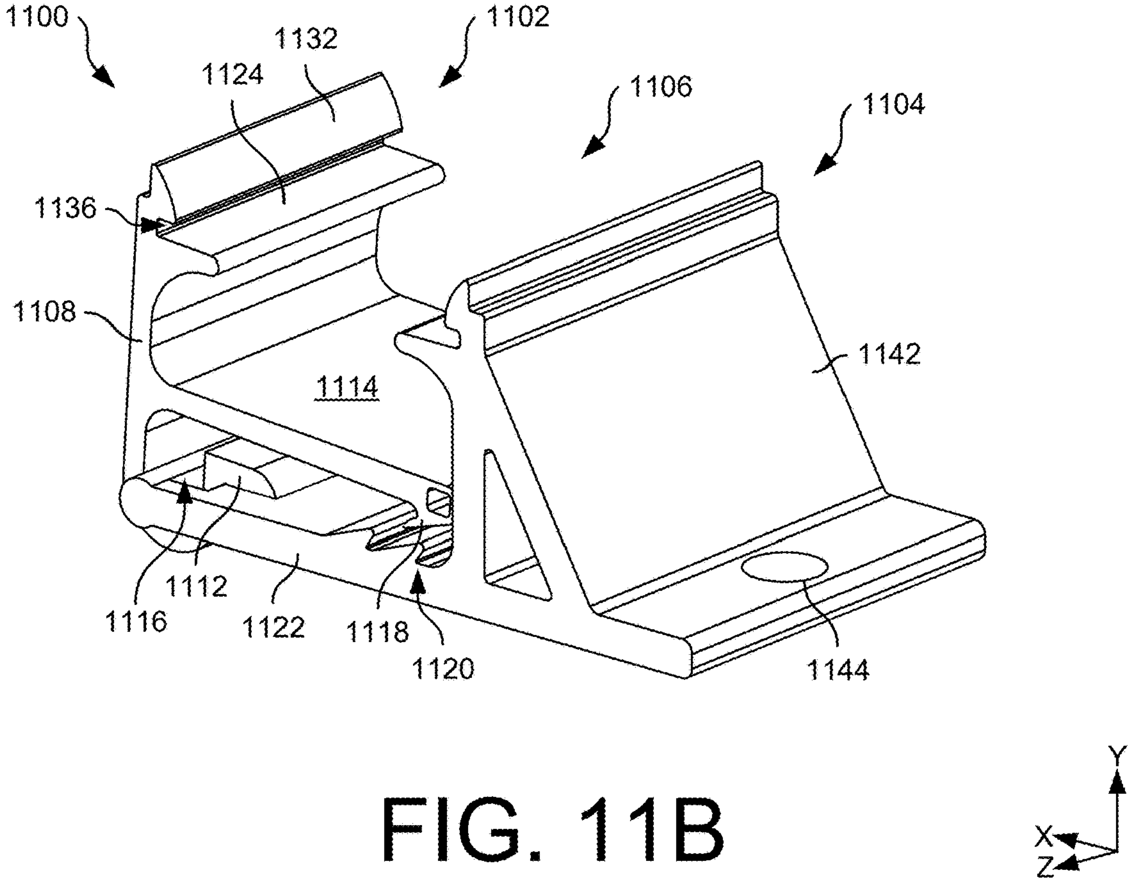
FIG. 11B illustrates a second isometric view of the clamp of FIG. 11A, according to embodiments of the present disclosure.
Figure 11C:
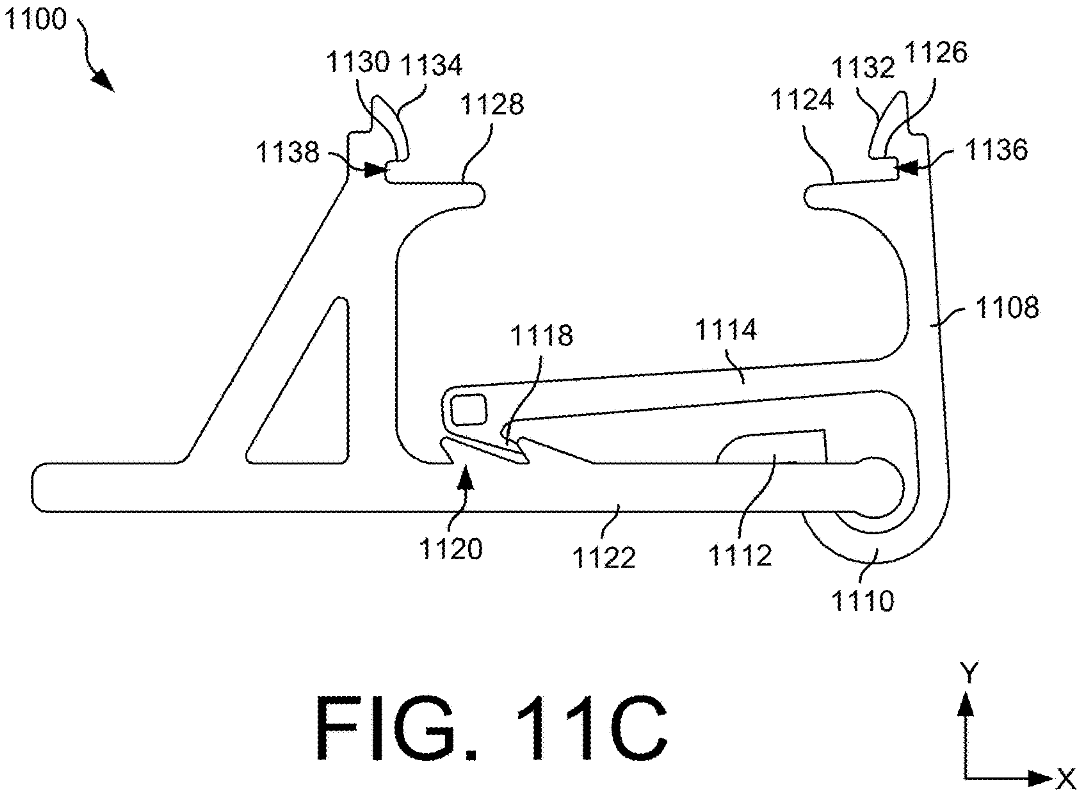
FIG. 11C illustrates a side view of the clamp of FIG. 11A, according to embodiments of the present disclosure.
Figure 11D:
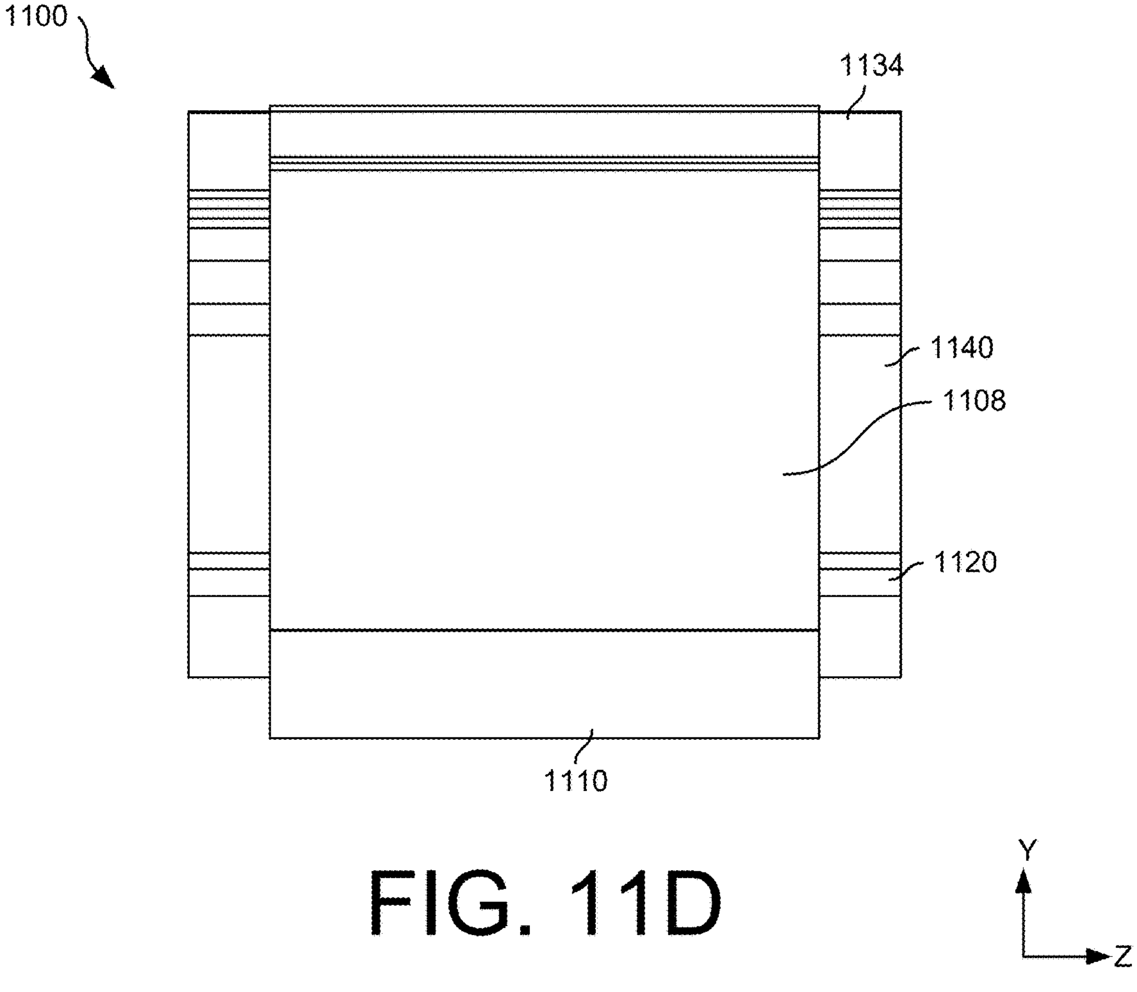
FIG. 11D illustrates an end view of the clamp of FIG. 11A, according to embodiments of the present disclosure.
Figure 11E:
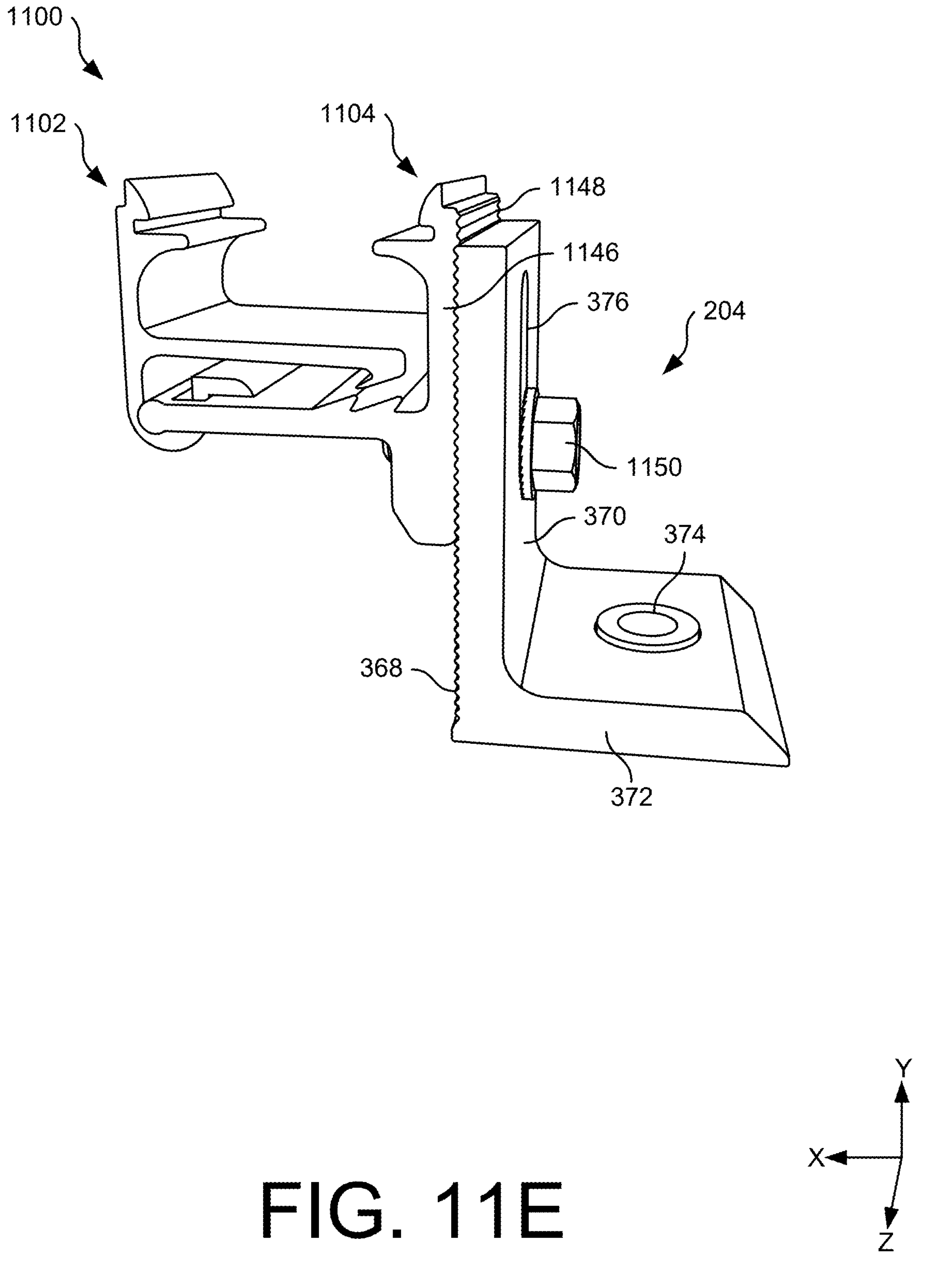
FIG. 11E illustrates an alternate example of the clamp of FIG. 11A, according to embodiments of the present disclosure.

FIGS. 10A and 10B illustrate a function of the clamp 700 to secure the rail 120 within the receptacle 732, according to examples of the present disclosure. The rail 120 is shown removed in FIGS. 10A and 10B in order to illustrate the function of the clamp 700.

FIG. 10A represents a resting or unclamped state of the clamp 700. At the unclamped state, the fastener 114 may not urge the arm 708 towards the arm 724. Moreover, a distance 1000 may be disposed between the shelf 710 and the shelf 728. In FIG. 10B, which represents a clamped state of the clamp 700, the fastener 114 may urge the arm 708 towards the arm 724, in a first direction 1002. For example, as the fastener 114 is tightened, the arm 708 may be urged towards the arm 724. During this urging, the sidewall 714 may rotate about a rotational axis (e.g., about the Z-axis) of the fastening mechanism 706 in a rotational direction 1004. Accordingly, the sidewall 714 may be urged in a second direction 1006 towards the sidewall 726. The movement of the sidewall 714 in the second direction creates or applies a biasing force (e.g., clamping force) to secure the rail 120 within the receptacle 732.

The first body 702 is resilient in order to be urged, biased, etc. For example, the first body 702 may be resilient in order to create the biasing force to couple the rail 120 to the clamp 700. Although the sidewall 714 is shown being deflected or biased inwards, the sidewall 714 may be in a similar position as shown in FIG. 10A when the rail 120 is disposed within the receptacle 732. However, the biasing force created by fastening the fastener 114 urges the sidewall 714 to engage with the rail 120. In an embodiment, the rail 120 may be disposed within the receptacle 732 before, or after, the fastener 114 is used to couple the clamp 700 to the mount 104.

FIGS. 11A-11E illustrate an example clamp 1100, according to examples of the present disclosure. In an embodiment, the clamp 1100 may include a first body 1102 and a second body 1104 that couple together to form a receptacle 1106 in which the rail 120 is disposed. In an embodiment, the first body 1102 may include a width (e.g., in the Z-direction) that is less than a width of the second body 1104.

The first body 1102 may include a sidewall 1108, a first arm 1110, a second arm 1112, and a third arm 1114. The first arm 1110 may be horseshoe shaped, for example, to reside within a first channel 1116 of the second body 1104. The first arm 1110 may extend from the sidewall 1108. The second arm 1112 may extend from the first arm 1110, and the third arm 1114 may extend from the sidewall 1108. The third arm 1114 may include one or more teeth 1118 (e.g., keys, ribs, etc.) that engage with one or more notches 1120 (e.g., keyways, grooves, etc.) of an arm 1122 of the second body 1104. In an embodiment, the second arm 1112 and the third arm 1114 may be parallel to one another. The third arm 1114 may extend transversely from the sidewall 1108.

The first body 1102 also includes a shelf 1124 and a flange 1126. The second body 1104 also defines a shelf 1128 and a flange 1130. When placed in the receptacle 1106, the rail 120 may rest on the shelf 1124 and the shelf 1128. Additionally, the flange 1126 may engage with the first arm 200 and the flange 1130 may engage with the second arm 202 to secure the rail 120 within the receptacle 1106. In an embodiment, the first body 1102 includes a taper 1132 formed in a surface of the first body 1102 and/or the second body 1104 includes a taper 1134 formed in a surface of the second body 1104 that allows the first arm 200 and the second arm 202 to snap into engagement with the receptacle 1106.

In an embodiment, the first body 1102 may further define a second channel 1136 disposed between the shelf 1128 and the flange 1126. The first arm 200 of the rail 120 may be at least partially disposed within the second channel 1136. The second body 1104 may define a second channel 1138 disposed between the shelf 1128 and the flange 1130. The second arm 202 of the rail 120 may be at least partially disposed within the second channel 1136.

The second body 1104 includes a sidewall 1140 and a strut 1142. The sidewall 1140 may extend from the arm 1122 (e.g., transversely) and the strut 1142 may be disposed between the sidewall 1140 and the arm 1122. In an embodiment, the shelf 1128 and the flange 1130 are disposed on the sidewall 1140, and the sidewall 1140 may at least partially form the second channel 1136.

In an embodiment, the first body 1102 may at least partially rotate or be biased during coupling of the rail 120 to the clamp 1100. Details of the coupling of the rail 120 to the clamp 1100 are discussed in FIGS. 15A and 15B. However, during a coupling of the rail 120 within the receptacle 1106, the sidewall 1108 may be at least partially deflected outwards (e.g., away from the sidewall 1140). When the rail 120 is inserted into the receptacle 1106, the deflection of the sidewall 1108 may create a biasing force in an opposite direction, thereby urging the sidewall 1108 in a direction back towards the sidewall 1140. This biasing force secures the rail 120 within the receptacle 1106. As such, the sidewall 1108 (or more generally, the first body 1102) may be made from a resilient material. Additionally, during deflection of the sidewall 1108, the teeth 1118 may engage with one of the notches 1120 to provide the biasing force.

The second body 1104 further defines a slot 1144 (e.g., opening, passage, hole, etc.) through which the fastener 114 is disposed for coupling the clamp 1100 to the mount 104. The slot 1144 may be disposed through the arm 1122. Although described herein as including certain components, the first body 1102 and/or the second body 1104 may include additional struts, supports, etc. for providing strength, alignment with one another, alignment with the mount 104, and so forth. The first body 1102 and the second body 1104 may be manufactured from suitable materials (e.g., metal, plastic, etc.) and may be manufactured using any suitable manufacturing techniques (e.g., extrusion, injection molding, etc.).

In an embodiment, the clamp 1100 may couple to the bracket 364 for coupling to the mount 104, the surface 102, the surface 206, or other surfaces. For example, in FIG. 11E, a variation of the clamp 1100 is shown whereby the sidewall 1146 (e.g., in lieu of the sidewall 1140) of the second body 1104 may define one or more teeth 1148 (e.g., ridges, grooves, ribs, etc.). The one or more teeth 1148 may engage (e.g., interlock) with the one or more teeth 368 of the bracket 204. The one or more teeth 1148 and the one or more teeth 368 may be variably engaged to adjust a height of the clamp 1100 (e.g., in the Y-direction). The bracket 204 may also include the sidewall 370, the base 372, the aperture 374, and the slot 376 formed through the sidewall 370. A fastener 1150 may be disposed through the slot 376 and an aperture in the sidewall 1146.

Figure 12A:
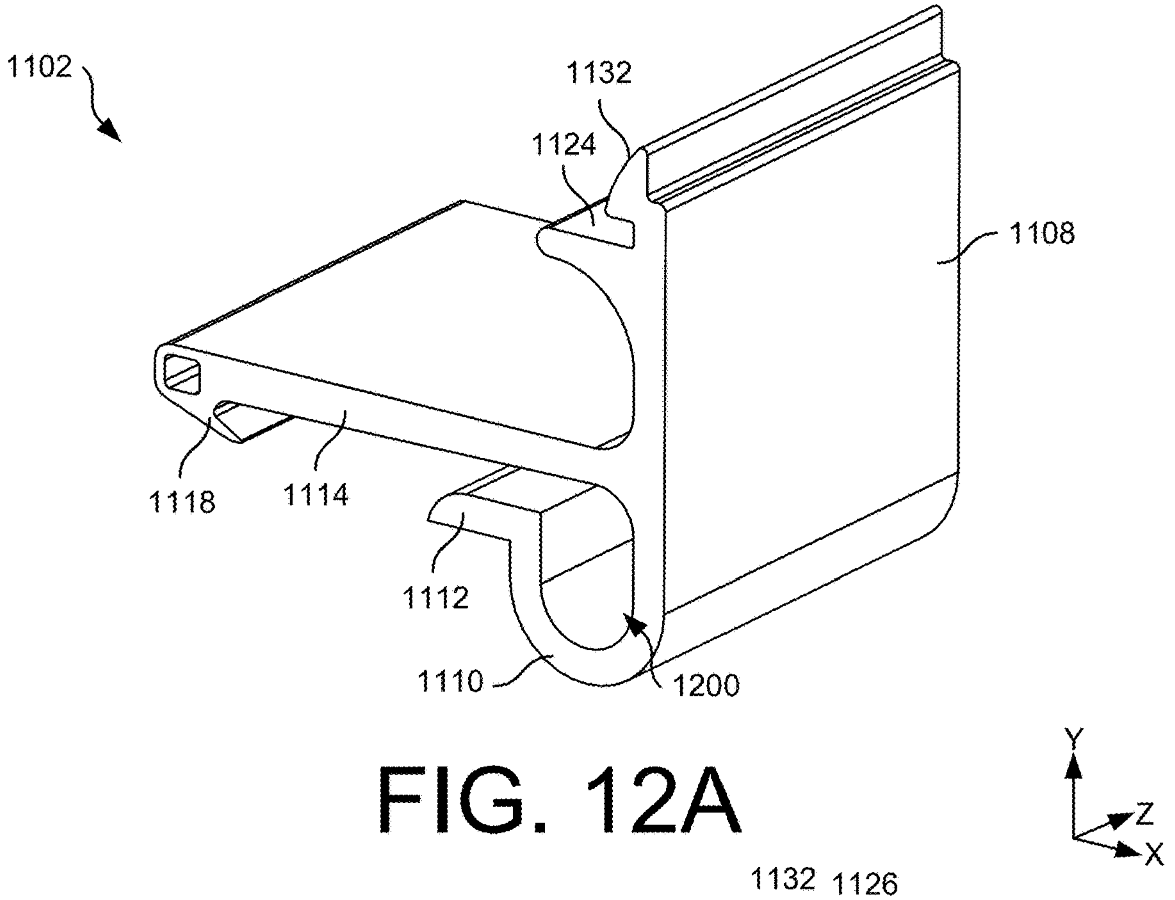
FIG. 12A illustrates an isometric view of an example first body of the clamp of FIG. 11A, according to embodiments of the present disclosure.
Figure 12B:
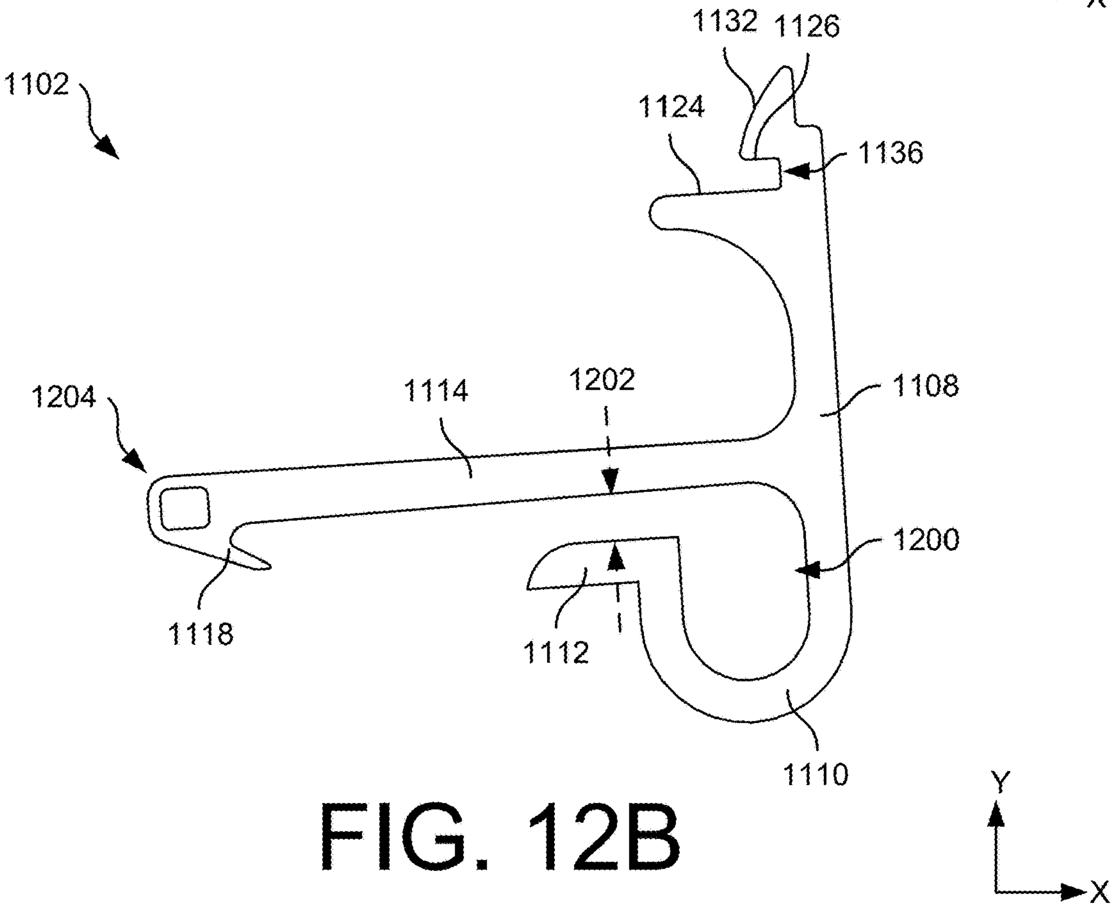
FIG. 12B illustrates a side view of the first body of FIG. 12A, according to embodiments of the present disclosure.

FIGS. 12A and 12B illustrate the first body 1102 of the clamp 1100, according to examples of the present disclosure. As introduced above, the first body 1102 includes the sidewall 1108, the first arm 1110, the second arm 1112, and the third arm 1114. The first arm 1110 may include a horseshoe-shape and the second arm 1112 may extend from an end of the first arm 1110. As will be explained herein, the first arm 1110 may include a loop shape for being disposed through the first channel 1116 of the second body 1104. For example, a cavity 1200 may be formed at least in part by the sidewall 1108 and the first arm 1110 for being disposed within the first channel 1116 of the second body 1104. As will be explained herein, a gap distance 1202 may be disposed between the second arm 1112 and the third arm 1114 to permit the first body 1102 to couple to the second body 1104.

The third arm 1114 extends from the sidewall 1108. The third arm 1114 includes the teeth 1118 disposed on an end 1204 of the third arm 1114. The teeth 1118 may engage with a corresponding notch of the one or more notches 1120. Although the teeth 1118 are shown including a single tooth, more than one of the teeth 1118 may be included.

Figure 13A:
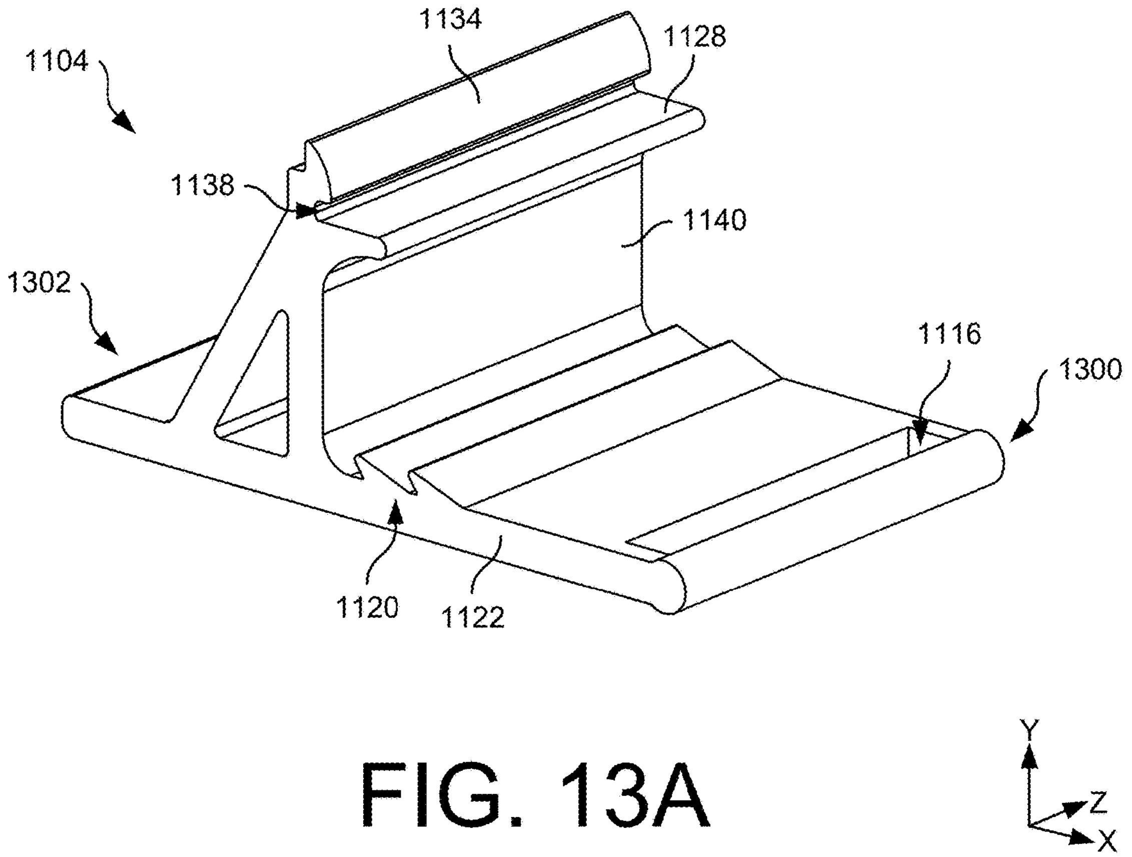
FIG. 13A illustrates an isometric view of an example second body of the clamp of FIG. 11A, according to embodiments of the present disclosure.
Figure 13B:
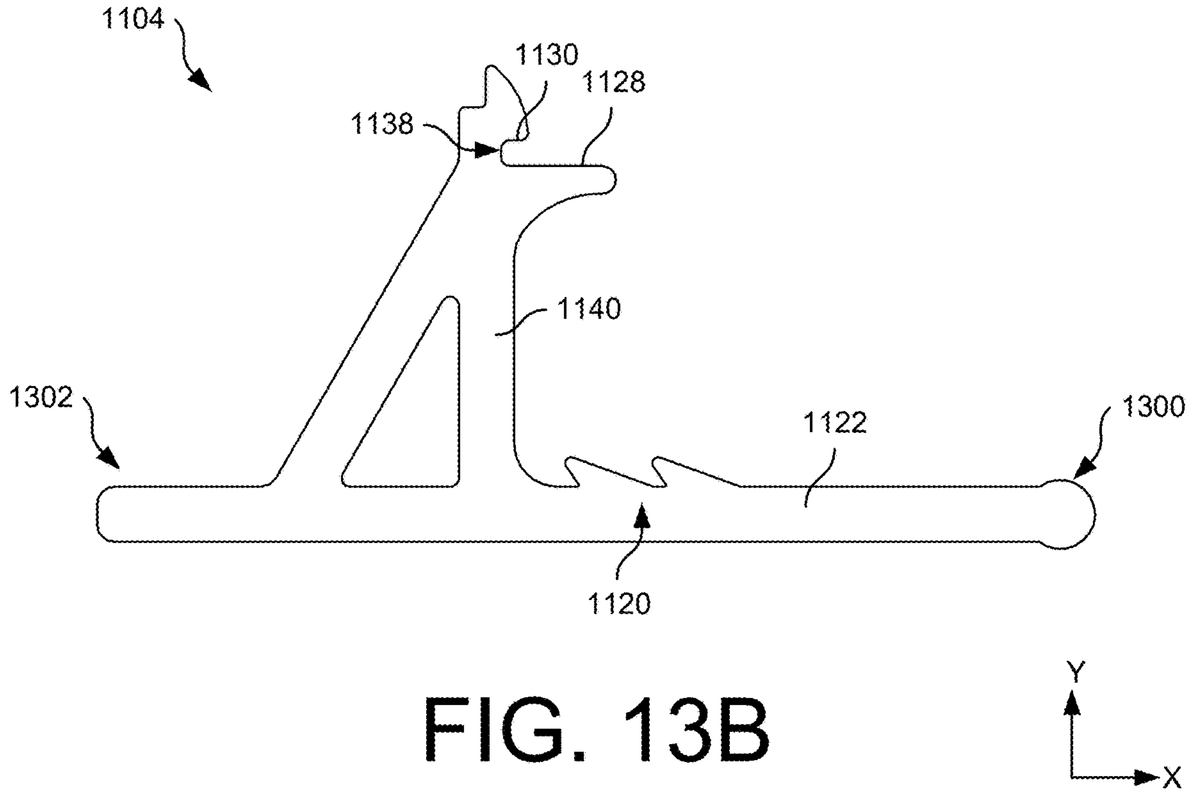
FIG. 13B illustrates a side view of the second body of FIG. 13A, according to embodiments of the present disclosure.

FIGS. 13A and 13B illustrate the second body 1104 of the clamp 1100, according to examples of the present disclosure. The second body 1104 includes the arm 1122 having the notches 1120, and the sidewall 1140. The sidewall 1140 at least partially forms the second channel 1138 for receiving the second arm 202 of the rail 120.

The second body 1104 may include the first channel 1116 disposed proximate to a first end 1300 of the second body 1104. The slot 1144 is disposed proximate to a second end 1302 of the second body 1104. The notches 1120 are formed on the arm 1122, at a location between the sidewall 1140 and the first end 1300. Although two of the notches 1120 are shown, the second body 1104 may include more than or less than two of the notches 1120. In an embodiment, the first end 1300 may include a semi-cylindrical shape (e.g., post, column, etc.) about which portions of the first body 1102 are configured to rest, rotate, etc.

Figure 14:
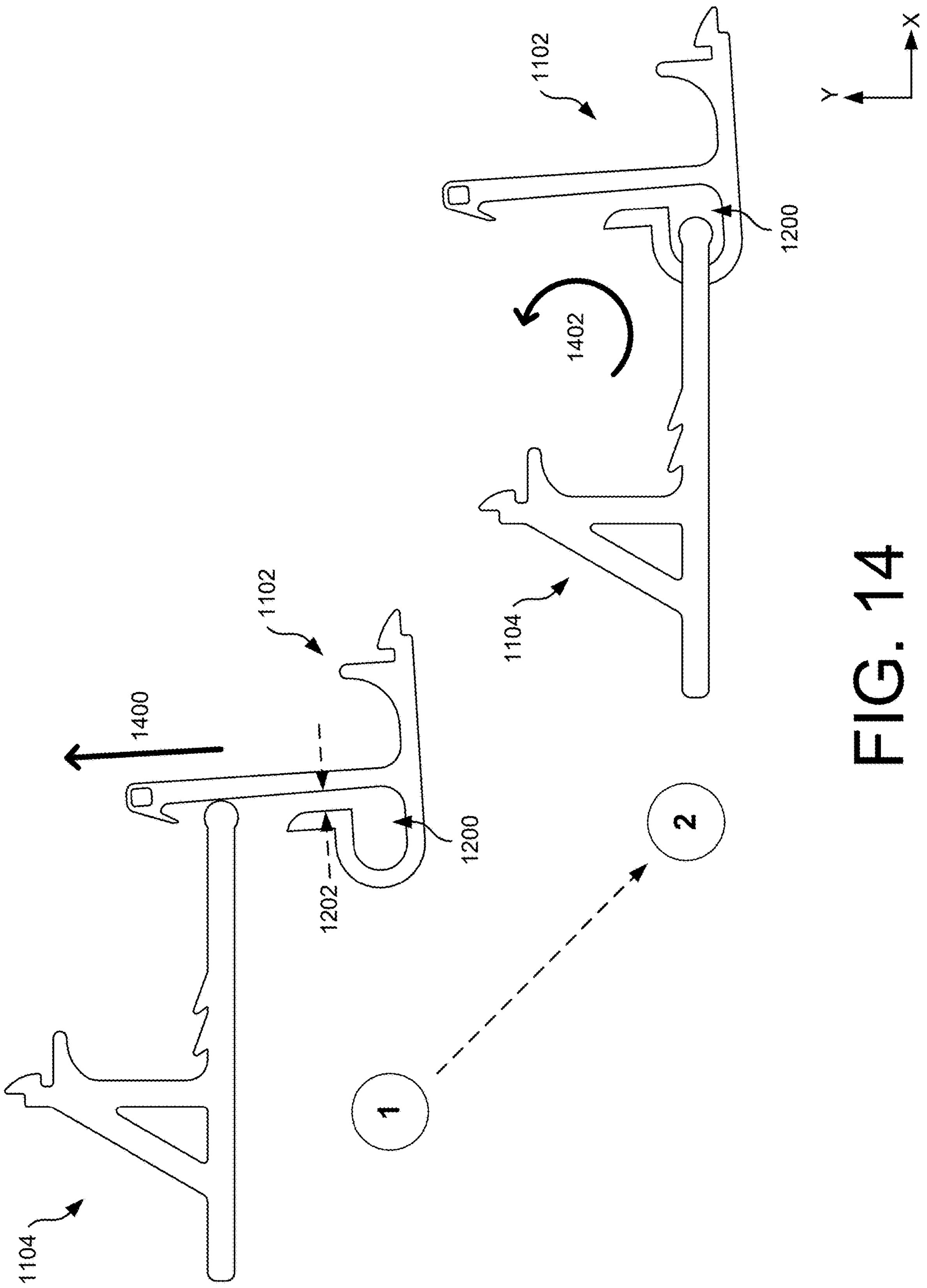
FIG. 14 illustrates an example assembly of the clamp of FIG. 11A, according to embodiments of the present disclosure.

FIG. 14 illustrates an example coupling of the first body 1102 to the second body 1104, according to examples of the present disclosure. At "1" in FIG. 14, the first body 1102 may be advanced in a first direction 1400 to dispose the first end 1300 of the second body 1104 through the gap distance 1202. That is, the first end 1300 of the second body 1104 (or the circular-shaped end) may be disposed through the gap distance 1202 and into the cavity 1200. Once within the cavity 1200, at "2" in FIG. 14, the first body 1102 may be rotated in a second direction 1402. Rotation may occur between an engagement of the first end 1300 of the second body 1104 and the cavity 1200. Once rotated in the second direction 1402, the teeth 1118 may engage with the notches 1120.

Figure 15A:
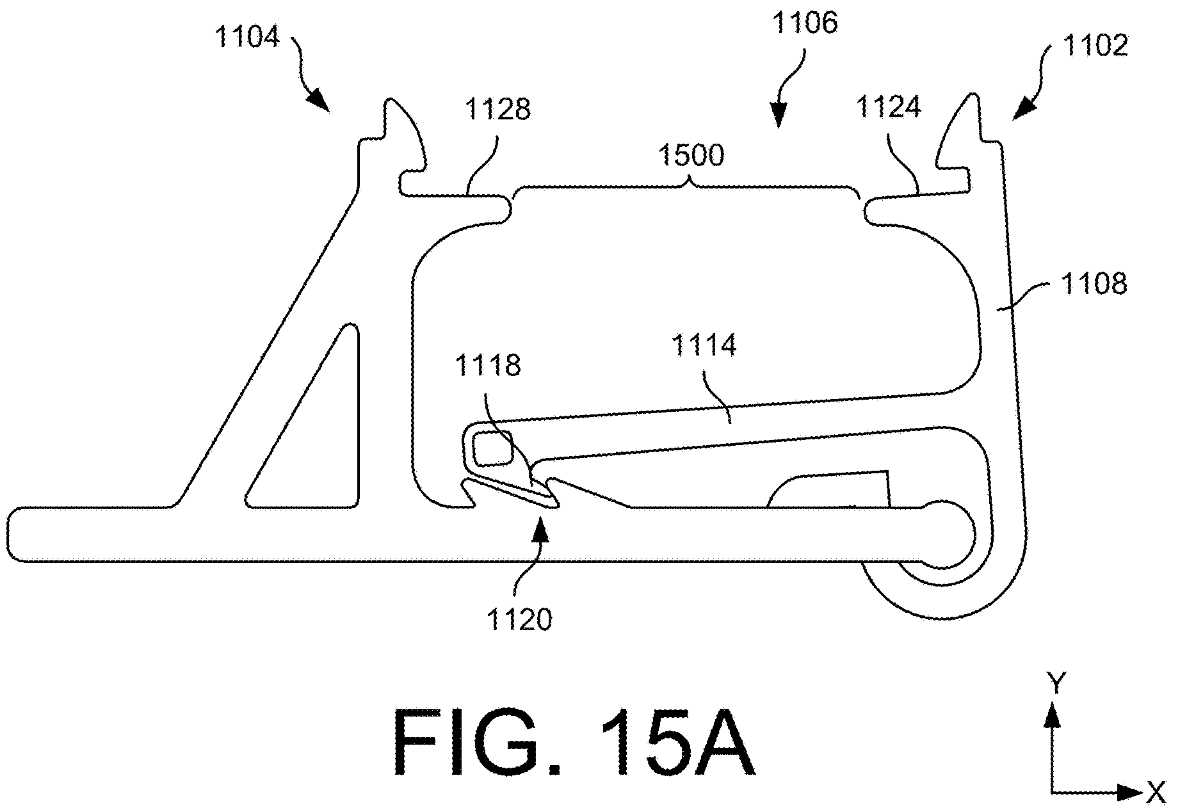
FIGS. 15A and 15B illustrate an example function of the clamp of FIG. 11A, according to embodiments of the present disclosure.
Figure 15B:
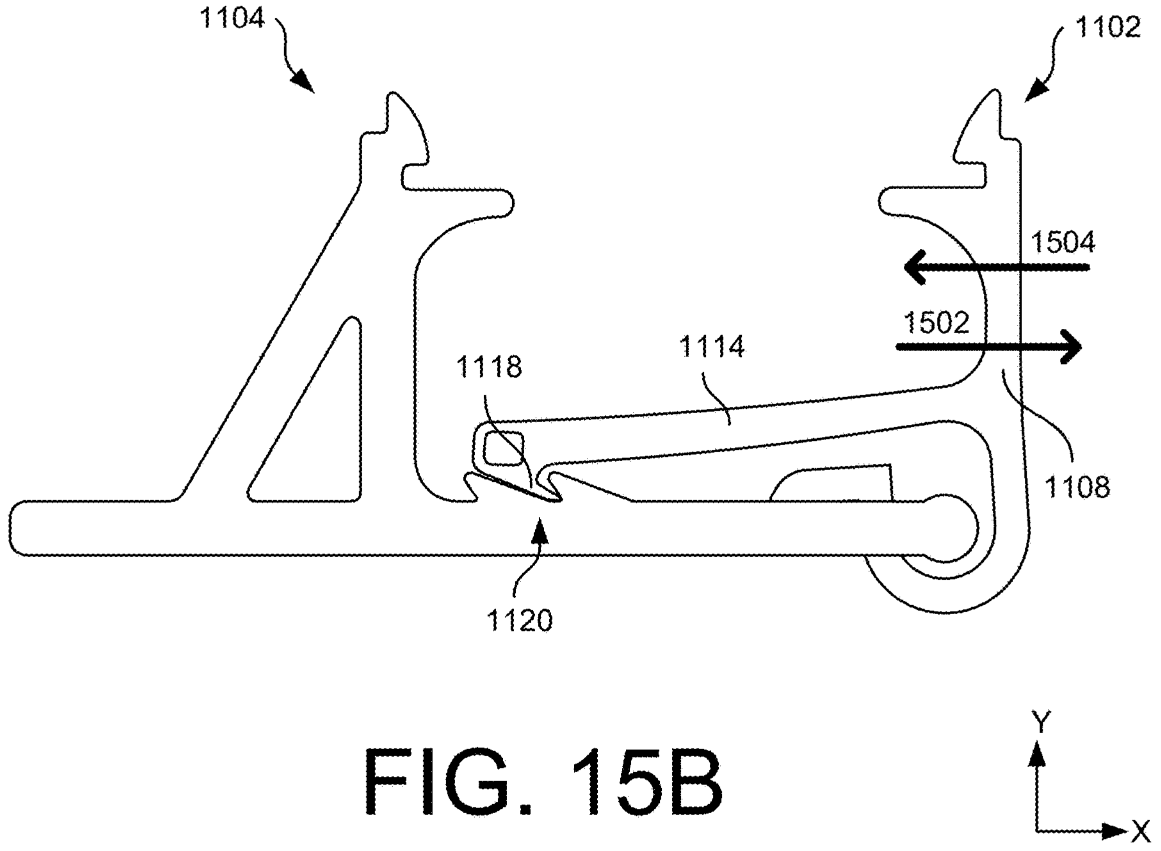

FIGS. 15A and 15B illustrates an example function of the clamp 1100 to secure the rail 120 within the receptacle 1106, according to examples of the present disclosure. FIG. 15A represents a resting or unclamped state of the clamp 1100. In the unclamped state, the rail 120 may not urge against the sidewall 1108. Moreover, a distance 1500 may be disposed between the shelf 1124 and the shelf 1128. In FIG. 15B, which represents a clamped state of the clamp 1100, as the rail 120 is inserted into the receptacle 1106, the rail 120 may urge the sidewall 1108 in a first direction 1502. For example, the distance 1500 may be less than a width (e.g., in the X-direction) of the rail 120, and as the rail 120 is disposed in the receptacle 1106, the sidewall 1108 may be urged in the first direction 1502. During this urging, the sidewall 1108 may rotate. Additionally, the teeth 1118 engage with the notches 1120 to anchor the first body 1102 and permit deflection of the sidewall 1108 in the first direction 1502.

Given the urging of the sidewall 1108 in the first direction 1502, a resilient nature of the sidewall 1108 may create a biasing force in a second direction 1504. The biasing force in the second direction 1504 may secure the rail 120 within the receptacle 1106. The first body 1102 is resilient in order to be urged, biased, etc. In an embodiment, the sidewall 1108 may be urged further in the first direction 1502 in order to release the rail 120 from the receptacle 1106.

FIG. 16 illustrates an example clamp 1600, according to examples of the present disclosure. In an embodiment, the clamp 1600 may include a body defining a base 1602, a first sidewall 1604, and a second sidewall 1606. Compared to the previous clamps discussed herein, the clamp 1600 may include a single or unibody design.

The first sidewall 1604 and the second sidewall 1606 may extend from the base 1602 (e.g., in the Y-direction). The first sidewall 1604 may include a shelf 1608 on which the first arm 200 of the rail 120 is disposed, while the second sidewall 1606 may include a shelf 1610 on which the second arm 202 of the rail 120 is disposed. The shelf 1608 and the shelf 1610 may be defined by the first sidewall 1604 and the second sidewall 1606, respectively. In addition, the first sidewall 1604 may define a channel 1612 in which the first arm 200 is at least partially disposed, and the second sidewall 1606 may define a channel 1614 in which the second arm 202 is at least partially disposed.

The clamp 1600 includes a first opening 1616 disposed through the base 1602, a second opening 1618 disposed through the first sidewall 1604, and a third opening 1620 disposed through the second sidewall 1606. A first fastener may be disposed through the first opening 1616 and into the hole 116 of the mount 104 for coupling the clamp 1600 to the mount 104. Alternatively, the first fastener may be disposed through the first opening 1616 and directly into the surface 102, or other mounts, brackets, etc. Moreover, a second fastener may be disposed through the second opening 1618 and into the third opening 1620. The third opening 1620 may be threaded to receive the second fastener. The second opening 1618 may be concentric with the third opening 1620. During tightening of the second fastener, the first sidewall 1604 and the second sidewall 1606 may be brought in closer proximity to one another (e.g., inwards in the X-direction) to secure the rail 120 with a receptacle 1622 of the clamp 1600. For example, during tightening of the second fastener, the first sidewall 1604 and/or the second sidewall 1606 may at least partially bend, deflect, etc., so as to be urged towards one another. As such, a distance disposed between the first sidewall 1604 and the second sidewall 1606 may decrease as the second fastener is tightened to secure the rail 120 within the receptacle 1622.

In an embodiment, the second fastener may be pre-installed on the clamp 1600, and once the rail 120 is inserted into the receptacle 1622, the second fastener may be tightened. Moreover, in an embodiment, the first opening 1616 may be located more proximate to a first side 1624 of the clamp 1600 as compared to a second side 1626 of the clamp 1600 (e.g., spaced apart in the Z-direction). The second opening 1618 and the third opening 1620 may be located more proximate to the second side 1626 than the first side 1624. The first opening 1616 may therefore be offset or spaced apart (in the Z-direction) from the second opening 1618 and the third opening 1620. With this arrangement, the first fastener may be disposed through the first opening 1616 and into the hole 116 of the mount 104 without interfering with the second fastener. Additionally, such arrangement may allow a socket to be used to tighten the first fastener without contacting the second fastener. Although a certain orientation or location of the first opening 1616, the second opening 1618, or the third opening 1620 is shown, other variations are envisioned.

The clamp 1600 may include a first end 1628 and a second end 1630 spaced apart from the first end 1628 (e.g., in the X-direction). The first sidewall 1604 may be disposed at or along the first end 1628, and the second sidewall 1606 may be disposed at or along the second end 1630. In an embodiment, the second sidewall 1606 may include an arm 1634 that defines the shelf 1610, the channel 1614, or the flange that engages with the rail 120. In an embodiment, the arm 1634 may extend transversely from the second sidewall 1606 (e.g., in the X-direction). As such, in an embodiment, the shelf 1610, the channel 1614, or the flange that engages with the rail 120 may be disposed beyond, or extend past, the second sidewall 1606 (e.g., in the X-direction).

In an embodiment, the first sidewall 1604 may define one or more teeth 1632. The one or more teeth 1632 may be disposed on a side, surface, etc. of the first sidewall 1604 external to the receptacle 1622. In an embodiment, the one or more teeth 1632 may engage with the one or more teeth 368 of the bracket 204. In such instances, the second fastener may be disposed through the slot 376 in the bracket, through the second opening 1618, and into the third opening 1620.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A clamp for supporting a rail, the clamp comprising:
- a first body including:
  - a sidewall,
  - an opening disposed through the sidewall of the first body,
  - a first arm extending from the sidewall of the first body,
  - a second arm extending from the sidewall of the first body,
  - a shelf extending from the sidewall of the first body, and
  - a channel formed at least in part by the first arm and the second arm;
- a second body including:
  - a sidewall,
  - a first opening disposed through the sidewall of the second body,
  - an arm extending from the sidewall of the second body, the arm of the second body being at least partially disposed in the channel of the first body, wherein the arm of the second body is disposed against the first arm of the first body,
  - a channel formed at least in part by the sidewall of the second body and the arm of the second body, the second arm of the first body being at least partially disposed in the channel of the second body, and
  - a second opening disposed through the arm of the second body, the second opening being oriented transverse to the first opening in the sidewall,
- a shelf extending from the sidewall of the second body; and
- a fastening mechanism disposed through the opening in the first body and through the first opening in the second body to couple the first body and the second body together, the fastening mechanism to transition the clamp between an unclamped state in which the rail is removable from the clamp, and a clamped state in which the rail is secured within the clamp.

2. The clamp of claim 1, wherein:
- the first body includes a second channel;
- the second body includes a second channel; and
- the rail includes:
  - a first arm at least partially disposed in the second channel in the clamped state, and
  - a second arm at least partially disposed in the second channel of the second body in the clamped state.

3. The clamp of claim 1, wherein:
- a fastener is disposed through the second opening, the fastener to couple the clamp to a mount; and
- the mount couples to a surface.

4. The clamp of claim 1, wherein the fastening mechanism comprises:
- a pin;
- a lever including a first cam surface and a second cam surface; and
- a shaft disposed through the pin and the lever for hingedly coupling the lever to the pin.

5. The clamp of claim 1, wherein:
- the second arm includes one or more teeth; and
- the channel of the second body has one or more notches to engage with the one or more teeth in the clamped state.

6. A clamp for coupling to a rail, the clamp to transition between an unclamped state and a clamped state, the clamp comprising:
- a first body including:
  - a sidewall,
  - a shelf extending from the sidewall, wherein a first arm of the rail rests on the shelf of the first body,
  - a flange extending from the sidewall of the first body, and
  - a channel formed at least in part by the shelf of the first body and the flange of the first body, the first arm of the rail being at least partially disposed in the channel of the first body in the clamped state;
  - a second body including:
  - a sidewall,
  - a shelf extending from the sidewall of the second body, wherein a second arm of the rail rests on the shelf of the second body,
  - a flange extending from the sidewall of the second body,
  - a channel formed at least in part by the shelf of the second body and the flange of the second body, the second arm being at least partially disposed in the channel of the second body in the clamped state, and
  - a slot through which a fastener is disposed for coupling the clamp to a mount;
- a receptacle formed at least in part by the first body and the second body, the rail being at least partially disposed in the receptacle; and
- a fastening mechanism to transition the clamp between the unclamped state and the clamped state, the fastening mechanism being disposed through the sidewall of the first body and the sidewall of the second body.

7. The clamp of claim 6, wherein the mount includes a passage in which a seam of a metal roof is at least partially disposed.

8. The clamp of claim 6, wherein:
- the first body includes:
  - a first arm,
  - a second arm, and a second channel defined at least in part by the first arm and the second arm; and the second body includes:

an arm at least partially disposed in the second channel of the first body, and a second channel in which the second arm is at least partially disposed.

9. The clamp of claim 8, wherein:

the second arm includes one or more teeth; and one or more notches are disposed in the second channel of the second body, the one or more teeth being engaged with the one or more notches in the clamped state.

10. The clamp of claim 1, wherein:

the first arm extends from the sidewall of the first body by a first distance; and the second arm extends from the sidewall of the first body by a second distance that is greater than the first distance.

11. The clamp of claim 6, wherein the fastening mechanism comprises:

a pin;

a lever including a first cam surface and a second cam surface; and a shaft disposed through the pin and the lever for hingedly coupling the lever to the pin.

12. The clamp of claim 6, wherein:

the sidewall of the first body includes an opening;

the sidewall of the second body includes an opening; and the fastening mechanism is disposed through the opening in the sidewall of the first body and the sidewall of the second body.

13. The clamp of claim 6, wherein:

in the clamped state, the rail is secured within the clamp; and in the unclamped state, the rail is insertable and removable from the clamp.

14. A clamp comprising:

a first body including:

a sidewall, a first arm extending from the sidewall of the first body, a second arm extending from the sidewall of the first body, the second arm having a tooth, a shelf extending from the sidewall of the first body, and a channel formed at least in part by the first arm and the second arm;

a second body including:

a sidewall, an arm extending from the sidewall of the second body, the arm of the second body being at least partially disposed in the channel of the first body, wherein the arm of the second body is disposed against the first arm of the first body, a channel formed at least in part by the sidewall of the second body and the arm of the second body, the channel of the first body including one or more notches, wherein the second arm of the first body is disposed within the channel of the second body such that the tooth engages with one notch of the one or more notches, and a shelf extending from the sidewall of the second body; and a fastening mechanism disposed through the first body and the second body to couple the first body and the second body together, the fastening mechanism to transition the clamp between an unclamped state and a clamped state.

15. The clamp of claim 14, wherein:

the first body includes an opening disposed through the sidewall of the first body;

the second body includes an opening disposed through the sidewall of the second body; and the fastening mechanism is disposed through the opening of the first body and the opening of the second body.

16. The clamp of claim 15, wherein the second body includes a second opening disposed through the arm of the second body, the second opening being oriented transverse to the opening in the sidewall of the second body.

17. The clamp of claim 16, wherein:

a fastener is disposed through the second opening;

the fastener couples the clamp to a mount; and the mount couples to a surface.

18. The clamp of claim 14, wherein the fastening mechanism comprises:

a pin;

a lever including a first cam surface and a second cam surface; and a shaft disposed through the pin and the lever for hingedly coupling the lever to the pin.

19. The clamp of claim 14, wherein the fastening mechanism transitions the clamp between the unclamped state in which a rail is removable from the clamp, and the clamped state in which the rail is secured within the clamp.

20. The clamp of claim 19, further comprising a receptacle formed at least in part by the first body and the second body, the rail being at least partially disposed in the receptacle.

* * * * *